United States Patent
Kim

(10) Patent No.: US 10,101,716 B2
(45) Date of Patent: Oct. 16, 2018

(54) AUTONOMOUS, DISTRIBUTED, RULE-BASED INTELLIGENCE

(71) Applicant: Belkin International, Inc., Playa Vista, CA (US)

(72) Inventor: Ryan Yong Kim, Rolling Hills Estates, CA (US)

(73) Assignee: Belkin International, Inc., Playa Vista, CA (US)

( * ) Notice: Subject to any disclaimer, the term of this patent is extended or adjusted under 35 U.S.C. 154(b) by 189 days.

(21) Appl. No.: 14/959,409

(22) Filed: Dec. 4, 2015

(65) Prior Publication Data

US 2016/0195864 A1 Jul. 7, 2016

Related U.S. Application Data

(60) Provisional application No. 62/087,704, filed on Dec. 4, 2014, provisional application No. 62/087,745, filed on Dec. 4, 2014, provisional application No. 62/087,780, filed on Dec. 4, 2014.

(51) Int. Cl.
| | | |
|---|---|---|
| *H04L 12/28* | (2006.01) | |
| *G05B 15/02* | (2006.01) | |
| *H04L 12/24* | (2006.01) | |
| *H05B 37/02* | (2006.01) | |

(52) U.S. Cl.
CPC .......... *G05B 15/02* (2013.01); *H04L 12/2803* (2013.01); *H04L 12/2816* (2013.01); *H04L 41/0813* (2013.01); *H04L 41/0886* (2013.01); *H04L 41/0893* (2013.01); *G05B 2219/25167* (2013.01); *G05B 2219/2642* (2013.01); *H05B 37/02* (2013.01); *H05B 37/029* (2013.01)

(58) Field of Classification Search
CPC ... H05B 37/02; H05B 37/029; H04L 12/2803; H04L 12/2816
See application file for complete search history.

(56) References Cited

U.S. PATENT DOCUMENTS

| | | | | |
|---|---|---|---|---|
| 9,374,874 | B1 * | 6/2016 | Ewing ................ | H05B 37/0272 |
| 2010/0289643 | A1 * | 11/2010 | Trundle ................ | G08C 19/16 |
| | | | | 340/545.1 |
| 2011/0276215 | A1 * | 11/2011 | Wendling ........... | B60G 17/0152 |
| | | | | 701/31.4 |
| 2014/0103819 | A1 * | 4/2014 | Mohan ............... | H05B 37/0254 |
| | | | | 315/159 |
| 2016/0381458 | A1 * | 12/2016 | Kim ..................... | H03G 3/3005 |
| | | | | 381/57 |

* cited by examiner

*Primary Examiner* — Jeong S Park
(74) *Attorney, Agent, or Firm* — Kilpatrick Townsend & Stockton LLP

(57) ABSTRACT

Described are systems and methods for autonomously operating network devices by revising the operational status of the network devices in response to conditions or physical quantities sensed by one or more sensors.

20 Claims, 49 Drawing Sheets

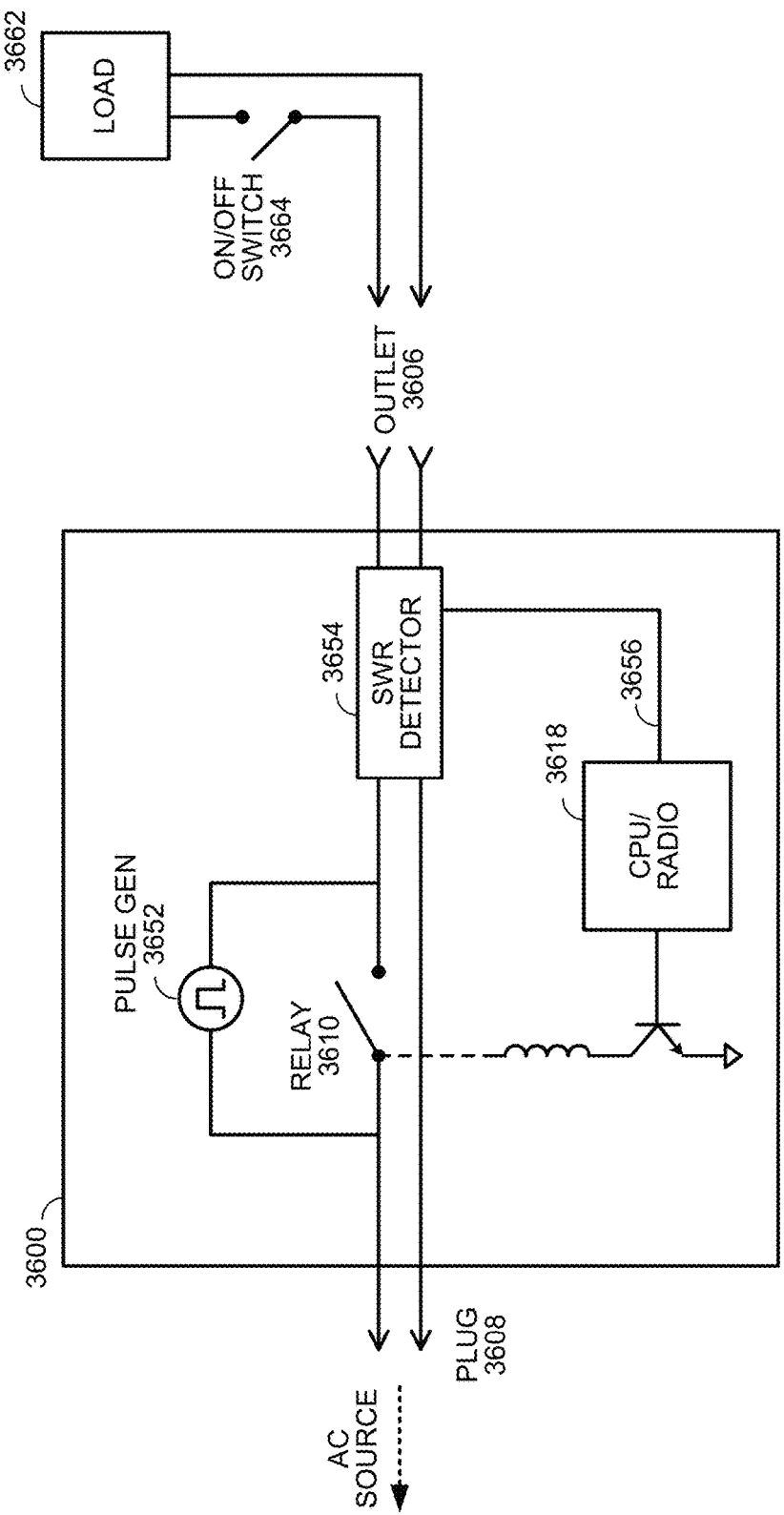

3700

PROVIDE AN ELECTRICAL CURRENT PATH BETWEEN
A PLUG AND AN OUTLET INTERFACE OF A POWER SWITCH
VIA A POWER DRAW TEST CIRCUIT WHEN
THE POWER SWITCH IS IN A POWER OFF STATE
3702

MONITOR THE ELECTRICAL CURRENT PATH
WITH A POWER DRAW DETECTION CIRCUIT
3704

AUTOMATICALLY SWITCH THE POWER SWITCH FROM
THE POWER OFF STATE TO A POWER ON STATE IN RESPONSE
TO DETECTING THE EXTERNAL ELECTRONIC DEVICE IS BEING
TURNED ON AT THE EXTERNAL ELECTRONIC DEVICE.
3706

FIG. 37

AUTONOMOUS, DISTRIBUTED, RULE-BASED INTELLIGENCE

CROSS-REFERENCE TO RELATED APPLICATIONS

This application claims the benefit of and priority to U.S. Provisional Application No. 62/087,704, filed Dec. 4, 2014, U.S. Provisional Application No. 62/087,745, filed Dec. 4, 2014, and U.S. Provisional Application No. 62/087,780, filed Dec. 4, 2014. These applications are hereby incorporated by reference in their entireties for all purposes.

FIELD

The present disclosure generally relates to network devices, to network control over electrical devices and sensors, to wireless communication between network devices, and to identifying a type of an electronic device. Specifically, various techniques and systems are provided for autonomously controlling multiple network devices by analyzing sensor information to update the rules governing the operation of the network devices. Further, various techniques and systems are provided for identifying a type of an electronic device using image data corresponding to the electronic device. In addition, home automation network devices are provided.

BACKGROUND

A variety of network connected electrical devices are presently available on the market. Many of these devices communicate with one another through a common hub, simplifying connection of the devices to a local area network, as only a single connection between the hub and the network is required, while all other connected devices attach to the hub. This configuration has an important limitation, however, which is that the hub is required in order for communications from the network to reach the connected devices. Should the hub experience a malfunction or failure, network access to the connected devices may be limited or impossible. Furthermore, each connected device typically operates according to its own set of operational guidelines, which are generally unrelated to the operation of other connected devices.

Residences, offices, and other locations may have electronic devices (e.g., lamps, fans, heaters, televisions, motion sensors, etc.). Some electronic devices may be operated within a network environment. For example, an automation network may allow a user to schedule or otherwise automate functionalities of various electronic devices connected to the network. Electronic devices may be associated with a large number of functionalities in addition to many possible permutations of automation settings. However, users may be unaware of some functionalities and may not utilize the most optimal automation rules and settings.

A power control device (e.g., a power switch, a power adapter, a power strip, etc.) that interfaces between an electrical wall outlet and an electronic device may provide a mechanism to turn on and off the flow of electrical power from the wall outlet to the electronic device. In some scenarios, the electronic device may have an extended power cord to allow the electronic device to be placed distal from the power control device. The electronic device may also have its own ON/OFF switch such that the electronic device can be turned on and off at the electronic device. However, when the power control device between the wall outlet and the electronic device is in the power-off state, even if the ON/OFF switch at the electronic device is turned on, the electronic device will not receive power unless the power control device is switched from the power-off state to the power-on state. As a result, a user may have to inconveniently travel to the location of the power control device to manually or otherwise turn on the power control device before the electronic device can be used.

SUMMARY

Described herein are systems and methods for autonomously operating network devices by revising the operational status of the network devices in response to conditions and events sensed by one or more sensors. The revisions to the operational status of the network devices can, at least in part, incorporate the conditions and events sensed by the one or more sensors. In embodiments, this is achieved by revising the system profile, corresponding to the status and operational rules governing the operation of the network devices, to independently change the status of one or more devices in an attempt to drive the sensor values towards one or more set points.

Techniques are also described for identifying a type of electronic device using image data corresponding to the electronic device. In some embodiments, the type of an electronic device can be used to identify other electronic devices of the same type so that usage of such other devices by other users may be analyzed. Recommendations and other types of content related to usage of the electronic device can be provided.

The autonomous operation of the network devices is optionally accompanied by notifications provided to a user, such as to inform the user of a change to the system profile or to allow the user to manually adjust or refine the automated changes made to the system profile. In addition, the notifications are optionally useful for informing the user of the reason for the system profile change, if known to the system, such as a high or low sensor value or a system error or malfunction. The disclosed systems and methods advantageously allow autonomous operation, permitting the systems to independently operate without interactions from the user to correct for and/or compensate for malfunctioning devices, such as devices that will not power on, devices that give erroneous outputs, devices that fail to connect to the network and the like.

The operational rules and reference values used in the system profile governing the devices can be autonomously updated by the system, such as in response to sensor data, to events that occur, to scheduled events, or to user input that changes one or more reference values. The operational rules and reference values used in the system profile governing the devices can also be manually updated by a user at any time or in response to a notification generated to inform the user of a change to the system profile. In addition, crowd sourced information can be used to establish the operational rules of the system profile, such as to utilize patterns of behavior for specific systems found to be useful by the population in general.

In a first aspect, provided are methods, such as a computer implemented method. An exemplary method embodiment of this aspect comprises the steps of receiving, for example at a computing device, an initial system profile corresponding to operation of a plurality devices; operating the computing device according to the initial system profile; receiving sensor data; comparing the sensor data with one or more reference values; generating an updated system profile corresponding to operation of the plurality of devices, wherein the updated system profile is generated using the comparison; and transmitting the updated system profile, wherein receiving the updated system profile at the plurality of devices facilitates independent operation of the plurality of devices according to the updated system profile. In some embodiments, facilitating operation of a device includes transmitting information to the device that permits the device to operate according to information included in the transmission. In embodiments, the system profile is transmitted to each of the plurality of devices, permitting independent operation of each device according to the system profile. For some embodiments, independent operation of a plurality of devices includes instances where each of the plurality of devices has a status that is independent of a status of the other devices; for example, when multiple devices operate independently, each has a status that is optionally different from a status of each other device, though it is also possible for any two or more devices to have identical statuses. In embodiments, a method of this aspect further comprises the step of operating the computing device according to the updated system profile. In an exemplary embodiment, the plurality of devices comprise a plurality of network connected devices, such as one or more of the network devices described throughout this specification.

In embodiments, the system profile includes operational rules or status settings that establish the operation and schedule for each of the plurality of devices. Optionally, the phrase "updated system profile" refers to a system profile in which one or more operational rules, status settings, schedules, timings, etc. are changed from a previous system profile. In embodiments, operating the computing device according to the updated system profile includes changing a status of the computing device.

Optionally, operating the computing device according to the updated system profile generates a change in the sensor data. In a specific embodiment, a sensor is a component of a device, such as a computing device or a network device. For these embodiments, receiving the sensor data optionally includes obtaining the sensor data directly from the sensor. For example, in embodiments, the operation of one or more devices changes a device output that is directly monitored by a sensor. For example, in one embodiment the system profile includes power settings for a light and the sensor data is a light level measured by a light sensor. In another embodiment, for example, the system profile includes audio volume setting for a speaker and the sensor data is a decibel level measured by a decibel meter. In general, sensors useful with the methods and systems described herein include any sensor that measures a physical quantity or property or that can detect phenomena, such as motion. For example, a variety of sensors are useful with the methods and systems described herein, including, but not limited to, an electromagnetic sensor, an optical sensor, a sound sensor, a temperature sensor, a position sensor, a level sensor, a motion sensor, a feed sensor, a distance sensor, a proximity sensor, a rotation sensor, an accelerometer, a force sensor, a torque sensor, a velocity sensor, a vibration sensor, a time sensor, a voltage sensor, a current sensor, a power sensor, a capacitance sensor, a resistance sensor, a chemical sensor, a mass sensor, a pressure sensor, a touch sensor, a particle sensor, a smoke detector, a hygrometer, a magnetic sensor, a rain sensor, a flow sensor, and any multiples of these, and any combinations of these. Optionally, the sensor data indicates a status of a device. In an exemplary embodiment, the sensor data includes a measurement of a physical quantity with the physical quantity under control or influence of at least one device. For example, in one embodiment the operation of one or more devices controls a condition within a sensing range of at least one sensor, such as one or more of a temperature, a light level, a gas flow rate, a gas amount, a liquid flow rate, a liquid amount, a mass flow rate, a mass amount, an audio level, a velocity, a force, a position, a feed amount, a voltage, a capacitance, a resistance, a pressure, a liquid level, a concentration, and the like.

In embodiments, steps of the methods of this aspect are optionally repeated. For example in one embodiment, the method further comprises receiving additional sensor data; comparing the additional sensor data with the one or more reference values; and generating a further updated system profile corresponding to operation of the plurality of devices, wherein the further updated system profile is generated using the comparison of the additional sensor data with the one or more reference values. In this way, the systems and methods described herein can perform repeated operation to allow monitoring and updating of device statuses in response to continually varying conditions or in response to scheduled changes of device operation or reference values.

Optionally, methods of this aspect further comprise a step of generating a notification, such as a notification of the updated system profile or of a status of a device. In one embodiment, generating the notification includes displaying the notification and/or generating a display of the notification. Further, methods of this aspect optionally include detecting input corresponding to a selection or modification of the updated system profile, such as a user's input acknowledging a notification or indicating a user's desired change to the system profile or to a reference value.

In another aspect, provided herein are systems, such as systems for performing the methods described herein. A specific system embodiment comprises one or more data processors; and a non-transitory computer-readable storage medium containing instructions that, when executed on the one or more data processors, cause the one or more data processors to perform operations including: receiving an initial system profile corresponding to operation of a plurality devices; operating the system according to the initial system profile; receiving sensor data; comparing the sensor data with one or more reference values; generating an updated system profile corresponding to operation of the plurality of devices, wherein the updated system profile is generated using the comparison; and transmitting the updated system profile, wherein when the updated system profile is received at the plurality of devices the system facilitates independent operation of the plurality of devices according to the updated system profile. In one embodiment, operating the system according to the updated system profile includes changing a status of the system. Optionally, operating the system according to the updated system profile generates a change in the sensor data.

In an exemplary embodiment, the system further comprises a sensor, such as a sensor in data communication with the one or more data processors for providing the sensor data to the one or more processors. In one embodiment, the sensor data includes a measurement of a physical quantity, such as a physical quantity that is controlled or influenced by operation of at least one device.

Systems of this aspect are optionally configured for repeated operation, such as to allow continuous monitoring of sensor data and updating of a system profile. In one embodiment, the operations further comprise: receiving additional sensor data; comparing the additional sensor data with the one or more reference values; and generating a further updated system profile corresponding to operation of the plurality of devices using the comparison of the additional sensor data with the one or more reference values. Optionally, the operations further comprise detecting input corresponding to a selection or a modification of the updated system profile. Optionally, the operations further comprise detecting input corresponding to a modification of the reference value.

In another aspect, provided is a computer-program product tangibly embodied in a non-transitory machine-readable storage medium, including instructions configured to cause a computing device to: receive an initial system profile corresponding to operation of a plurality devices; operate according to the initial system profile; receive sensor data; compare the sensor data with one or more reference values; generate an updated system profile corresponding to operation of the plurality of devices using the comparison; and transmit the updated system profile, wherein when the transmitted updated system profile is received at the plurality of devices the computing device facilitates independent operation of the plurality of devices according to the updated system profile. In one embodiment, the computing device includes a sensor. Optionally, the computer-program product further includes instructions configured to cause the computing device to operate according to the updated system profile. In one embodiment, the instructions configured to cause the computing device to operate according to the updated system profile include instructions configured to cause the computing device to change its status. In an embodiment, for example, the instructions configured to cause the computing device to operate according to the updated system profile cause the computing device to generate a change in the sensor data.

Optionally, the computer-program product includes instructions that cause a computing device to repeat one or more of the above described processes. For example, in one embodiment, the computer-program product further includes instructions configured to cause the computing device to: receive additional sensor data; compare the additional sensor data with the one or more reference values; and generate a further updated system profile corresponding to operation of the plurality of devices using the comparison of the additional sensor data with the one or more reference values.

Optionally, the computer-program product further includes instructions configured to cause the computing device to detect input corresponding to a selection or a modification of the updated system profile. In one embodiment, for example, the computer-program product further includes instructions configured to cause the computing device to detect input corresponding to a modification of the reference value.

In some embodiments, a computer-implemented method may be provided. The method may include receiving, at a computing device, image data and textual data corresponding to an electronic device. The image data and textual data may be analyzed, and a type of the electronic device can be analyzed based on the analysis. Usage data associated with other electronic devices of the same type may be analyzed, and further processing may be performed based on the analysis of the usage data.

In some embodiments, a system may be provided. The system may include one or more data processors and a non-transitory computer-readable storage medium containing instructions that, when executed on the one or more data processors, cause the one or more processors to perform operations including receiving image data and textual data corresponding to an electronic device. The image data and textual data may be analyzed, and a type of the electronic device can be analyzed based on the analysis. Usage data associated with other electronic devices of the same type may be analyzed, and further processing may be performed based on the analysis of the usage data.

In some embodiments, a computer-program product tangibly embodied in a non-transitory machine-readable storage medium may be provided. The computer-program product may include instructions configured to cause a data processing apparatus to receive image data and textual data corresponding to an electronic device. The image data and textual data may be analyzed, and a type of the electronic device can be analyzed or determined based on the analysis. Usage data associated with other electronic devices of the same type may be analyzed, and further processing may be performed based on the analysis of the usage data.

According to some embodiments, a power control device is provided, such as a power control device that includes a plug that receives input power, an outlet interface that provides output power to an external electronic device coupled to the outlet interface when the power control device is in a power-on state, a power draw test circuit that provides an electrical current path between the plug and the outlet interface when the power control device is in a power-off state, and a power draw detection circuit that monitors the electrical current path. The power control device may also include a controller that automatically switches the power control device from the power-off state to a power-on state in response to the power draw detection circuit detecting the external electronic device is being turned on at the external electronic device based on monitoring of the electrical current path.

According to some embodiments, a method for automatically turning on a power control device that provides power from a plug to an outlet interface for an external electronic device when the power control device is in a power-on state may include providing an electrical current path between the plug and the outlet interface via a power draw test circuit when the power control device is in a power-off state, monitoring the electrical current path with a power draw detection circuit, and automatically switching the power control device from the power-off state to a power-on state in response to detecting the external electronic device is being turned on at the external electronic device based on the monitoring of the electrical current path.

Certain aspects and features of the present disclosure further relate to a network device, such as a wirelessly-controllable home automation switch, capable of measuring electrical characteristics of power that is supplied to an electrical device controlled by the network device. The network device can perform actions and evaluate rules based on the measured electrical characteristics, which may include voltage, current, RMS power, and other possible characteristics. The network device is, optionally, able to determine whether the attached electrical device is using power, is functioning properly, how long the device is using power, and how much power the device is using. The network device, optionally, may switch on/off power supplied to the electrical device, send commands to other network devices, report power usage, estimate the cost of providing electricity to the electrical device, log power usage, and perform other tasks based on the measured electrical characteristics.

Certain aspects and features of the present disclosure also relate to a network device that is an input and output platform. The input and output platform provides various inputs and outputs that may be accessed or controlled remotely by an access device. In an embodiment, the input and output platform includes one or more relays, one or more sensors or sensor inputs, or any combination thereof, that can be accessed remotely by an access device. An access device may cause the one or more relays to actuate (e.g., open or close) on command or based on rules. The access device may also monitor and receive updates from the one or more sensors or sensor inputs. The input and output platform may further monitor and receive updates from the one or more sensors and send out network signals accordingly, such as commands to perform actions on other network devices (e.g., actuate a network device that is a switch when a certain sensor input is received). The input and output platform may be used to provide network control to any electrical device connected thereto.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by embodiments and optional features, modification and variation of the concepts herein disclosed may be resorted to by those skilled in the art, and that such modifications and variations are considered to be within the scope of this invention as defined by the appended claims.

BRIEF DESCRIPTION OF THE DRAWINGS

Illustrative embodiments of the present invention are described in detail below with reference to the following drawing figures:

FIG. 36 is a further example of a block diagram of a power control device, in accordance with some embodiments.

FIG. 37 is an example of a flow diagram of a method for power control, in accordance with some embodiments.

DETAILED DESCRIPTION

Figure 1:
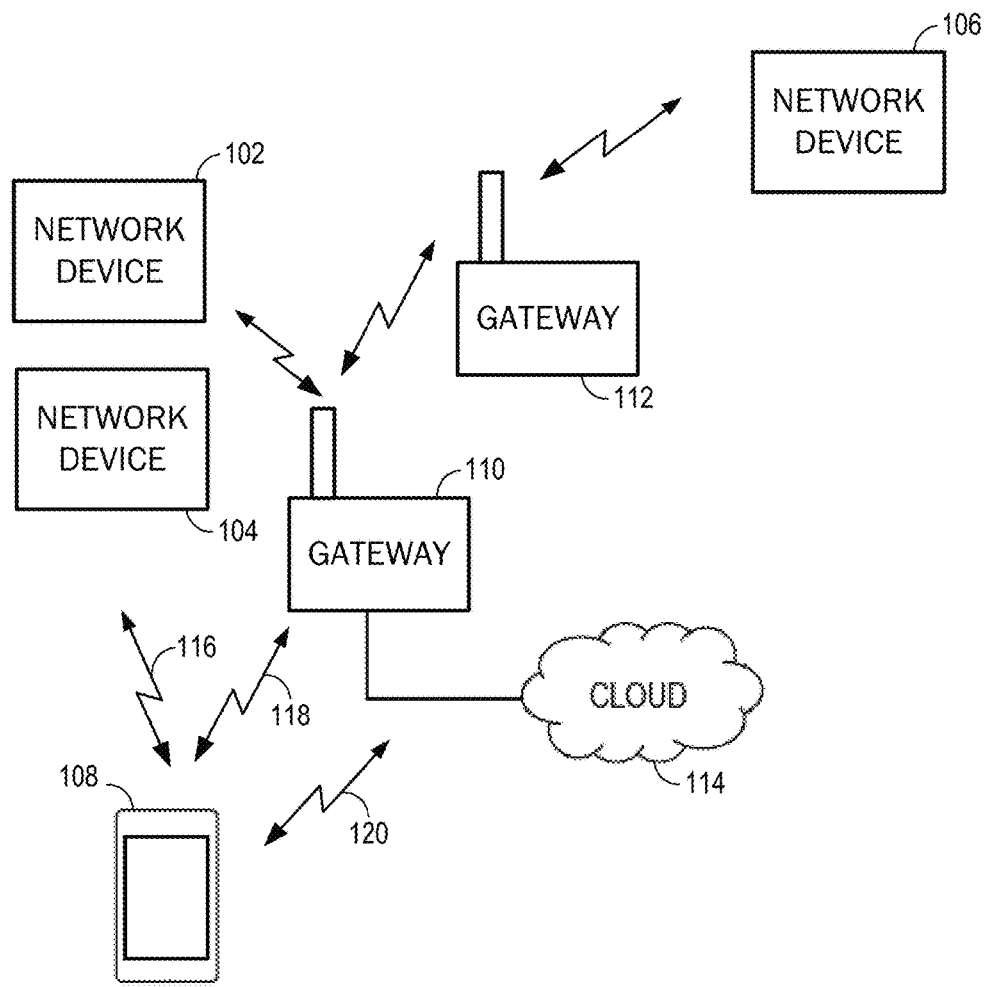
FIG. 1 is an illustration of an example of a network environment, in accordance with some embodiments.

In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process, which may be depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable storage medium or computer-readable storage medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

A network may be set up to provide an access device user with access to various devices connected to the network. For example, a network may include one or more network devices that provide a user with the ability to remotely configure or control the network devices themselves or one or more electronic devices (e.g., appliances) connected to the network devices. The electronic devices may be located within an environment or a venue that can support the network. An environment can include, for example, a home, an office, a business, an automobile, a park, or the like. A network may include one or more gateways that allow client devices (e.g., network devices, access devices, or the like) to access the network by providing wired connections and/or wireless connections using radio frequency channels in one or more frequency bands. The one or more gateways may also provide the client devices with access to one or more external networks, such as a cloud network, the Internet, and/or other wide area networks.

A local area network, such as a user's home local area network, can include multiple network devices that provide various functionalities. Network devices may be accessed and controlled using an access device and/or one or more network gateways. One or more gateways in the local area network may be designated as a primary gateway that provides the local area network with access to an external network. The local area network can also extend outside of the user's home and may include network devices located outside of the user's home. For instance, the local area network can include network devices such as exterior motion sensors, exterior lighting (e.g., porch lights, walkway lights, security lights, or the like), garage door openers, sprinkler systems, or other network devices that are exterior to the user's home. It is desirable for a user to be able to access the network devices while located within the local area network and also while located remotely from the local area network. For example, a user may access the network devices using an access device within the local area network or remotely from the local area network.

As explained herein, among other techniques, techniques are provided that allow a network device to detect electrical characteristics (e.g., voltage, current, root-mean-squared (RMS) power, and other characteristics) of the power being switchably supplied to an electrical device. The network device can perform actions based on these detected electrical characteristics, with or without comparing the detected electrical characteristics to rules. These techniques allow a user to monitor the on/off state of an electrical device when the network device is switched to supply power to the electrical device. These techniques also allow a user to remotely monitor and log electricity usage over time.

As further explained herein, a network device that is an input and output platform can provide various inputs and outputs that can be accessed or controlled remotely, through a network (e.g., a logical network or a local area network). The input and output platform can include any combination of relays, sensor inputs, or sensors, all of which can be accessed remotely, such as by an access device or another network device. The input and output platform can enable remote actuation (e.g., open or close) of the relays based on commands or rules. The input and output platform can monitor sensors or sensor inputs to provide updates to an access device or to issue commands. The input and output platform can be used to provide network control to any electrical device connected thereto. While relays are used herein, it will be understood that other electronically-controlled switching devices can be used instead of a standard relay.

In some embodiments, a user may create an account with login information that is used to authenticate the user and allow access to the network devices. For example, once an account is created, a user may enter the login information in order to access a network device in a logical network.

In some embodiments, an accountless authentication process may be performed so that the user can access one or more network devices within a logical network without having to enter network device login credentials each time access is requested. While located locally within the local area network, an access device may be authenticated based on the access device's authentication with the logical network. For example, if the access device has authorized access to the logical network (e.g., a WiFi network provided by a gateway), the network devices paired with that logical network may allow the access device to connect to them without requiring a login. Accordingly, only users of access devices that have authorization to access the logical network are authorized to access network devices within the logical network, and these users are authorized without having to provide login credentials for the network devices.

An accountless authentication process may also be performed when the user is remote so that the user can access network devices within the logical network, using an access device, without having to enter network device login credentials. While remote, the access device may access the network devices in the local area network using an external network, such as a cloud network, the Internet, or the like. One or more gateways may provide the network devices and/or access device connected to the local area network with access to the external network. To allow accountless authentication, a cloud network server may provide a network ID and/or one or more keys to a network device and/or to the access device (e.g., running an application, program, or the like). In some cases, a unique key may be generated for the network device and a separate unique key may be generated for the access device. The keys may be specifically encrypted with unique information identifiable only to the network device and the access device. The network device and the access device may be authenticated using the network ID and/or each device's corresponding key each time the network device or access device attempts to access the cloud network server.

In some embodiments, a home local area network may include a single gateway, such as a router. A network device within the local area network may pair with or connect to the gateway and may obtain credentials from the gateway. For example, when the network device is powered on, a list of gateways that are detected by the network device may be displayed on an access device (e.g., via an application, program, or the like installed on and executed by the access device). In this example, only the single gateway is included in the home local area network (e.g., any other displayed gateways may be part of other local area networks). In some embodiments, only the single gateway may be displayed (e.g., when only the single gateway is detected by the network device). A user may select the single gateway as the gateway with which the network device is to pair and may enter login information for accessing the gateway. The login information may be the same information that was originally set up for accessing the gateway (e.g., a network user name and password, a network security key, or any other appropriate login information). The access device may send the login information to the network device and the network device may use the login information to pair with the gateway. The network device may then obtain the credentials from the gateway. The credentials may include a service set identifier (SSID) of the home local area network, a media access control (MAC) address of the gateway, and/or the like. The network device may transmit the credentials to a server of a wide area network, such as a cloud network server. In some embodiments, the network device may also send to the server information relating to the network device (e.g., MAC address, serial number, or the like) and/or information relating to the access device (e.g., MAC address, serial number, application unique identifier, or the like).

The cloud network server may register the gateway as a logical network and may assign the first logical network a network identifier (ID). The cloud network server may further generate a set of security keys, which may include one or more security keys. For example, the server may generate a unique key for the network device and a separate unique key for the access device. The server may associate the network device and the access device with the logical network by storing the network ID and the set of security keys in a record or profile. The cloud network server may then transmit the network ID and the set of security keys to the network device. The network device may store the network ID and its unique security key. The network device may also send the network ID and the access device's unique security key to the access device. In some embodiments, the server may transmit the network ID and the access device's security key directly to the access device. The network device and the access device may then communicate with the cloud server using the network ID and the unique key generated for each device. Accordingly, the access device may perform accountless authentication to allow the user to remotely access the network device via the cloud network without logging in each time access is requested. Also, the network device can communicate with the server regarding the logical network.

In some embodiments, a local area network may include multiple gateways (e.g., a router and a range extender) and multiple network devices. For example, a local area network may include a first gateway paired with a first network device, and a second gateway paired with a second network device. In the event credentials for each gateway are used to create a logical network, a server (e.g., a cloud network server) may register the first gateway as a first logical network and may register the second gateway as a second logical network. The server may generate a first network ID and a first set of security keys for the first logical network. The first set of security keys may include a unique security key for the first network device and a unique security key for the access device for use in accessing the first network device on the first logical network. The server may register the second gateway as the second logical network due to differences in the credentials between the first gateway and second gateway. The server may assign the second gateway a second network ID and may generate a second set of security keys. For example, the server may generate a unique security key for the second network device and may generate a unique security key for the access device for use in accessing the second network device on the second logical network. The server may associate the first network device and the access device with the first logical network by storing the first network ID and the first set of security keys in a first record or profile. The server may also associate the second network device and the access device with the second logical network by storing the second network ID and the second set of security keys in a record or profile. The server may then transmit the first network ID and the first set of security keys to the first network device, and may transmit the second network ID and the second set of security keys to the second network device. The two network devices may store the respective network ID and set of security keys of the gateway with which each network device is connected. Each network device may send the respective network ID and the access device's unique security key to the access device. The network devices and the access device may then communicate with the cloud server using the respective network ID and the unique key generated for each device.

Accordingly, when multiple gateways are included in the home local area network, multiple logical networks associated with different network identifiers may be generated for the local area network. When the access device is located within range of both gateways in the local area network, there is no problem accessing both network devices due to the ability of the access device to perform local discovery techniques (e.g., universal plug and play (UPnP)). However, when the user is located remotely from the local area network, the access device may only be associated with one logical network at a time, which prevents the access device from accessing network devices of other logical networks within the local area network.

A computing device (e.g., a user device such as a cellular phone) may determine that one or more network devices are connected to the local area network. The determination may be made based on whether the computing device is located within the wireless network of the device or located remote from the wireless network. The computing device may have access to the wireless network based on its authentication with a logical network which enables access to the wireless network. In some embodiments, the computing device may perform local network discovery while within the wireless network to identify the devices connected to the network. Upon determining that the computing device is not located within the network, the computing device can determine the devices in the network by communication with a cloud network to obtain information about the devices on the network. The cloud network can store a status of devices on the network. The computing device can also determine devices on the network by accessing a local cache that can contain information it has previously received about devices known to exist on the network. The computing device can determine a status of the devices based on its local cache, information received from the cloud, or by direct communication with the devices within the local network. The computing device can access status information from the local cache to present in a display to a user.

The computing device may execute an application that can cause the computing device to present a graphical interface including information (e.g., status, name, icon, etc.) about devices discovered on the network. The graphical interface can present a visual interface for each device accessible on the network. In some embodiments, the visual interface corresponding to a network device can be rendered as a modular tile with one or more interactive elements and/or one or more interactive areas to control operation of the device. The visual interface corresponding to a network device can provide a status or state of the network device (e.g., on/off). Information displayed in a visual interface can include, for example, a default icon, a default name, interactive elements, and/or interactive areas for controlling one or more functionalities of a network device. The functionalities can include, for example, powering the network device on and off. The functionalities can enable adjustment of adjustable attributes and/or settings for a device. For example, a device can be a light bulb, for which attributes or settings (e.g., brightness) can be controlled via the tile.

In some embodiments, updated information can be provided that causes the information displayed in a tile corresponding to a network device to be modified. The updated information may include updated image data, textual data, and/or a status of the device. In some embodiments, updated image data (e.g., a photo of an electronic device such as an appliance coupled to the network device) and textual data (e.g., a description of the electronic device) provided by a user may replace the default icon and default name received and displayed when the network device was first discovered on the network.

As described herein, techniques are provided that allow the type of an electronic device to be identified so that usage data associated with other electronic device of the same type may be identified and analyzed. For example, a type of an electronic device may be identified using image and textual analysis. It may be desirable to identify the type of the electronic device to identify other electronic devices of the same type so that usage of the other electronic devices can be analyzed and recommendations (e.g., rules, settings, etc.) or other content related to usage of the electronic device can be provided. The techniques described herein may help identify the types of electronic devices using image data and textual data and may use the identification to enhance the operability of the electronic device, thus streamlining the customization process associated with the local area network (e.g., automation network) and improving utilization of device functionalities in addition to optimization of rules and other device settings.

Accordingly, techniques and systems are described herein for identifying a type of an electronic device using image data and text data associated with the electronic device, identifying other electronic devices of the same type, and analyzing usage data associated with the other electronic devices to provide content (e.g., recommendations) related to usage of the electronic device.

In some embodiments, the network device contains a power detector coupled to a processor (e.g., a combined CPU/Radio) for measuring one or more electrical characteristics of electricity being supplied to an electrical device coupled to the network device. The power detector can be capable of detecting the voltage supplied, current supplied, true power, power factor, RMS power, and other information related to the electrical power supplied to the electrical device.

In some embodiments, the power detector is an integrated circuit coupled to the processor through an isolator (e.g., an optocouple) to isolate the high voltages passing through the power detector from the low-voltage parts and/or any user-accessible contacts (e.g., the ground of a USB port) of the network device. The power detector can output a digital signal readable by a general purpose input/output (GPIO) pin of the processor. In some embodiments, the power detector is selected to have a usable range matching or exceeding the usable range of the relay (e.g., a mechanical relay or other switching equipment) of the network device.

In some embodiments, the power detector includes a shunt resistor of known resistance (e.g., a micro-ohm resistor) is placed in-line with the relay or otherwise in series with the one or more contacts connectable to the electrical device. The power detector can include a voltage measurement device to determine the voltage drop across the shunt resistor, thus being able to determine the current. The power detector can include other circuitry to measure voltage being supplied to the electrical device, as well as phase angle. The power detector and/or another processor can also determine true or RMS or reactive power.

In some embodiments, the power detector can include a primary coil of a current transformer coupled to a neutral line of the network device or otherwise in series with the one or more contacts connectable to the electrical device. As current flows through the current transformer, an induced-voltage can be measured in the secondary coil.

In some embodiments, the power detector can include a current clamp. A current clamp may be used without an isolator. When a current clamp is used, the voltage being supplied to the electrical device may be measured or may be assumed.

In some embodiments, the power detector can include a non-calibrated sensor, such as a hall effect sensor, positioned adjacent an electrical line (e.g., line or neutral) of the electrical circuit supplying power to the electrical device. The non-calibrated sensor (e.g., a hall effect sensor) can be glued to a line or neutral trace on a circuit board within the network device. The non-calibrated sensor may be used without an isolator. The non-calibrated sensor can be used to discern between high and low power being supplied to the electrical device without providing exact numbers.

In some embodiments, the power detector can include an optoisolator including a light-emitting diode (LED) configured to adjust in brightness depending on the amount of power flowing through the circuit to the electrical device. The optoisolator can include an optical sensor that provides a signal corresponding to the brightness of the LED, and thus the amount of power flowing through the circuit to the electrical device.

In other embodiments, the power detector can include any suitable current/voltage transducer capable of providing calibrated or non-calibrated measurements of electrical characteristics of the power being supplied to the electrical device.

In some embodiments, the voltage provided to the electrical device can be measured by the power detector. In other embodiments, the voltage can be assumed based on a user entry (e.g., a user's response to a prompt when setting up the network device or a user-customizable setting of the network device), a country (e.g., determined through a geolocation or set by the user), or any other suitable way of determining an assumed voltage. In some embodiments, the network device can assume a voltage based on information received from another network device (e.g., from a previously-installed network device using an assumed voltage or from another network device having voltage-measuring capabilities).

The power detector can include any combination of elements described above. The power detector can be incorporated into a network device that is a plug-in style switch, such as that depicted in FIGS. 6A, 6B, 7A, 7B, and 8. The power detector can be incorporated into a network device that is an inline style switch, such as that depicted in FIG. 38. In some embodiments, inline style switches can be integrated into wall sockets (e.g., a standard wall outlet), wall switches (e.g., standard room light switch), or the electronic devices themselves (e.g., integrated into a circuit board of an appliance). The power detector can be incorporated into a network device that provides power to an electrical device from any suitable power source (e.g., mains power, battery power, solar power, and others).

In some embodiments, the power detector and/or processor can determine the amount of energy supplied to the electrical device (e.g., in watt-hours). As used herein, the term electrical characteristic data includes both raw data (e.g., measured current, measured voltage, and assumed voltage) and calculated data (e.g., power and energy).

In some embodiments, the network device can perform actions based on or in response to detecting electrical characteristics. Examples of suitable actions include actuating one or more relays of the network device (e.g., turning on/off the electrical device), transmitting a command (e.g., commanding another network device to turn on/off another attached electrical device), logging electrical characteristic data (e.g., to create a logfile of historical electrical characteristic data), and reporting electrical characteristic data (e.g., indicating the electrical device is on and/or providing information about its power usage). The network device can perform other actions as well. An action can include one or more sub-actions performed simultaneously, sequentially, or with predetermined and/or dynamic delays. Each sub-action can be an action as described herein. For example, an action to turn off power supplied by the network device can include a first sub-action to turn off the power and a second sub-action to turn back on the power supplied by the network device at a later time.

In an example, a network device can transmit information pertaining to the on/off state of an attached electrical device to an access device, allowing a user to know the on/off state of the electrical device. In such an example, simply knowing whether the network device is supplying power to the electrical device (e.g., the relay in the network device is switched to closed) may not be indicative of the on/off state of the electrical device. For example, a lamp plugged into a network device may be switched off at the lamp itself, therefore not turning "on" when the network device is switched to "on." Also, some electrical devices may have multi-state on/off states. For example, a television or other modern electronic appliance may have three on/off states: 1) off, 2) standby on, and 3) full on. A network device can transmit information indicating that the television is in the off state, standby on state, or full on state based on the amount of power being used by the electrical device. An electrical device can have more than three on/off states (e.g., a heater may have many on/off states, such as off, on low, on low-medium, on medium, on high-medium, and on high).

In another example, a network device may log electrical characteristic data in response to detecting electrical characteristic data. The network device may generate and/or append to a logfile that is stored within a memory of the network device and/or a memory accessible to the network device (e.g., a server or access device). Such electrical characteristic data can include current draw over time, voltage supplied over time, power used over time, energy used over time, and any other historical data. Such historical data can also include logs such as the times whenever the electrical device was in a particular on/off state (e.g., log each time the electrical device is turned on). The network device can record and associate additional information in the logfile along with the electrical characteristic data, such as IP address, time of day, temperature, on/off state of the network device, wireless signal, SSID, or any other data accessible to the network device that is not directly related to the detected electrical characteristics.

In another example, the network device can provide energy usage information of the electrical device to the user, such as through an access device. The energy usage information can include the watt-hours used by the electrical device (e.g., current usage, average usage, and projected usage), as well as the approximate cost of the energy to run the electrical device (e.g., current costs, average cost, and projected cost). In some embodiments, a network device can supply power from a battery or other limited power source (e.g., limited in amount of energy, like a battery, or rate of power output, like a solar cell). In such embodiments, electrical characteristics determinable by the network device include estimate energy or power remaining in the limited power source and amount of time available to continue to power the electrical device. For example, a network device providing power to a light from a battery can report to the user the number of hours of usable light remaining, as well as perform other actions (e.g., turn off the light when the battery drops so that only 20 minutes of usable light are remaining).

In some embodiments, the actions performed are based on rules. Rules can be loaded in a memory and/or cache of the network device, or otherwise accessible to the network device. Rules can be prepopulated and/or programmed by a user (e.g., via an access device). Rules can trigger certain actions when a certain electrical characteristic is detected (e.g., send a text message when a television attached to the network device is switched from a standby state, using a small amount of power, to an on state, using a larger amount of power). In some embodiments, the network device can run and evaluate rules when not currently connected to a network.

In an example, a rule can be established to turn off the power supplied from network device whenever an attached electrical device is in an on state for more than a set period of time, such as 60 minutes. Such a rule can be useful, for example if a user wants to use a particular network device to switch power to a dangerous electrical device such as a clothes iron or a curling iron. If a user inadvertently leaves the iron or curling iron "on" for too long (e.g., 60 minutes), the network device will switch off power supplied to the electrical device, thus reducing the chance of accidental damage to person and/or property.

In another example, a rule can be established to cause the network device to act as a programmable circuit breaker by having the network device remove power to the electrical device whenever the current exceeds a preset limit. For example, the network device can automatically disallow (e.g., remove supplied power to) electrical devices that draw too much power. In some embodiments, the network device can be programmed remotely, via an access device. In some embodiments, multiple network devices can communicate with one another to remove power to one or all electrical devices attached to the multiple network devices whenever the total amount of power drawn is above a preset limit.

In another example, a rule can be established to cause the network device to initiate an action whenever an attached electrical device's electrical characteristic matches a certain pattern. For example, a network device attached to a washing machine can include a rule enabling the network device to sense a pattern of electrical characteristics that match the washing machine moving into a spin cycle. The network device can then, or after a pre-programmed delay, initiate an action (e.g., send a command to initiate a text message, to turn on/off a light in another room, and/or to push a notification to an access device). In this way, a user can be notified in advance that the washing machine is almost finished. The pattern of electrical characteristics can be selected from a collection of predetermined patterns or can be sensed by the network device (e.g., during setup or rule creation).

In another example, a rule can be established to perform a certain action in response to historical electrical characteristic data. For example, a rule can be established to turn off an electrical device whenever that electrical device has been in a certain on/off state for a predetermined amount of time (e.g., to allow children to watch television for only 1 hour each day) or when a certain amount of energy has been used (e.g., to limit use of a particular electronic to only a certain amount of energy per month, such as in watt-hours, or a certain amount of cost per month, such as based on cost of energy).

In another example, a rule can be established to perform a certain action (e.g., provide a notification) whenever energy usage of an attached electrical device exceeds a preset limit during certain time frames. For example, a network device can notify a user, or perform another action, whenever the attached electrical device's current energy usage exceeds a preset limit during peak hours when energy costs are higher than normal.

In some embodiments, the network device can include rules that are based in part on information from another network device, as well as detected energy characteristics. For example, a network device can be programmed with a rule enabling the network device to perform an action whenever the attached electrical device is in a particular on/off state and motion has not been sensed by another network device. In this example, the network device can send a notice to an access device or can turn off the electrical device whenever a clothes iron is detected as being on and no motion has been sensed in that room for a predetermined amount of time. In another example, a network device can be programmed with a rule enabling the network device to perform an action whenever the attached electrical device is in a particular on/off state and another electrical device that is attached to another network device is in a particular on/off state.

In some embodiments, the network device can identify the electric device based on unique electrical characteristics of that electric device. The unique electrical characteristics can be currently detected characteristics or historical characteristics (e.g., over the period of a few minutes, hours, or days). To identify the electric device, the network device can compare the detected electrical characteristics with known electrical characteristic patterns in a database. The database can be stored on the network device or otherwise accessible to the network device (e.g., available on the cloud). For example, when a user plugs a television into a network device, the network device may be able to compare the pattern of current draw while the television is switched from standby on to full on with a known pattern to identify the attached electrical device as a television or a particular brand or model of television. Other characteristics and patterns can be compared. A user can be prompted with a narrowed list of possibly attached electric devices from which the user can select the correct electric device or add their own.

In some embodiments, the network device and/or an access device can initiate a setup phase wherein the user can be prompted with actions to perform for the network device to recognize the electric device, such as "turn off, wait ten seconds, turn on, wait ten second, turn off again." The network device can then detect the pattern of electrical characteristics that occur while the user is performing the requested actions. In some embodiments, a user can submit detected electrical characteristics along with the name, type, brand, model, and/or other information corresponding to the user's electrical device to a server (e.g., the cloud) in order to add the unique electrical characteristics of the user's electrical device to the database of known electrical characteristic patterns.

The network device can perform an action based on identifying the electrical device. Such actions can include any suitable actions, such as modifying a rule, modifying a customization, or performing any other action described herein.

Modifying a rule (e.g., creating a new rule, modifying an existing rule, or deleting an existing rule) can be based on the identified electrical device. For example, whenever a particular television is detected, the network device can set rules to automatically turn on another electrical device (e.g., a stereo component) whenever the power drawn from the television is above a certain amount (e.g., indicating the television is in a full on state). In another example, when a network device identifies a particular attached electronic device, it can set a rule to turn off power to the electrical device if the electrical device draws power over a certain limit (e.g., act as a programmable circuit breaker). In this example, the network device can act as a programmable circuit breaker with different limits that are based on whichever electrical device is plugged in or otherwise attached to the network device.

In some embodiments, modifying a rule can include selecting a rule to apply based on a set of user-created rules based on identifying the electrical device. For example, a user can set up rules that are specific to a particular identified electrical device. Whenever that identified electrical device is plugged into the network device, the network device will activate and/or use those rules. If another electrical device is plugged into the network device, the network device will not use those rules, but may use other rules specific to the other electrical device.

In some embodiments, a network device can share rules specific to an identified electrical device with another network device. In such embodiments, rules can be set for an identified electrical device. When the identified electrical device is plugged into a first network device, the first network device can use the rules specific to that identified electrical device. If the identified electrical device is removed from the first network device and plugged into a second network device, the second network device can use the rules specific to the identified electrical device. Such rules can be pre-loaded into memory of the second network device or can be loaded on demand when the second network device identifies the specific electrical device. Therefore, it can appear to a user that certain rules follow the electrical device (e.g., always turn off the clothes iron if it has been left on for an hour) regardless of which network device is used to supply power to the electrical device.

Modifying a customization (e.g., a user-settable name, image, or other setting) can be based on the identified electrical device. For example, whenever a particular television is detected, the network device can set the name of the device as "Television" and can populate the image presented to a user for that device as a picture of a generic television. Whenever a user attempts to access the network device using an access device, the network device can present the user with the name "Television" and the picture of the television on the user's access device. Other actions can be performed based on identifying the electrical device.

As described above, electrical characteristics can be logged and stored as historical electrical characteristic data. That data can be reported to a user, such as being downloaded by a user, by being transmitted to an access device or a server, or by being sent as a communication (e.g., bundled in an email). In some embodiments, the data can be reported when demanded or on a regular basis (e.g., based on time, number of events, or filesize). In some embodiments, the data can be downloaded by a user through a port on the network device. In some embodiments, the data can be downloaded through a USB port on the network device. In some embodiments, the data can be transmitted to an access device. In some embodiments, the data can be transmitted to the cloud or another network device.

Accordingly, techniques and systems are described herein related to a network device that is an input and output platform. The input and output platform can provide various inputs and outputs that can be accessed remotely or can be used to issue commands across the network.

In some embodiments, the network device can allow any electrical device having a circuit to be controlled by coupling the electrical contacts of a relay of the input and output platform to the circuit to complete the circuit when the relay is closed. As an example, a computer may have a power button that turns on the computer when depressed. The electrical contacts of this power button can be coupled to the electrical contacts of the relay of an input and output platform, thus enabling the input and output platform to turn the computer on and off. An access device can be used to send a signal to the input and output platform that causes the input and output platform to open or close the relay, thus opening or closing the circuit of the computer's power button. The relay of the input and output platform can be controlled by another network device, such as a separate network device having a button or switch that is capable of sending a signal to the input and output platform to actuate the relay when the button or switch of the separate network device is actuated. In some instances, a rule can automatically cause the input and output platform's relay to actuate in response to a condition, such as in response to a power spike or power outage (e.g., to turn the computer back on after a power outage, or to turn the computer off for a period of time when a power spike is sensed). In some cases, the condition can be sensed by the input and output platform (e.g., via a sensor or sensor input), or the condition can be sensed by a separate network device.

The input and output platform can have one relay or many relays. The input and output platform can be configured to operate each of the one or more relays using various control schemes. Control of a relay can be toggle control, where the relay can be used to indefinitely close a circuit or open a circuit. Control of a relay can be momentary control, where the relay can be used to temporarily close or open a circuit for a preset period of time. Control of a relay can be variable momentary control, where the relay can be used to temporarily close or open a circuit for a configurable period of time. The various control schemes can be configurable. The input and output platform can be capable of reporting the state of any of the one or more relays (e.g., open or closed). As used herein, the term "preset" can be used to represent a value or setting that is not configurable by the user, whereas the term "configurable" can be used to represent a value or setting that can be changed by a user.

In some embodiments, the input and output platform can have one or more sensor inputs. Each sensor input can accept a signal (e.g., an analog signal) from sensor coupled thereto. Examples of suitable sensors include temperatures sensors, passive infrared sensors, fluid presence sensor, microphone, pressure switch, or any other sensor. In some embodiments, the sensor input can accept a digital signal. In some embodiments, the input and output platform can have one or more sensors, such as those sensors mentioned above, built into the input and output platform itself.

In some embodiments, the input and output platform can have one or more outputs. In an embodiment, the input and output platform can include an infrared (IR) light emitting diode (LED) that can transmit infrared signals to another device (e.g., to an electrical device having an IR receiver for performing actions in response to sensing IR signals). For example, an input and output platform with an IR LED can be used to mimic IR remote control signals to control an electronic device, such as a television. Thus, an access device can be used to remotely control the electronic device through the input and output platform.

The input and output platform can be powered using any suitable power supply. In some embodiments, the input and output platform can be powered by a 5 volt power supply through a universal serial bus (USB) port. In some embodiments, the input and output platform can be powered by batteries, by a solar panel, or by a mains power adaptor. Other suitable power supplies can be used.

In some embodiments, the input and output platform has a power output. The power output can be a 5 volt output capable of powering small electronic devices. In some embodiments, the power output can supply power to an electronic device coupled to a relay or a sensor input of the input and output platform. In some embodiments, the power output can supply power to another input and output platform.

In some embodiments, the input and output platform can store identification information related to the usage of each of its relays, sensors, or sensor inputs. The identification information can be any user-identifiable information used to convey the meaning of any functions of the input and output platform. For example, a relay can include an identifying label (e.g., "Computer Power") indicating what the relay controls, a sensor can include possible settings (e.g., "Low" to "High") that are based on the values sensed through the sensed input (e.g., with a temperature sensor attached), or a sensor can include an alert label (e.g., "Water is leaking out of the water heater"). Other identification information can be stored by the input and output platform. When accessing the input and output platform, the access device can display relevant information, including any identification information. In some embodiments, the input and output platform can generate signals or commands using the identification information (e.g., to send an email or text message based on a rule).

In one example, a rule can be stored on an input and output platform and can be based on two sensor inputs, one for a water sensor and one for a temperature sensor. The water sensor and temperature sensor can be placed in an optimal location for sensing leaks at a water heater (e.g., on the ground near the water heater). If the water sensor senses water and the temperature sensor is below a certain level (e.g., 95° F.), the input and output platform can perform an action and provide identification information saying "Water is leaking out of the water heater's intake valve." As part of the same rule or another rule, if the water sensor sense water and the temperature sensor is at or above a certain level (e.g., 95° F.), the input and output platform can perform an action and provide identification information saying "Water is leaking out of the water heater's main tank." Other identification information can be provided for each of these rules, and other rules can be used. Performing an action can include performing an action on the input and output platform (e.g., opening or closing a relay), communicating with a network device (e.g., causing a separate network device to turn on or off a light), communicating with an access device (e.g., sending an alert to an access device), or sending some other network signal (e.g., sending an email). Other actions can be performed, such as actuating an electromechanical, hydraulic, or pneumatic solenoid.

In another example, the same input and output platform can be reprogrammed to use a single sensor input that receives a sensor signal from a photodiode. The input and output platform can be programmed with a rule that performs an action whenever the photodiode ceases to sense light, such as closing a relay of the input and output platform, turning on a separate network device (e.g., porch light), or sending an alert to an access device. Other actions can be performed.

In some embodiments, the input and output platform can be programmed with information about what is coupled to each terminal of the input and output platform. This information can include what type of circuit is coupled to each relay. This information can include what type of sensor is coupled to each sensor input. The input and output platform can download or receive identification information, such as from an access device or server, based on the type of sensor that is indicated as being coupled to a particular sensor input. The input and output platform can further download or receive pre-programmed rules or rule shells based on the type of sensor that is indicated as being coupled to a particular sensor input. Types of sensors can be any suitable type of sensor. Types of sensors can be indicative of how the input and output platform is able to sense change in the sensor. Changes in the sensors can be changes in voltage, resistance, capacitance, or other changes. Each sensor input can be provided through a single terminal (e.g., when comparing a sensor's input to ground), a pair of terminals, or any suitable number of terminals.

The input and output platform itself can be located within an enclosure that provides access to terminals, outputs, power inputs, and buttons. The enclosure can include an external antenna. The enclosure can include a clean side and a functional side. The clean side can present only the most-used day-to-day functions of the input and output platform, such as access to the power LED and a primary button. Other functions, such as a restore button and terminals, can be positioned on the functional side, for example. The enclosure can include attachment points so that the enclosure can be mounted with the clean side, the functional side, or either side facing out. A user may desire that only the clean side be facing out (e.g., towards a user or towards a room) after the input and output platform is fully programmed and in use. The user may instead desire the functional side to be facing out while the input and output platform is being programmed or during troubleshooting. For example, the front face or clean side, as well as the remainder of the enclosure, can be shaped to allow the enclosure to rest on a flat surface (e.g., a table or desk) with the clean side facing towards the flat surface (e.g., the clean side facing downwards and the functional side facing upwards). A primary button can be included on both the functional side and the clean side such that the primary button can be pressed without the need to lift up or move the enclosure, such as during programming or troubleshooting. Such an enclosure can allow for the input and output platform to present a functional side (e.g., a rear side) to a user that has access to all necessary terminals, outputs, inputs, or buttons, while also allowing the enclosure to be mounted in a way that is visually appealing when access to all the terminals, outputs, inputs, or buttons is not needed (e.g., by mounting the enclosure with the clean side, such as a front side, facing out).

In some embodiments, the input and output platform can be coupled to another input and output platform or to an expansion platform. Such coupling can be used to expand the capability of one input and output platform, such as by allowing the first input and output platform to control additional relays, have access to additional sensors or sensor inputs, or any combination thereof, of the second input and output platform or the expansion platform. An expansion platform can include a processor, but need not include a processor. A second input and output platform coupled to a first input and output platform can operate as a follower device (e.g., slave device) and may not directly connect to the network, but rather be controlled wholly by the first input and output platform (e.g. a leader device or a master device).

FIG. 1 illustrates an example of a local area network 100. The local area network 100 includes network device 102, network device 104, and network device 106. In some embodiments, any of the network devices 102, 104, 106 may include an Internet of Things (IoT) device. As used herein, an IoT device is a device that includes sensing and/or control functionality as well as a WiFi™ transceiver radio or interface, a Bluetooth™ transceiver radio or interface, a Zigbee™ transceiver radio or interface, an Ultra-Wideband (UWB) transceiver radio or interface, a WiFi-Direct transceiver radio or interface, a Bluetooth™ Low Energy (BLE) transceiver radio or interface, an infrared (IR) transceiver, and/or any other wireless network transceiver radio or interface that allows the IoT device to communicate with a wide area network and with one or more other devices. In some embodiments, an IoT device does not include a cellular network transceiver radio or interface, and thus may not be configured to directly communicate with a cellular network. In some embodiments, an IoT device may include a cellular transceiver radio, and may be configured to communicate with a cellular network using the cellular network transceiver radio. The network devices 102, 104, 106, as IoT devices or other devices, may include home automation network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In some embodiments, network devices 102, 104, 106 may be used in other environments, such as a business, a school, an establishment, a park, or any place that can support the local area network 100 to enable communication with network devices 102, 104, 106. For example, a network device can allow a user to access, control, and/or configure devices, such as office-related devices (e.g., copy machine, printer, fax machine, or the like), audio and/or video related devices (e.g., a receiver, a speaker, a projector, a DVD player, a television, or the like), media-playback devices (e.g., a compact disc player, a CD player, or the like), computing devices (e.g., a home computer, a laptop computer, a tablet, a personal digital assistant (PDA), a wearable device, or the like), lighting devices (e.g., a lamp, recessed lighting, or the like), devices associated with a security system, devices associated with an alarm system, devices that can be operated in an automobile (e.g., radio devices, navigation devices), and/or the like.

A user may communicate with the network devices 102, 104, 106 using an access device 108. The access device 108 may include any human-to-machine interface with network connection capability that allows access to a network. For example, the access device 108 may include a stand-alone interface (e.g., a cellular telephone, a smartphone, a home computer, a laptop computer, a tablet, a personal digital assistant (PDA), a computing device, a wearable device such as a smart watch, a wall panel, a keypad, or the like), an interface that is built into an appliance or other device e.g., a television, a refrigerator, a security system, a game console, a browser, or the like), a speech or gesture interface (e.g., a Kinect™ sensor, a Wiimote™, or the like), an IoT device interface (e.g., an Internet enabled device such as a wall switch, a control interface, or other suitable interface), or the like. In some embodiments, the access device 108 may include a cellular or other broadband network transceiver radio or interface, and may be configured to communicate with a cellular or other broadband network using the cellular or broadband network transceiver radio. In some embodiments, the access device 108 may not include a cellular network transceiver radio or interface. While only a single access device 108 is shown in FIG. 1, it will be appreciated that multiple access devices may communicate with the network devices 102, 104, 106. The user may interact with the network devices 102, 104, or 106 using an application, a web browser, a proprietary program, or any other program executed and operated by the access device 108. In some embodiments, the access device 108 may communicate directly with the network devices 102, 104, 106 (e.g., communication signal 116). For example, the access device 108 may communicate directly with network device 102, 104, 106 using Zigbee™ signals, Bluetooth™ signals, WiFi™ signals, infrared (IR) signals, UWB signals, WiFi-Direct signals, BLE signals, sound frequency signals, or the like. In some embodiments, the access device 108 may communicate with the network devices 102, 104, 106 via the gateways 110, 112 (e.g., communication signal 118) and/or the cloud network 114 (e.g., communication signal 120).

The local area network 100 may include a wireless network, a wired network, or a combination of a wired and wireless network. A wireless network may include any wireless interface or combination of wireless interfaces (e.g., Zigbee™, Bluetooth™, WiFi™, IR, UWB, WiFi-Direct, BLE, cellular, Long-Term Evolution (LTE), WiMax™, or the like). A wired network may include any wired interface (e.g., fiber, Ethernet, powerline Ethernet, Ethernet over coaxial cable, digital signal line (DSL), or the like). The wired and/or wireless networks may be implemented using various routers, access points, bridges, gateways, or the like, to connect devices in the local area network 100. For example, the local area network may include gateway 110 and gateway 112. Gateway 110 or 112 can provide communication capabilities to network devices 102, 104, 106 and/or access device 108 via radio signals in order to provide communication, location, and/or other services to the devices. The gateway 110 is directly connected to network 114 and may provide other gateways and devices in the local area network with access to network 114. The gateway 110 may be designated as a primary gateway. While two gateways 110 and 112 are shown in FIG. 1, it will be appreciated that any number of gateways may be present within the local area network 100.

The network access provided by gateway 110 and gateway 112 may be of any type of network familiar to those skilled in the art that can support data communications using any of a variety of commercially-available protocols. For example, gateways 110, 112 may provide wireless communication capabilities for the local area network 100 using particular communications protocols, such as WiFi™ (e.g., IEEE 802.11 family standards, or other wireless communication technologies, or any combination thereof). Using the communications protocol(s), the gateways 110, 112 may provide radio frequencies on which wireless enabled devices in the local area network 100 can communicate. A gateway may also be referred to as a base station, an access point, Node B, Evolved Node B (eNodeB), access point base station, a Femtocell, home base station, home Node B, home eNodeB, or the like.

The gateways 110, 112 may include a router, a modem, a range extending device, and/or any other device that provides network access among one or more computing devices and/or external networks. For example, gateway 110 may include a router or access point, and gateway 112 may include a range extending device. Examples of range extending devices may include a wireless range extender, a wireless repeater, or the like.

A router gateway may include access point and router functionality, and may further include an Ethernet switch and/or a modem. For example, a router gateway may receive and forward data packets among different networks. When a data packet is received, the router gateway may read identification information (e.g., a media access control (MAC) address) in the packet to determine the intended destination for the packet. The router gateway may then access information in a routing table or routing policy, and may direct the packet to the next network or device in the transmission path of the packet. The data packet may be forwarded from one gateway to another through the computer networks until the packet is received at the intended destination.

A range extending gateway may be used to improve signal range and strength within a local area network. The range extending gateway may receive an existing signal from a router gateway or other gateway and may rebroadcast the signal to create an additional logical network. For example, a range extending gateway may extend the network coverage of the router gateway when two or more devices on the local area network need to be connected with one another, but the distance between one of the devices and the router gateway is too far for a connection to be established using the resources from the router gateway. As a result, devices outside of the coverage area of the router gateway may be able to connect through the repeated network provided by the range extending gateway. The router gateway and range extending gateway may exchange information about destination addresses using a dynamic routing protocol.

The gateways 110 and 112 may also provide the access device 108 and the network devices 102, 104, 106 with access to one or more external networks, such as the cloud network 114, the Internet, and/or other wide area networks. In some embodiments, the network devices 102, 104, 106 may connect directly to the cloud network 114, for example, using broadband network access such as a cellular network. The cloud network 114 may include a cloud infrastructure system that provides cloud services. In certain embodiments, services provided by the cloud network 114 may include a host of services that are made available to users of the cloud infrastructure system on demand, such as registration and access control of network devices 102, 104, 106. Services provided by the cloud infrastructure system can dynamically scale to meet the needs of its users. The cloud network 114 may comprise one or more computers, servers, and/or systems. In some embodiments, the computers, servers, and/or systems that make up the cloud network 114 are different from the user's own on-premises computers, servers, and/or systems. For example, the cloud network 114 may host an application, and a user may, via a communication network such as the Internet, on demand, order and use the application.

In some embodiments, the cloud network 114 may host a Network Address Translation (NAT) Traversal application in order to establish a secure connection between the cloud network 114 and one or more of the network devices 102, 104, 106. For example, a separate secure Transmission Control Protocol (TCP) connection may be established by each network device 102, 104, 106 for communicating between each network device 102, 104, 106 and the cloud network 114. In some embodiments, each secure connection may be kept open for an indefinite period of time so that the cloud network 114 can initiate communications with each respective network device 102, 104, or 106 at any time. In some cases, other types of communications between the cloud network 114 and the network devices 102, 104, 106 and/or the access device 108 may be supported using other types of communication protocols, such as a Hypertext Transfer Protocol (HTTP) protocol, a Hypertext Transfer Protocol Secure (HTTPS) protocol, or the like. In some embodiments, communications initiated by the cloud network 114 may be conducted over the TCP connection, and communications initiated by a network device may be conducted over a HTTP or HTTPS connection. In certain embodiments, the cloud network 114 may include a suite of applications, middleware, and database service offerings that are delivered to a customer in a self-service, subscription-based, elastically scalable, reliable, highly available, and secure manner.

It should be appreciated that the local area network 100 may have other components than those depicted. Further, the embodiment shown in the figure is only one example of a local area network that may incorporate an embodiment of the invention. In some other embodiments, local area network 100 may have more or fewer components than shown in the figure, may combine two or more components, or may have a different configuration or arrangement of components.

Figure 2:
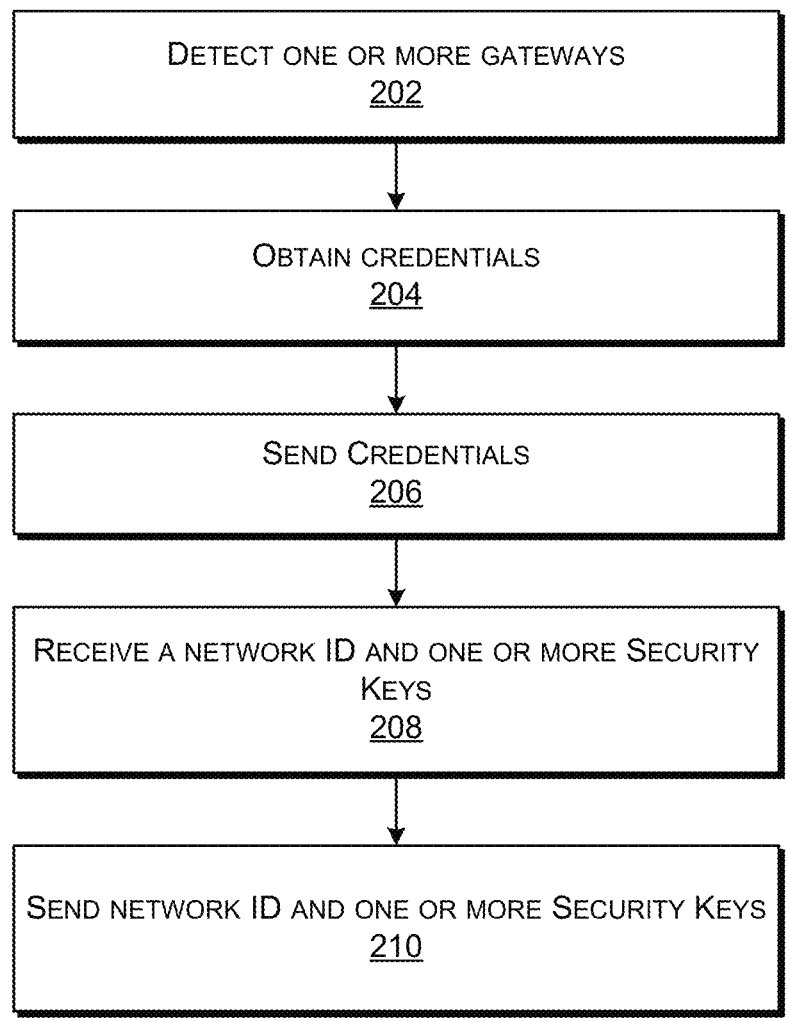
FIG. 2 is a flowchart illustrating an embodiment of a process for registering one or more network devices, in accordance with some embodiments.

Upon being powered on or reset, the network devices 102, 104, 106 may be registered with the cloud network 114 and associated with a logical network within the local area network 100. FIG. 2 illustrates an example of a process 200 for registering one or more network devices, such as the network devices 102, 104, 106 illustrated in FIG. 1. When multiple network devices 102, 104, 106 and gateways 110, 112 are included within a local area network, the network devices and/or gateways may be installed at different times, resulting in the techniques described with respect to FIG. 2 possibly occurring for each network device and/or gateway at different points in time. For example, a user may install network device 102 at a first point in time on a first floor of the user's house. Gateway 110 may also be located on the first floor, resulting in the network device 102 pairing with gateway 110. The user may later install gateway 112 and network device 106 on a second floor of the user's home, resulting in the network device 106 pairing with gateway 112.

At 202, a network device may detect one or more gateways upon being powered on or reset. In some embodiments, a provisioning process may occur when the network device is powered on or reset and detected by an access device (e.g., access device 108). During the provisioning process, the access device may directly communicate with the network device. In some embodiments, direct communication between network devices (e.g., network devices 102, 104, 106) and access device (e.g., access device 108) may occur using various communications protocols, such as Universal Plug and Play (UPnP), Bluetooth®, Zigbee®, Ultra-Wideband (UWB), WiFi-Direct, WiFi, Bluetooth® Low Energy (BLE), sound frequencies, and/or the like.

The provisioning process may include pairing the network device with a gateway and registering the gateway, network device, and access device with a server, such as a server located within the cloud network 114. For example, upon being powered on or reset to factory settings, the network device may send or broadcast identification information to one or more access devices. The identification information may be sent during a discovery process. For example, the identification information may be sent in response to a discovery request from an access device. In some cases, the identification information may include a name of the network device.

An application, program, or the like that is installed on and executed by the access device may receive the identification information from the network device. When the application on the access device is launched by a user, the access device may display the identification information for selection by the user. Once the network device identification information is selected, the access device may send a signal to the network device indicating that it has been selected. The network device may then send to the access device a list of gateways that are detected by the network device. The access device may receive and display the list of gateways. In some embodiments, the list of gateways includes multiple gateways (e.g., gateways 110 and 112) that are located within the local area network. The user may select the gateway that the user wishes for the network device to pair. For example, the gateway that provides the best signal strength for the network device may be selected. The access device may then prompt the user to enter login information that is required for accessing the network signals provided by the selected gateway. For example, the login information may be the same information that was originally set up to access the gateway network signals (e.g., when the gateway was initially installed). Once entered, the access device may send the login information to the network device. The network device may use the login information to pair with the selected gateway. As one example, network device 102 and network device 104 may be paired with gateway 110, and network device 106 may be paired with gateway 112.

Once paired with a gateway, the network device may be registered with a cloud network (e.g., cloud network 114). For example, the access device (e.g., via the application, program, or the like) may instruct the network device to register with the cloud network upon receiving confirmation from the network device that it has been successfully paired with a gateway. At 204, the network device may obtain credentials from the gateway as part of the registration process. For example, network device 102 may obtain credentials from gateway 110. At a same or later point in time, network devices 104 and 106 may obtain credentials from gateways 110 and 112, respectively. In some embodiments, the credentials may include a SSID of the local area network and a MAC address of the gateway. An SSID received from two gateways (e.g., gateways 110, 112) may be the same due to the gateways both being within the same local area network. In some cases, the SSID of the two gateways may be different. The MAC address of each of the gateways may be unique to each gateway. As a result of each gateway having a unique MAC address, the credentials obtained from a gateway may be unique to that particular gateway. It will be appreciated that other credentials may be obtained from a gateway, such as an Internet Protocol address, or the like.

The network device may then send the gateway credentials to the cloud network at 206. For example, the network devices 102, 104, 106 may send credentials for the gateway with which each is paired to the server located within the cloud network 114. For example, network device 102 may transmit the credentials obtained from gateway 110 to the server, and network device 106 may transmit the credentials obtained from gateway 112 to the server. In some embodiments, the network device may also send information relating to the network device (e.g., MAC address, serial number, make, model number, firmware version, and/or an interface module identifier, or the like) to the server, and/or information relating to the access device (e.g., MAC address, serial number, application unique identifier, or the like) to the server. In some embodiments, the communication of the credentials, the network device information, and/or the access device information sent from the network device to the cloud network server may be in a Hypertext Transfer Protocol (HTTP) format, a Hypertext Transfer Protocol Secure (HTTPS) format, a secure Transmission Control Protocol (TCP) format, or the like. It will be appreciated that other communication formats may be used to communicate between the network device and the cloud network server.

Once the credentials, network device information, and/or access device information are received by the server, the server may register each gateway as a logical network within the local area network and may generate a network ID for each logical network. For example, the server may register the gateway 110 as a first logical network. During the registration process, the server may generate a first network ID for identifying the first logical network. As noted above, it will be appreciated that any number of gateways may be present within the local area network, and thus that any number of logical networks may be registered for the local area network. The server may further generate a first set of security keys for authenticating the network device and the access device. For example, the server may generate a unique key for the network device 102 and a separate unique key for the access device 108.

Once the unique IDs are received by the server, the server may register each network device and determine a visual interface module for each network device. For example, the server may register the network device 102 as a first network device. During the registration process, the server may determine or generate a first interface module ID for identifying a visual interface module suitable for controlling the first network device. As noted above, it will be appreciated that any number of network devices may be present within the local area network, and thus that any number of network devices may be discovered and registered for the local area network.

In some embodiments, a modular visual interface framework may be utilized to dynamically and implicitly provide visual interface modules to an access device 108 so that the access device 108 can be used to control network devices within a network without having to install a new application or a version of an application for each network device. The visual interface modules can enable a user of the access device 108 to remotely control network devices within a network without having to physically interface with the network device. In certain embodiments, an application installed on the access device 108 can have a graphical interface, and the application can be configured to execute one or more visual interface modules usable to control respective network devices in a local area network. The visual interface modules, when executed by an application, can render a visual interface in the graphical interface to enable control of operation of the network device. In some embodiments, the visual interface module can be specific to a given network device.

The visual interface rendered for a visual interface module can be a modular tile that includes information identifying a respective network device and includes interactive areas or interactive elements for controlling and/or monitoring the network device on a network. The visual interface can provide information about a status of the network device corresponding to the tile. The status of a network device may be any changeable variable of that particular network device. For example, the status of a network device may include a state of the network device itself (e.g., on or off) or how the network device is situated within the network with respect to the other network and other devices throughout the network. In certain embodiments, the status can include a value, a state, or other unit of measure corresponding to a setting or an attribute related to operation of a device. The setting or the attribute can be adjustable within a range of values or between different states. For example, the device can be a light bulb and the status can include a value corresponding to brightness (e.g., a percentage of total brightness) emitted by the light bulb when the light bulb is powered-on.

Figure 11:
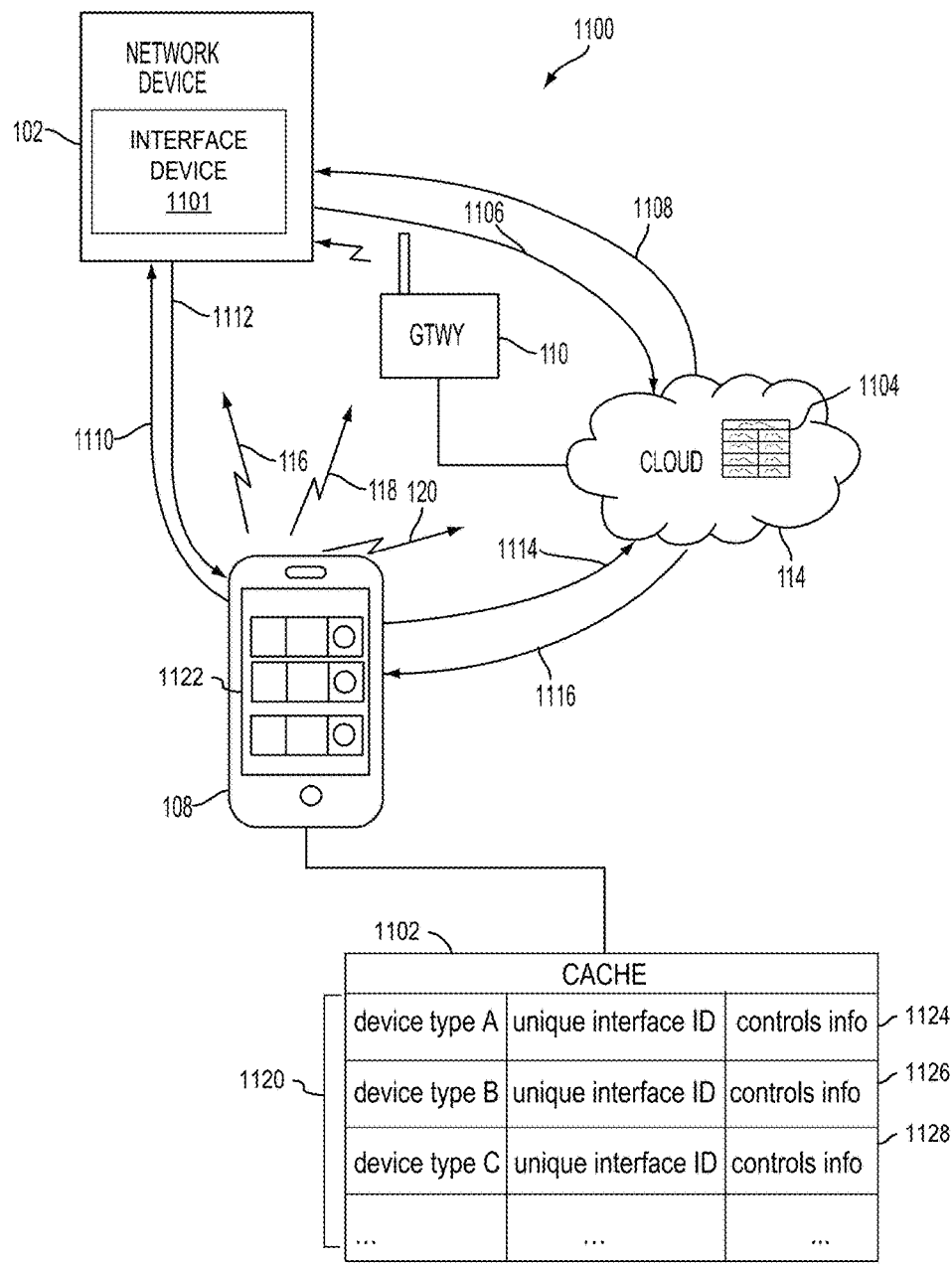
FIG. 11 shows an embodiment of a process for providing a visual interface module for controlling a device in a wireless network, in accordance with some embodiments.
Figure 23:
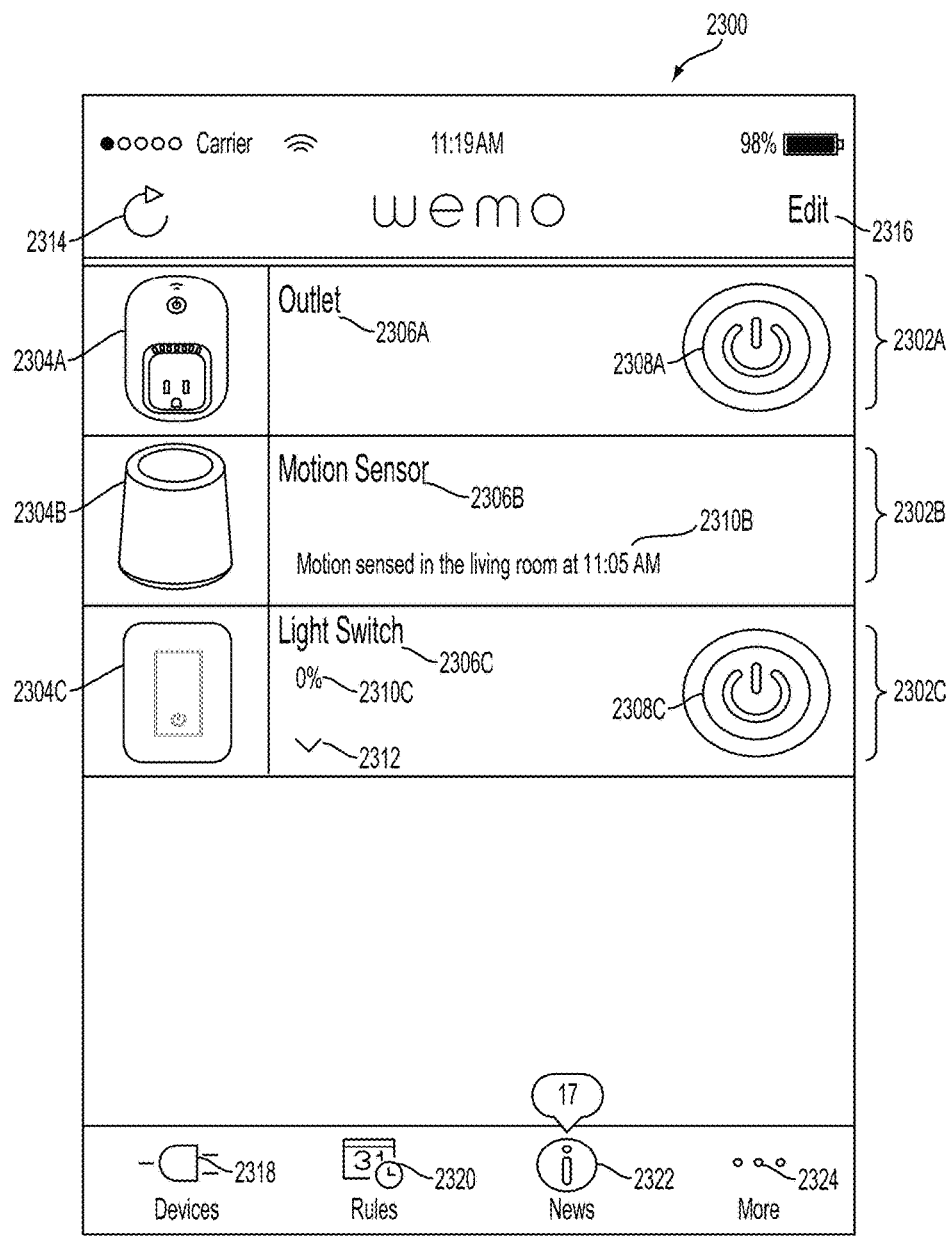
FIG. 23 depicts an example interface for controlling network devices and electronic devices coupled with the network devices, in accordance with some embodiments.

The visual interface can include one or more interactive elements or interactive areas to control one or more settings and/or attributes related to operation of the network device corresponding to the visual interface. The settings and/or attributes can correspond to functionalities or features of the network device. The functionalities can include, for example, powering the network device on and off, or adjusting a setting or an attribute of the network device. The visual interface can be updated to reflect the status of the network device with respect to the adjustment of one or more attributes and/or settings. Operation and implementation of the modular visual interface framework is described below with reference to FIGS. 11 and 23 is just one example of a visual interface that enables a user to control attributes and/or settings related to operation of network devices controllable via a computing device.

In some embodiments, as previously described, network device 104 may also be paired with gateway 110 at the same or a later point in time as the network device 102. During registration of the network device 104, the server may determine that the access device 108 has already been registered with another network device (e.g., network device 102) that is associated with the same logical network of gateway 110. In such embodiments, the server may retrieve the first network ID that was used in registering the first logical network. The server may also generate a new unique security key for the network device 104, and may retrieve the unique key that was previously generated for the access device 108 when registering the gateway 110 as the first logical network. Also in embodiments where the server may determine that the access device 108 has already been registered with another network device, the server may have used a unique ID for the previously discovered network device 102 to determine a first interface module suitable for controlling the network device 102. Further in such embodiments, the server may use another unique ID for the network device 104 to identify a second interface module suitable for controlling network device 104.

The gateway 112 may also be registered by the server as a second logical network with a second network ID. A second set of security keys may be generated for the network device 106 and the access device 108. For example, the server may generate a unique security key for the network device 106 and a unique security key for the access device 108 as it relates to the second logical network. In some embodiments, the gateway may 112 be installed at a later point in time after the gateway 110 is installed, and thus may be registered as the second logical network at the later point in time.

A record or profile may then be created for associating each network ID with the credentials of a corresponding gateway, the corresponding network device(s), and the access device. For example, the server of the cloud network 114 may associate the first network ID with the credentials of gateway 110. Similarly, the server may associate the second network ID with the credentials of gateway 112. In some embodiments, the server performs the association by generating and storing a record including the network ID, the set of security keys, the gateway credentials, the network devices associated with the network ID (e.g., MAC address or serial number of a network device), the access devices associated with the network ID (e.g., MAC address, serial number, application unique identifier, or the like), and/or any other information relevant to the network devices and/or gateways. For example, the server may store the first network ID and the first set of security keys in a first record at a first memory space (e.g., in Flash, DRAM, a database, or the like) along with the SSID and MAC address for gateway 110 and an identifier of the network devices 102 and/or 104.

The server may also store the second network ID and the second set of security keys in a second record at a second memory space along with the SSID and MAC address for gateway 112 and an identifier of the network device 106. In some embodiments, an example of a network device identifier may include a MAC address of the network device, a serial number of the network device, or any other unique identifier.

Each of the first and second network IDs may include a unique number or alphanumeric string generated sequentially or randomly. For example, the first time a network device and an associated gateway are registered on the cloud network 114, the unique network ID for the logical network of the gateway may start with 7000000. Each subsequent logical network that is created may be a sequential increment of the initial network ID (e.g., 7000001, 7000002, 7000003, etc.). As another example, the network ID may be generated by a random or pseudo-random number generator. It will be appreciated that other techniques for generating a unique ID may be used. The technique used to generate the network IDs may be dependent on a type of database that is included in the cloud network 114. For example, different databases may have different proprietary mechanisms for creating a unique identifier.

The set of keys generated for each logical network may be generated using database specific techniques. For example, a MySQL technique may be used to generate the sets of keys. Each key may include a universally unique identifier (UUID) or a globally unique identifier (GUID). As described above, for each logical network, the server may generate a unique key for a network device and a separate unique key for an access device.

A record or profile may then be created in a data store at the server for associating each network device with a corresponding known interface module so that the interface module can be provided to the access device. For example, the server of the cloud network 114 may associate the first network device 102 with a first interface module. Similarly, the server may associate the second network device 104 with a second interface module. In some embodiments, the server performs the association by generating and storing a record including the unique ID of the network device (e.g., MAC address or serial number of a network device), a unique ID of an interface module suitable to control the network device, and/or any other information relevant to the network device and/or the interface module. For example, the server may store a first record at a first memory space (e.g., in Flash, DRAM, a data store, a database, or the like) with the unique ID of the network device 102 and the unique ID of an interface module for monitoring and controlling the network device 102. The server may also store a second record at a second memory space along with the unique ID of the network device 106 and the unique ID of an interface module for monitoring and controlling the network device 106. The technique used to store records for associating each network device with a corresponding interface module may be dependent on a type of database that is included in the cloud network 114. For example, different databases may have different proprietary mechanisms for creating unique identifiers. The unique identifiers for each interface module may be generated using database specific techniques. For example, a MySQL technique may be used to generate the unique IDs for interface modules. Each unique ID for interface modules may include a universally unique identifier (UUID) or a globally unique identifier (GUID).

At 208, the network device may receive the network ID and the set of security keys. For example, once the server has generated a record or profile associating the network device 102 with the first logical network, the server may transmit the first network ID and the first set of security keys to the network device 102. The network device 102 may store the first network ID and one or more keys of the first set of keys. For example, the network device 102 may store the unique security key that was created by the server for the network device 102.

As noted previously, the network devices 102, 104, 106 and gateways 110, 112 may be installed at different times. For example, in some embodiments, network device 104 may be installed at a point in time after the first logical network is created based on the pairing between gateway 110 and network device 102. In such embodiments, upon being powered on, the network device 104 may pair with gateway 110, obtain credentials from gateway 110, and transmit the credentials to the server in the cloud network 114 using similar techniques as those described above. The server may associate the network device 104 with the previously generated first network ID. As described above, the server may also generate a new unique security key for the network device 104, and may retrieve the unique key that was previously generated for the access device 108 when registering the first logical network. The network device 104 may then receive and store the first network ID and the security keys from the server.

At 210, the network device may send the network ID and the set of security keys to the access device. For example, the network device 102 may send to the access device 108 the first network ID and the unique security key generated for the access device 108. The network device 102 and the access device 108 may then communicate with the cloud network server using the first network ID and each device's unique key. In some embodiments, the network device and the access device may generate a signature using their respective security keys. The signature is sent to the cloud network server along with a communication from the network device or access device. The cloud network server may process the signature in order to authenticate each device, as described below. The network device and access device may use different techniques to generate a signature.

A network device may generate a signature using its uniquely generated security key. For example, the signature may be expressed as: Authorization=MacAddress":"Signature":"ExpirationTime. The Authorization term may be an attribute, and the MacAddress, Signature, and ExpirationTime terms may include values for the Authorization attribute. In particular, the MacAddress value may include the MAC address of the network device, which may include a unique alphanumeric or numeric string. The network device may retrieve its MAC address from memory and place it in the MacAddress field. The Signature value may be expressed as: Signature=Base64(HMAC-SHA1(PrivateKey, StringToSign)). The Signature value may include an alphanumeric or numeric string. HMAC-SHA1 is an open source technique that includes a Hash-based Message Authentication Code (HMAC) using a SHA1 hash function. The HMAC-SHA1 technique uses the values PrivateKey and StringToSign as inputs. The PrivateKey input includes the unique security key that was generated by the server for the network device. The StringToSign input may be expressed as StringToSign=MacAddress+"\n"+SerialNumber+"\n"+ExpirationTime. Accordingly, the StringToSign input is generated by appending a serial number of the network device and an expiration time to the network device's MAC address. The ExpirationTime term may indicate the period of time for which the signature is valid. In some embodiments, the ExpirationTime term may include a current time at which the signature is generated plus period of time for which the signature is valid. In one example, the ExpirationTime term may be expressed as ExpirationTime=Number of seconds since Jan. 1, 1970.

The network device may place the signature in a data packet for transmission with a communication signal to the cloud network server. The network device may also place the network ID in the data packet. The signature and the network ID, if included, may be used by the cloud network server to verify that the network device is associated with the logical network. In some embodiments, a signature is provided with each communication sent from the network device to the server. Once the signature is received by the server, the server generates a signature using the same expression as that used by the network device. For example, the server may retrieve the network device's key and other relevant information from storage and generate the signature using the key and the other information using the expression described above. The server then verifies whether the signatures match. Upon determining that the signatures match, the server authenticates the network device's communication.

An access device may also generate a signature using its uniquely generated security key. For example, the access device signature may be expressed as: Authorization=SDU UniqueId":"Signature":"ExpirationTime. The Authorization term may be an attribute, and the SDU UniqueId, Signature, and ExpirationTime terms may include values for the Authorization attribute. The SDU UniqueId term may include a unique access device identifier. The SDU UniqueId value may depend on the type of access device that is used and the type of values that may be accessed and/or generated by the type of access device. In some cases, one type of access device may not allow an application to access a unique identifier of the access device (e.g., a serial number, UUID, or the like). In such cases, the SDU UniqueId value may include a value generated by an application or program installed on and executed on the access device that is used to access the network device. The value may be unique to the application or program that generated the value. In other cases, another type of access device may allow an application to access a unique identifier of the access device. In such cases, the SDU UniqueId value may include a value that is unique to the access device itself, such as a serial number, UUID, or the like. In this example, the access device may retrieve the unique value from storage within the access device. It will be appreciated that other unique identifiers may be used to uniquely identify the access device. The Signature value may be expressed as: Signature=Base64 (HMAC-SHA1(PrivateKey, StringToSign)). Using this expression, the input to the HMAC-SHA1 technique may include a PrivateKey term and a StringToSign term. The PrivateKey input includes the unique security key that was generated by the server for the access device with regard to a particular logical network. The StringToSign input may be expressed as StringToSign=UniqueId+"\n"+"\n"+Expiration Time. The StringToSign value is different from the StringToSign value generated by network device in that no serial number is included. Accordingly, the StringToSign input is generated by appending an expiration time to the access device's unique identifier. The ExpirationTime term may indicate the period of time for which the signature is valid, similar to that above for the signature generated by the network device.

The access device may place the signature in a data packet and may transmit the data packet to the cloud network server with a communication signal. The network device may also place the network ID in the data packet. The signature and the network ID, if included, may be used by the cloud network server to verify that the access device is associated with the logical network and authorized to communicate with one or more network devices associated with the logical network. In some embodiments, a signature is provided with each communication sent from the access device to the server. The cloud server may receive the signature and may generate a signature using the same expression as that used by the access device. For example, the server may retrieve the access device's key and other relevant information from storage and generate the signature using the key and the other information using the expression described above. The server then verifies whether the signatures match. Upon determining that the signatures match, the server authenticates the access device and allows it to communicate with one or more of the network devices associated with logical network.

Once the provisioning process is completed, the access device 108 may access the network device 102 locally via the gateway 110 (e.g., communication signal 118) or remotely via the cloud network 114 (e.g., communication signal 120). In some embodiments, the communication between the access device 108 and the cloud network 114 may be a HTTP or HTTPS communication. It will be appreciated that other communication mechanisms may be used to communicate between the access device 108 and the cloud network 114.

The network 100 may enable a user to monitor and/or control operation of the devices 102 and 104. For example, a user may monitor and/or control operation of devices by interacting with a visual interface of the gateway 110 (i.e., a web page for gateway 110) and/or a visual interface rendered on a display of an access device, such as access device 108. In some embodiments, an application may be run on the access device. The application may cause the access device to present a graphical interface that includes a visual interface for each device accessible on the network 100.

A network device may generate and/or provide a "status" of the network device. In certain embodiments, the status or state of a network device can be indicated on a visual interface on the access device, for example within the tile with text and/or graphically. The status of the network device can change based on time (e.g., a period, an interval, or other time schedule). The status of a network device may be any piece of information pertinent to that particular network device. The status of a network device may be any changeable variable of that particular network device. For example, the status of a network device may include a state of the network device itself (e.g., on or off) or how the network device is situated within the network with respect to the other network and other network devices throughout the network. For example, the status of a network device may refer to the network device's proximity to another network device and/or its ability to communicate with another network device because of the relative signal strength between the two network devices. In certain embodiments, the status can include a value or some other information indicating a unit of measure for a setting or an attribute related to operation of a device connected to the network device. The setting or the attribute can be adjustable within a range of values. For example, the device connected to the network device can be a light bulb and the status can include a value corresponding to brightness (e.g., a percentage of total brightness) emitted by the light bulb when the light bulb is powered-on. In another example, the device can be a motion sensor and the status can include a value corresponding to sensitivity of the sensor in a range of values between 0 to 100 when the sensor is powered on. In yet another example, the device can be a fan and the status can include a value corresponding to a speed of the fan on a scale of 0 to 100 when the fan is powered-on.

As described above, upon being powered on or reset, the network devices 102 and/or 104 may be registered with the cloud network 114 and associated with a logical network within the local area network 100. Similarly, upon being powered or switched off or otherwise being disconnected from the network 100, the status of the-network device 102 would be known and stored by a cache (not shown) associated with the network 100. For example, cloud network 114 may include storage (e.g. cache) that stores the status of the network devices within each local area network 100 it is connected to and/or provides access to. In another example, the gateway 110 may include storage that stores the status of the network devices within each local area network it is connected to and/or provides access to. More specifically, the status stored in the cache may include a status table which indicates the current status of each network device (as of its last communication with each network device). A status table may include all statuses of each network device, or individual storage tables for each local area network or other subset of its network devices/networks. In one embodiment, a change in status may prompt the-network device to push its change in status to the cloud network 114 for storage or updating of the cloud's stored status table. In another embodiment, cloud network 114 and/or gateway 110 may continuously (or periodically) communicate with each-network device to check to see if its status has changed.

In some embodiments, a network device (e.g. network device 102 and/or 104) may, upon connecting to the local area network 100, check the status of the network devices on the network 100. In other embodiments, one network device may check the status of one or more of the other network devices on the network 100. The network device may seek to check the status of another network device or access device for various reasons, including to display such status(es) to a user on a display or otherwise, to check whether that network device belongs to the same network, to synchronize or coordinate any scheduled executions, to update an attribute based on adjustments received, among others. For example, a network device or user may desire to check various statuses on a connected device, such as power level, timestamped activity history (e.g. temperature for a thermostat, motion for a motion detector, etc.), how long it has been active/turned on, attributes for operation of the connected device (e.g., a brightness of a lamp, a speed of a fan, or a sensitivity of a sensor, etc.), among many others.

In some embodiments, a device, such as the access device 108 shown in FIG. 1 or the gateway 110, connected to the network 100 can communicate an updated status of a network device, such as the network devices 102 and/or 104. The updated status can be communicated via the network 100 and can include an adjustment that affects a status of the network device. The adjustment can include an amount of change to one or more attributes, one or more settings, or a combination thereof related to operation of the network device connected to the network 100. The access device 108 or the gateway 110 can present a graphical interface that can receive input corresponding to an adjustment to a status of a device. In some embodiments, the updated status of the network device communicated to the network 100 can be received by a network device to which the updated status applies, or can be received by the gateway 110, the cloud network 114, or any other device in communication with the network. If the device cannot directly receive the updated status, it can also or alternatively receive the updated status from the cloud network 114, the gateway 110, or the other devices in the network 100. In some embodiments, the network device can communicate its updated status to the network 100, which can indicate whether the status has been updated. The updated status can be received by the access device or any other device in the network 100. In some embodiments where the access device is not located within the network 100, the access device may not immediately receive the updated status. The updated status can be stored by the cloud network 114 or the gateway 110 for communication to the access device. The status of the network device can indicate whether an adjustment was made based on an adjustment in a setting or an attribute transmitted by the access device. Alternatively, or additionally, the access device can receive, from any other network device connected to the network 100, a status update indicating whether the adjustment was in fact made at a network device.

A network device seeking to check the status of any other device on the network 100 may communicate with the cloud network 114, to which all devices on the network 100 are connected either directly or indirectly. Since the cloud network 114 and/or the gateway 110 can store an updated table/list of the statuses of each of the network devices 102 and 104 within the requesting network's local area network, the cloud network 114 and/or gateway 110 may communicate such status data to the network devices 102 and 104 and the access device. For example, if network devices 102 and 104 were to each turn on and communicate their statuses to cloud network 114, cloud network 114 may analyze the status of network devices 102 and 104 and communicate to network devices 102 and 104 that they are each connected to the same local area network 100.

Figure 3:
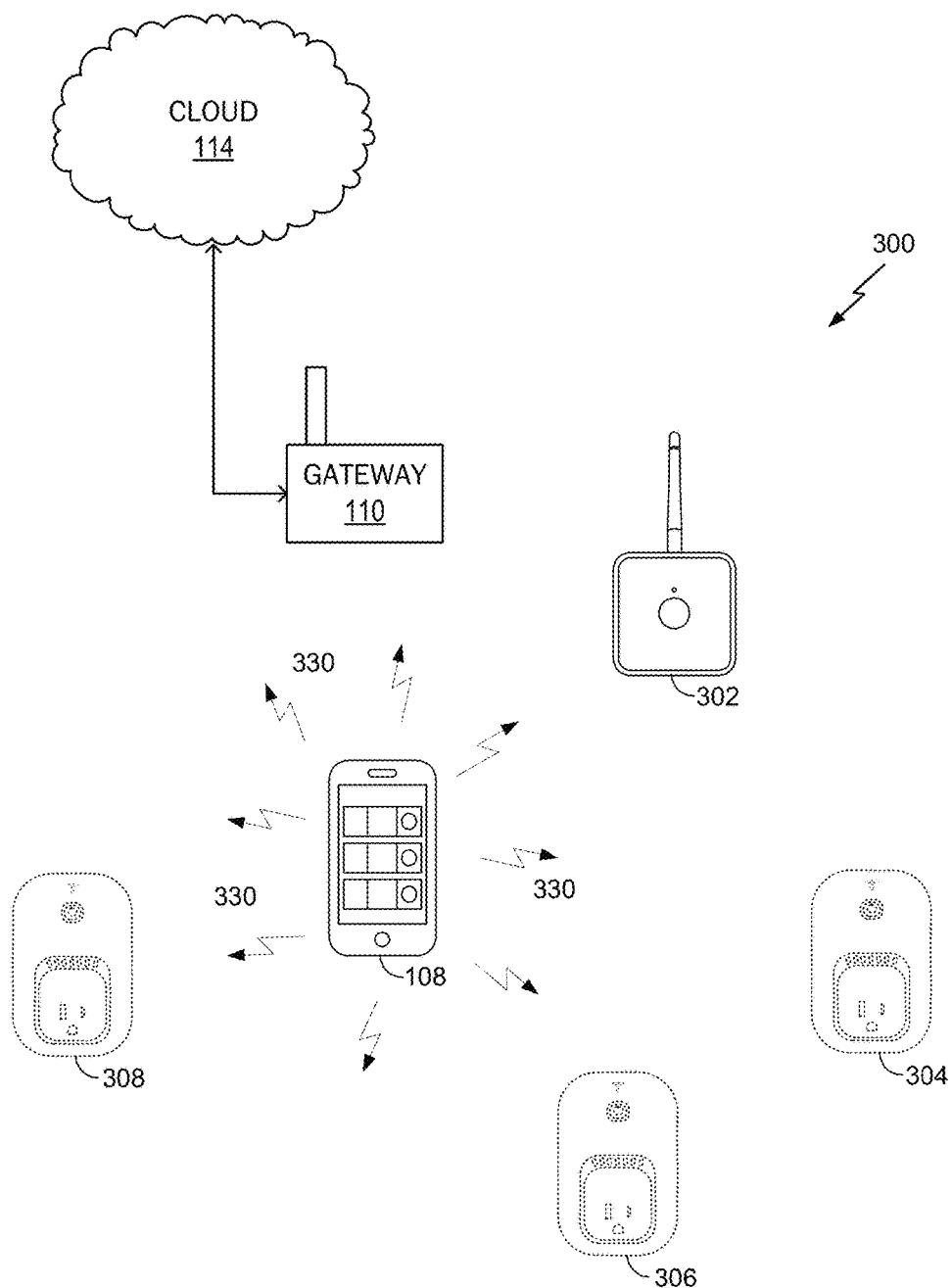
FIG. 3 is an illustration of an example of a network environment, in accordance with some embodiments.

FIG. 3 illustrates an example of a network 300, according to embodiments of the present invention. Specifically, the network 300 can be a wireless local area network enabling an access device to communicate with network devices to control adjustment of attributes related to operation of the network devices. Network 300 includes network device 302, network device 304, network device 306, and network device 308. The network 300 also includes access device 108. In other words, the network 300 may be substantially similar to the network 100 except that access device 108 has been turned on near the network 300, to which it is associated, or has entered an area to which the network 300 can reach.

When access device 108 can enter the network 300 as shown in FIG. 3, access device 108 may be authenticated based on the access device's authentication with the logical network or may otherwise commence communication with cloud network 114. Access device 108 may also communicate notification of its presence or other information directly to other network devices 302-308 within network 300, as shown in FIG. 3 by communication paths 330. As noted, such communication may include various communications protocols, such as Universal Plug and Play (UPnP), Bluetooth®, Zigbee®, Ultra-Wideband (UWB), WiFi-Direct, WiFi, Bluetooth® Low Energy (BLE), sound frequencies, and/or the like. For example, access device 108 may communicate to all other devices in network 300, including network device 302, network device 304, network device 306, and network device 308, information/data regarding its status. Such status data may include the fact that it is present and turned on, or other status data/information. At any time that network devices 302, 304, 306 and 308 recognize that access device 108 is present at network 300, the network devices may communicate back to access device 108. For example, the network devices may send an acknowledgement (e.g., ACK signal) back to access device 108 to confirm that they received the status data sent by access device 108. The network devices may also send their own status data to access device 108.

While network devices 302-308 and access device 108 may each receive communication from other network devices around the network 300, including the status of each of those network devices, network devices 302-308 and/or access device 108 may be continuously scanning network 300 (including, for example, running discovery algorithms) to determine whether any devices within the network have moved, turned on/off or otherwise added to or subtracted from the network 300, or have otherwise changed statuses.

Since network devices 302-308 and access device 108 may each receive communication from other devices around network 300, including the status of each of those devices, each network device within network 300 may know the status of each other network device in the network 300. For example, access device 108 or devices 302-308 may not be required to communicate with cloud network 114 in order to obtain one or more of such statuses. Since cloud network 114 is an external network and may be remote from network 300, communication between network devices within the network 300 and cloud 114 may take more time than communication between two devices within network 300. For example, communication between devices within network 300 may take anywhere from 1 millisecond to 100 milliseconds, while communication between a device within network 300 and the cloud network 114 may take anywhere from 50 milliseconds to 1 second or more). Furthermore, if a network device is retrieving information from cloud 114, the request must travel from the network device to cloud network 114, and then the information must travel back from cloud network 114 to the network device. This process may double the latency caused by retrieving information with cloud 114. Therefore, devices within the network 300 may choose to send and receive/retrieve statuses directly with other devices within the network 300 instead of communicating such information via cloud network 114. When a network device receives status data from another network device on the device's local area network 300, it may store that status data so that it may retrieve and use that status data at a later time.

Figure 4:
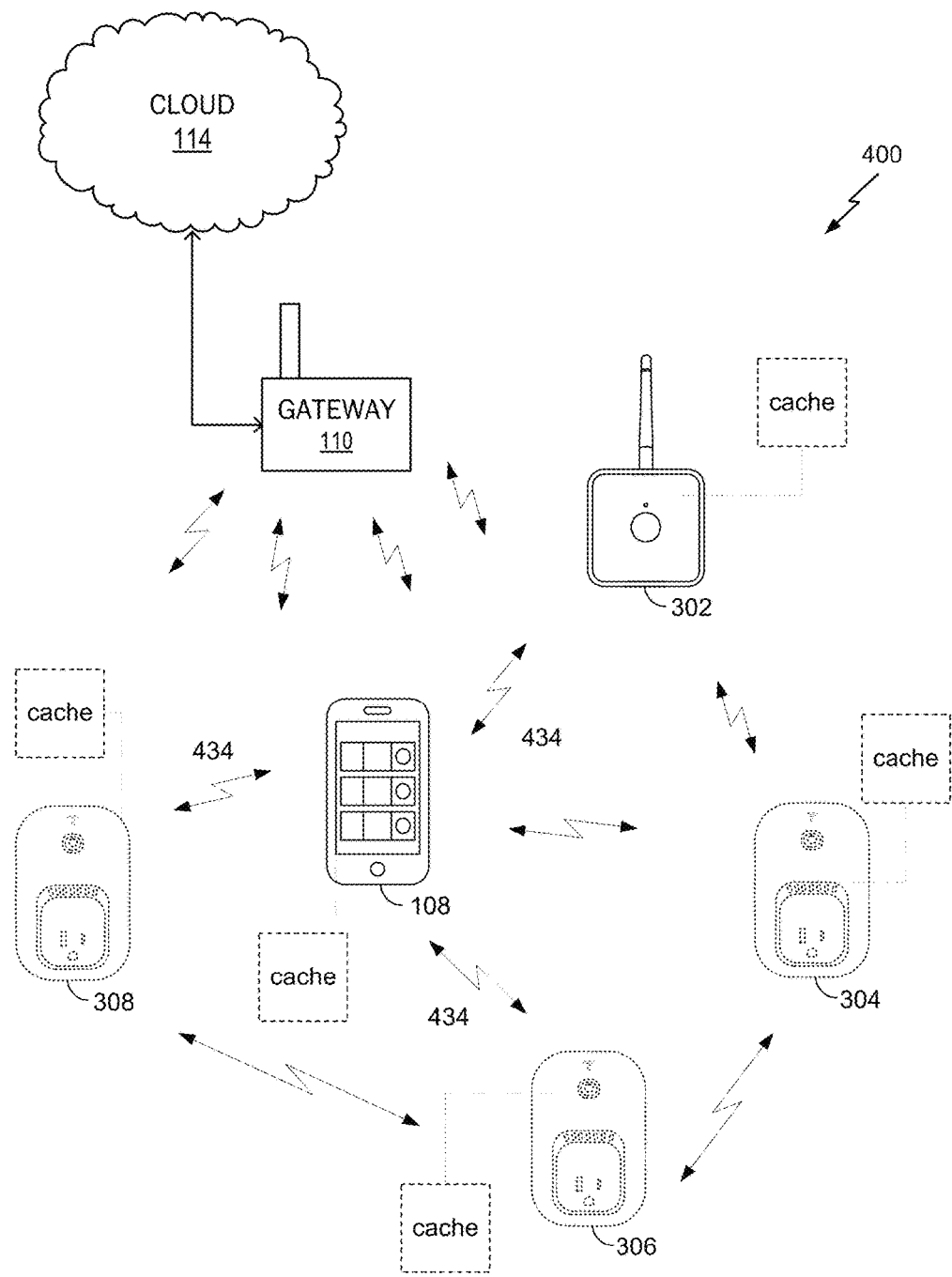
FIG. 4 is an illustration of an example of a network environment, in accordance with some embodiments.

FIG. 4 illustrates an example of a network 400, according to embodiments of the present invention. The local area network 400 may include network device 302, network device 304, network device 306, network device 308, and access device 108. FIG. 4 also illustrates that one or more network devices 302-308 and/or access device 108 may include a storage device, such as a cache, for storing data, including data regarding its own status and data regarding statuses received from the other devices within local area network 400. For example, access device 108 may, after being powered up, broadcast/send its status to network device 308 via communication 434. Network device 308 may store the status data received from access device 108 until the next time access device 108 updates its status by sending new/updated status data to network device 308. Cache may be used for storage within network devices 302-308 and/or access devices within the local area network 400 so that each of the devices may be able to quickly retrieve the data it needs from storage. An application operating on the access device 108 can access the cache to obtain information to display the visual interface for each network device 302-308 registered within the network 400. Although a caching device may be used to store such data within the network and/or access devices within the local area network 400, other types of storage may be used.

The cache can contain a known interface list including interface information for different, known types of devices. The known list can include a record for each network device known by the access device 108 to exist on the network 400. When an application is run on the access device 108, the access device 108 can access the known interfaces in the cache to present the display of access device 108. The display can present one or more visual interfaces, each corresponding to a network device known to exist on the network 400. Each visual interface can be generated based on a visual interface module corresponding to each device on the network 400. In an example, the display can include a visual interface (e.g., a module tile) for each device in the network 400 having an interface in the known interface list.

The cache can also contain known status information about each network device in the known device list. When the application is run on the access device 108, the access device 108 can access the known status information in the cache to present a status display. The access device 108 can populate each tile with an indicator representing the respective known status information for each device in the known device list. The status display can include an indicator of one or more attributes, one or more settings, or a combination thereof related to operation of each device in the network 400. For example, the status display can include a speed of a fan (e.g., a fan speed of 56 in a range of values between 0 and 100) of the network device 302 (e.g., a fan), a value of sensitivity of a sensor (e.g., a value of 34 in a range of values 0-100) for the network device 304 (e.g., a motion sensor), a value of brightness (e.g., 65 percent brightness) for the network device 306 (e.g., a light bulb), and a value of temperature (e.g. a slow cooker). Although shown as having a single indicator for an attribute or a setting related to operation of a network device, the status display can present a plurality of indicators corresponding to different attributes and/or settings related to operation of a network device.

In some embodiments, the cache can include other information about a network device. The other information can indicate a device's firmware version, last known firmware update status, connectivity to cloud status, registration status (e.g., whether the network device has a key or not), and other such information. The cache can include information that could be used for troubleshooting. In embodiments described below, the access device 108 can access status information from another other device on the network 400 and can use that information to update its own cache, update the status display, and/or pass the information to the cloud network 114 and/or the gateway 110 for trouble shooting and/or storage.

Even though each network device may know and store (e.g. in cache) the state of each other network device within local area network 400, a network device may not know when another network device changes status (e.g. turns/powers off). However, network devices and/or access devices within local area network 400 may broadcast/send any updates in its status to other devices on the network. For example, if network device 302 changes status, it may send status data to the other network devices, such as network devices 304, 306 and 308 and to access device 108. However, network device 302 may not know which devices to update since the other devices may change statuses periodically (e.g. turn off).

Therefore, a network or access device may subscribe to another network or access device within local area network 400. For example, network devices 304, 306 and 308 and access device 108 may subscribe to status data notifications/updates from network device 302. Such a subscription may be registered for upon initial connection with network device 302 when network device 302 first enters local area network 400 or at any other time after network device 302 has been associated with local area network 400. Subscriptions may be controlled to last indefinitely or may expire after a certain predetermined period of time after initial subscription. However, network devices may re-subscribe to another network device before or after their previous subscription has expired.

Subscriptions between network device and/or access devices may be registered, similar to registering a network device upon initial entrance into the local area network, including security registrations described herein with respect to FIGS. 1 and 2. For example, a network device may send its unique security key, which it may have stored along with its network ID after being registered on the network, to a network device to which it wants to subscribe. However, subscriptions may take on many other forms, including sending a different form of identification to a network device to which a network device wants to subscribe. However, subscriptions may take on many other forms, including sending a different form of identification to a network device to which a network device wants to subscribe.

Upon receiving a subscription from another network device or access device, the device being subscribed to may store a list of the devices that subscribed to it. For example, network device 302 may store a list of network devices 304, 306 and 308 and access device 108 after those devices subscribe to network device 302. Then, when network device 302 undergoes a change in status, network device 302 may send that change in status to only the devices that had previously subscribed to it but where the subscription had not yet expired. Furthermore, according to some embodiments, the subscription list of a network device may be automatically updated if that device receives notification that another device has left the range of the local area network, either from that device itself or from a different device. Therefore, the various devices within a given local area network, such as network 400, each contain continuously updated statuses of each other device on the network and obtain those statuses and updates through direct communication without necessary use of the cloud.

Figure 5:
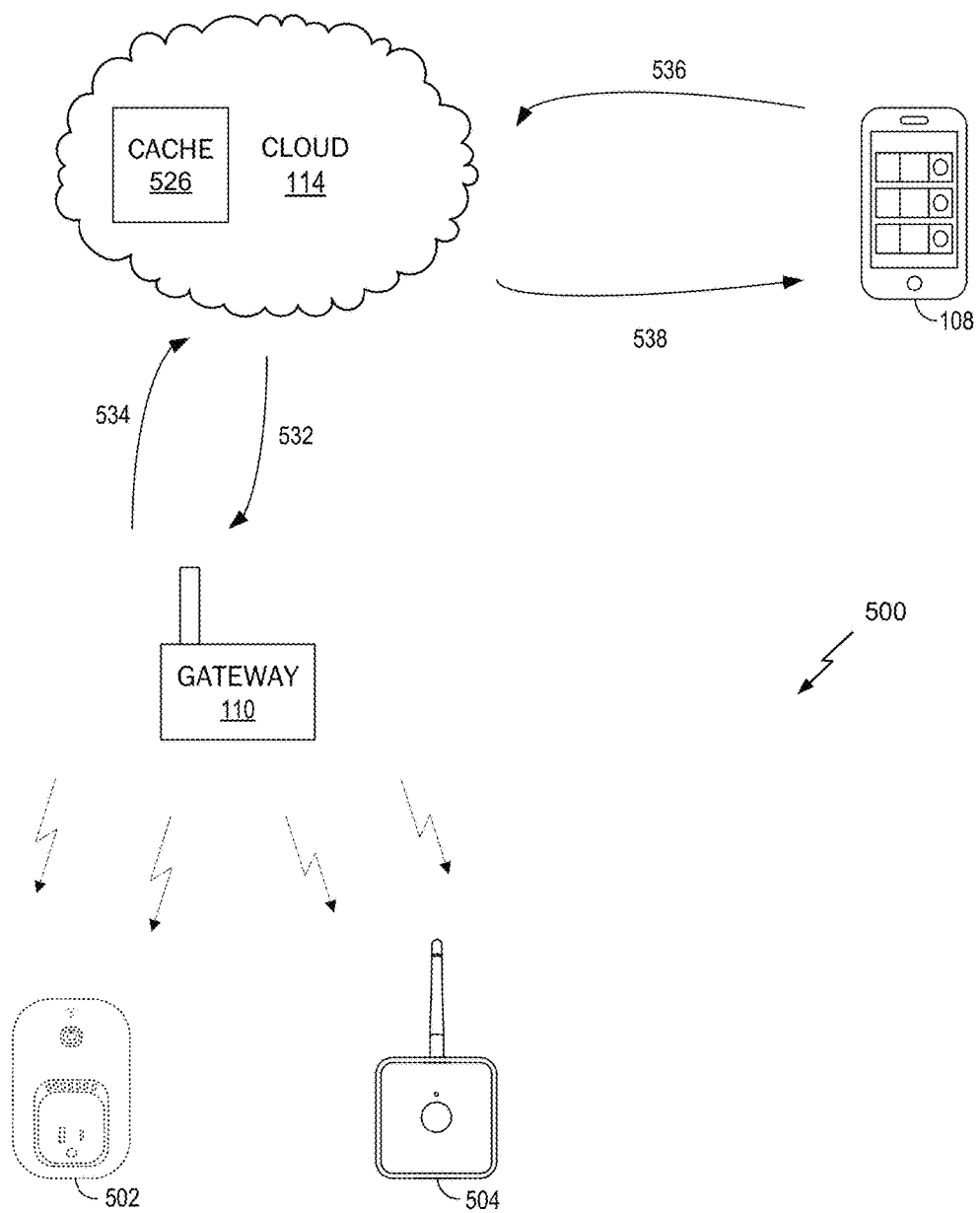
FIG. 5 is an illustration of an example of a network environment, in accordance with some embodiments.

FIG. 5 illustrates an access device 108 that is located remotely from network 500 (e.g. local area network), according to embodiments of the present invention. Local area network 500 includes gateway 110 and network devices 502 and 504 (which may be, for example, the same as any of network devices 302-308 in FIGS. 3 and 4), as shown in FIG. 5. However, network 500 may also include a variety of other network devices and one or more access devices directly connected to network 500. Gateway 110 is connected to cloud network 114, and allows network devices 502 and 504 to connect to cloud 114, the internet, or other external networks via gateway 110. In some embodiments, the network devices 502 and 504 may include home automation devices that allow a user to access, control, and/or configure various home appliances located within the user's home, such as a television, radio, light, microwave, iron, and/or the like.

Access device 108 is not directly connected to network 500. Instead, access device 108 is external to network 500 and may connect to cloud network 114 and to network 500 via cloud network 114. As noted, network devices 502 and 504 may change status on a periodic basis. In some embodiments, even when external to and not directly connected to network 500, an access device may request to check the status of the devices on the network. When access device 108 seeks to check the status of any device on the network, the access device 108 may transmit/send a communication 536 to the cloud network 114, to which all devices on the network are connected either directly or indirectly via gateway 110. Since the cloud network 114 stores an updated table/list of the statuses of each of the devices within the requesting access device's network, the cloud network 114 may transmit a communication 538 of such status data to the access device 108. For example, after network devices 502 and 504 are turned on, authenticated and are a part of network 500, network devices 502 and 504 may communicate their statuses to cloud network 114. Furthermore, any time the status of network devices 502 and 504 changes, the device that incurred a status change may push/send information (e.g. an indication) of that status change to cloud network 114. Cloud network 114 may store, in cache 526 or otherwise, the statuses (which may be time stamped in metadata or otherwise) of network devices 502 and 504. Therefore, when access device 108 requests from cloud network 114 the statuses of devices on network 500, cloud 114 may send its most recently stored/updated statuses to access device 108.

To obtain the most updated status data of devices within network 500, cloud 114 may, upon receiving a request for status data related to network devices 502 and 504, transmit/send a communication 532 (e.g. request, query, etc.) for such status data to network devices 502 and 504 via gateway 110. Once network devices 502 and 504 receive this request, network devices 502 and 504 may send a communication 534 (e.g. updated status data) to cloud 114 to replace the previously stored/cached statuses in cache 526. Upon receipt of updated status data in communication 534 from network 500, cloud 114 may send a communication 538 of such status data to the access device 108.

However, the process of cloud network 114 requesting updated statuses from network devices 502 and 504 within network 500 may cause latency within the system. More specifically, the time required for cloud network 114 to request updated statuses from network devices 502 and 504 and to in turn receive updated statuses from network devices 502 and 504 may be substantially greater than the time required for cloud network 114 to send its currently stored statuses (without being updated) for network devices 502 and 504 to access device 108. For example, of the total time required for access device 108 to receive updated statuses from cloud network 114, 80% or more of that total time may include cloud network 114 requesting updated statuses from network devices 502 and 504. On the other hand, of the total time required for access device 108 to receive updated statuses from cloud network 114, 20% or more of that total time may include the status data being transmitted from cloud network 114 to access device 108. Since a majority of the process required for access device 108 to request and receive status data for network devices 502 and 504 is the transmission of data between cloud 114 and network devices 502 and 504, the access device 108 and cloud network 114 may maximize efficiency by minimizing the effect of the transmission of data between cloud 114 and network devices 502 and 504 on the whole process/system.

Figure 6A:
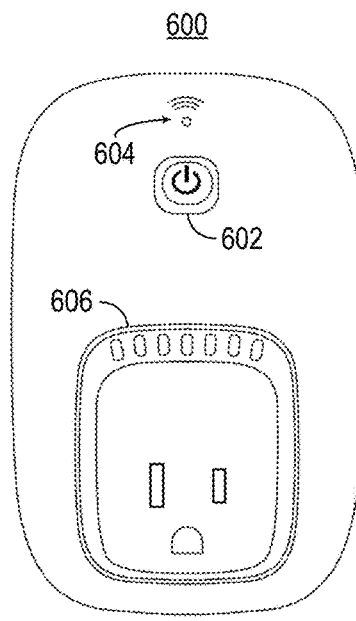
FIGS. 6A and 6B are illustrations of example front views of network devices, in accordance with embodiments.
Figure 6B:
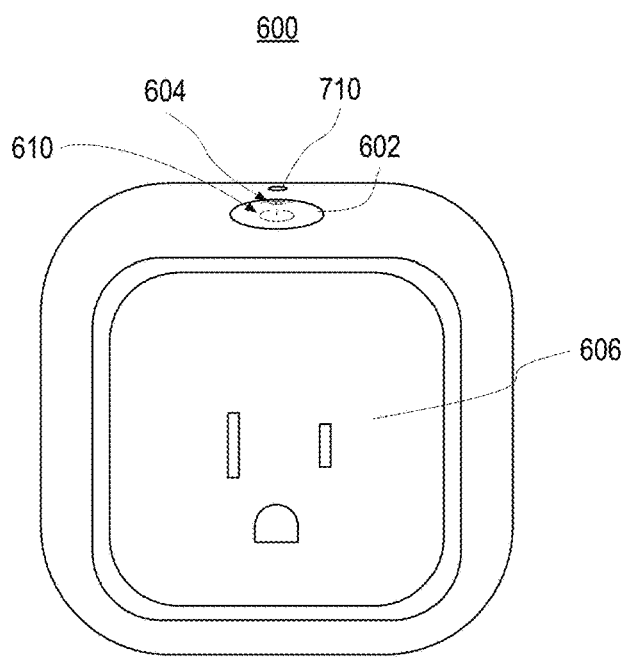
Figure 7A:
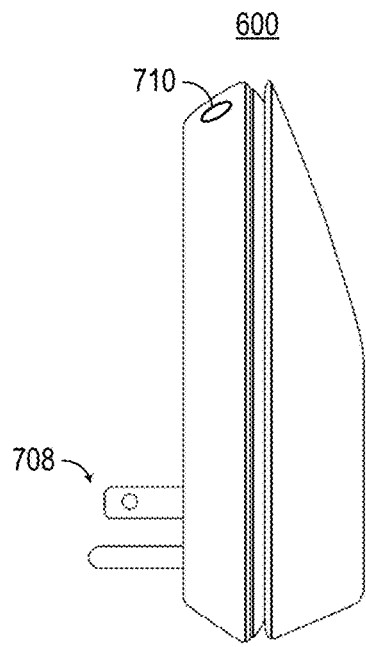
FIGS. 7A and 7B are illustrations of example side views of network devices, in accordance with embodiments.
Figure 7B:
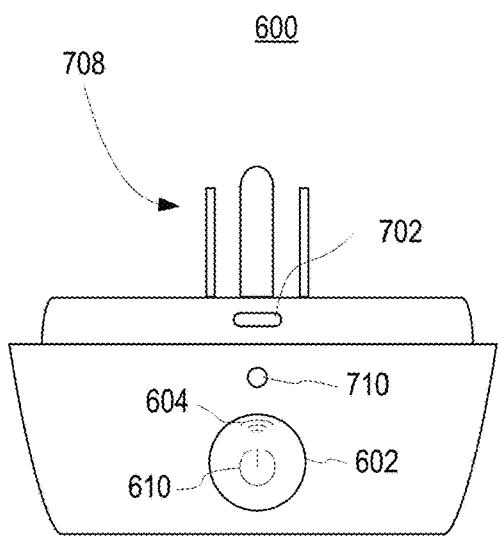

FIGS. 6A and 6B illustrate example front views of network device embodiments 600. FIGS. 7A and 7B illustrate example side views of network device embodiments 600. The network device 600 may include any of the network devices 102, 104, or 106 described herein. In some embodiments, the network device 600 may be a home automation network device. For example, the network device 600 may include a home automation switch that may be coupled with a home appliance. A user may wirelessly access the network device 600 in order to access, control, and/or configure various home appliances located within the user's home. For instance, the user may remotely control appliances such as a television, radio, light, microwave, iron, space heater, wall A/C unit, washer, dryer, fan, and/or the like.

In some embodiments, the network device 600 may include a WiFi enabled switch that connects home appliances and other electronic devices to a compatible 802.11b/g/n/ac WiFi network. The network device 600 may thus allow users to locally or remotely turn devices on or off from anywhere, program customized notifications, and/or change device status. The network device 600 may further allow a user to create custom schedules or have devices respond to sunrise or sunset.

The network device 600 includes a power button 602 that may be depressed in order to turn the network device 600 on and off. In some embodiments, a light source 610 may be integrated with or located behind the power button 602. For example, a light-emitting diode (LED) may be located on a circuit board under the power button 602. The light source 610 may be illuminated when the network device 600 is powered on, and may not be illuminated when the network device 600 is powered off.

The network device 600 further includes a communications signal indicator 604. The signal indicator 604 may indicate whether the network device 600 has access to a communications signal, such as a WiFi signal. For example, the signal indicator 604 may include a light source (e.g., a LED) that illuminates when the network device 600 is connected to a communications signal. The light source may depict different colors or other characteristics (e.g., flashing, dimming, or the like) to indicate different levels of signal strength or mode of operation.

The network device 600 includes a restore button 710. The restore button 710 may allow a user to reset the network device 600 to factory default settings. For example, upon being depressed, the restore button 710 may cause all software on the device to be reset to the settings that the network device 600 included when purchased from the manufacturer.

The network device 600 further includes a plug 708 and an outlet 606. The plug 708 allows the network device 600 to be plugged into a wall socket, such as a socket providing 120 V AC, 220 V AC, or the like. In turn, an appliance may be plugged into the outlet 606. Once the network device 600 is registered according to the techniques described above, an appliance plugged into the outlet 606 may be controlled by a user using an access device (e.g., access device 108).

In some embodiments, the network device 600 can include an access port 702 to provide hardwired data communication between the network device 600 and another device. The access port 702 can be a universal serial bus (USB) port or other suitable port.

Figure 8:
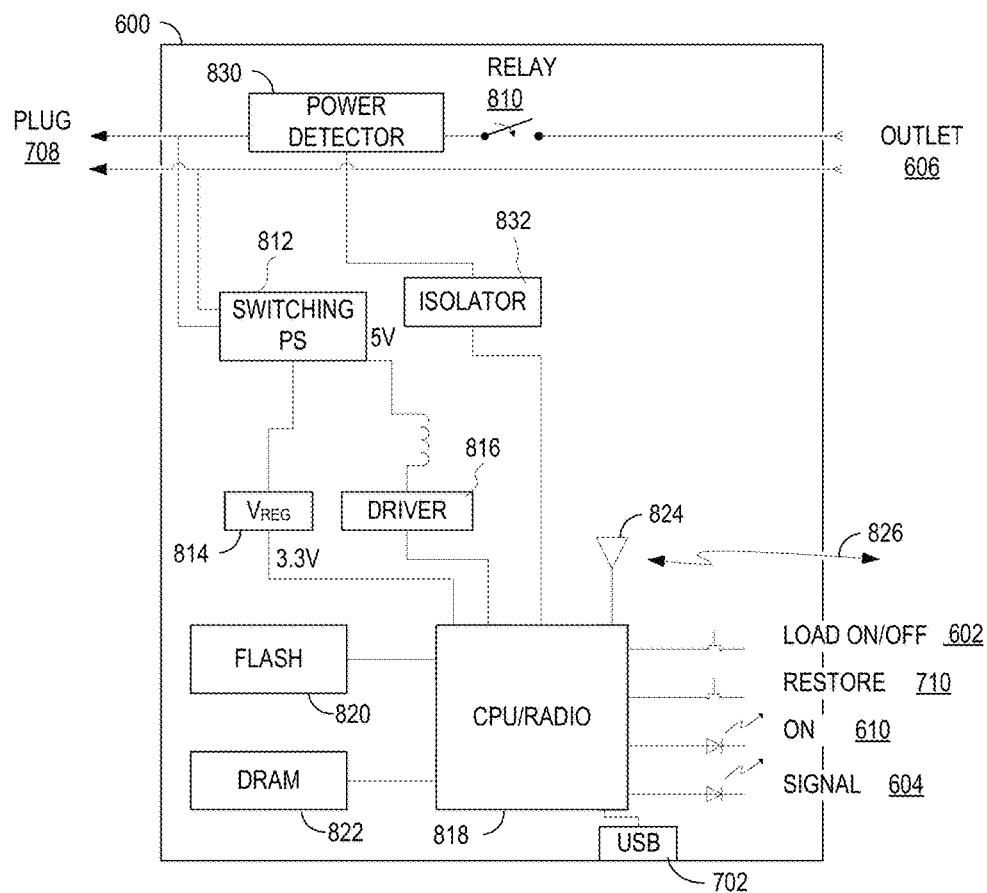
FIG. 8 is an example of a block diagram of a network device, in accordance with an embodiment.

FIG. 8 is an example of a block diagram of the network device 600 depicting different hardware and/or software components of the network device 600. As described above with respect to FIGS. 6 and 7, the network device 600 includes the outlet 606, the plug 708, the power button 602, the restore button 710, and the communications signal indicator 604. The network device 600 also includes power indicator light source 610 associated with the power button 602. As previously described, the power indicator light source 610 may be illuminated when the network device 600 is powered on.

The network device 600 further includes a relay 810. The relay 810 is a switch that controls whether power is relayed from the plug 708 to the outlet 606. The relay 810 may be controlled either manually using the power button 602 or remotely using wireless communication signals. For example, when the power button 602 is in an ON position, the relay 810 may be closed so that power is relayed from the plug 708 to the outlet 606. When the power button 602 is in an OFF position, the relay 810 may be opened so that current is unable to flow from the plug 708 to the outlet 606. As another example, an application or program running on an access device may transmit a signal that causes the relay 810 to be opened or closed. For instance, an access application may display a graphical interface on the access device that includes a power button. The user may tap or otherwise select the power button, and the access application may send a communication signal (e.g., over a WiFi network) to the network device 600 instructing the network device 600 to open or close the relay 810.

The network device 600 further includes flash memory 820 and dynamic random access memory (DRAM) 822. The flash memory 820 may be used to store instructions or code relating to an operating system, one or more applications, and any firmware. The flash memory 820 may include nonvolatile memory so that any firmware or other program can be can updated. In the event the network device 600 loses power, information stored in the flash memory 820 may be retained. The DRAM 822 may store various other types of information needed to run the network device 600, such as all runtime instructions or code.

The network device 600 further includes a CPU/Radio 818. The CPU/Radio 818 controls the operations of the network device 600. For example, the CPU/Radio 818 may execute various applications or programs stored in the flash memory 820 and/or the dynamic random access memory (DRAM) 822. The CPU/Radio 818 may also receive input from the various hardware and software components, interpret the input, and perform one or more functions in response to the input. As one example, the CPU/Radio 818 may determine whether the power button 602 has been pressed, and determines whether the relay 810 needs to be opened or closed. The CPU/Radio 818 may further perform all communications functions in order to allow the network device 600 to communicate with other network devices, one or more gateways, a cloud network, and/or one or more access devices. While the CPU and radio of the network device 600 are shown to be combined in the CPU/Radio 818, it will be appreciated that, in some embodiments, the CPU and radio may be separately located within the network device 600. For example, CPU circuitry may be situated at a separate location on a circuit board from the location of radio circuitry, the CPU circuitry may be located on a different circuit board from the radio circuitry, or the like. Further, the network device 600 may include multiple radios that are configured to communicate using one or more communication protocols, such as any combination of a WiFi™ transceiver radio, a Bluetooth™ transceiver radio, a Zigbee™ transceiver radio, a UWB transceiver radio, a WiFi-Direct transceiver radio, a BLE transceiver radio, and/or any other wireless network transceiver radio or interface. In some embodiments, the network device 600 does not include a cellular network transceiver radio or interface, and thus may not be configured to directly communicate with a cellular network. In some embodiments, the network device 600 may include a cellular network transceiver radio, and may be configured to communicate with a cellular network using the cellular network transceiver radio.

The network device 600 may communicate with other devices and/or networks via antenna 824. For example, antenna 824 may include a 2.4 GHz antenna, a 5 GHz antenna, or the like, that can transmit and receive WiFi communications signals. The network device 600 may include other types of antennas that can communicate Bluetooth® signals, Zigbee® signals, Ultra-Wideband (UWB) signals, WiFi-Direct signals, BLE signals, and/or the like. In some embodiments, the antenna 824 may be configured to communicate different types of signals, such as the WiFi signals, Bluetooth® signals, Zigbee® signals, UWB signals, WiFi-Direct signals, BLE signals, and/or the like. In some embodiments, the network device 600 may include multiple antennas for communicating the different types of communication signals. As one example, the network device 600 may include both a 2.4 GHz antenna and a 5 GHz antenna.

The network device 600 further includes a driver 816, a switching power supply 812, and a voltage regulator 814. The driver 816 may include instructions or code that can be used to translate control signals or commands received from applications running on the DRAM 822 to commands that the various hardware components in the network device 600 can understand. In some embodiments, the driver 816 may include an ambient application running on the DRAM 822. The switching power supply 812 may be used to transfer power from the outlet in which the plug 708 is connected to the various loads of the network device 600 (e.g., CPU/Radio 818). The switching power supply 812 may efficiently convert the voltage and current characteristics of the electrical power to a level that is appropriate for the components of the network device 600. For example, the switching power supply 812 may perform AC-DC conversion. In some embodiments, the switching power supply 812 may be used to control the power that is relayed from the plug 708 to the outlet 606. The voltage regulator 814 may be used to convert the voltage output from the switching power supply 812 to a lower voltage usable by the CPU/Radio 818. For example, the voltage regulator 814 may regulate the DC voltage from 5 V to 3.3 V.

The network device 600 can include a power detector 830 positioned to measure electrical characteristics of power being supplied to the outlet 606. In some embodiments, the power detector 830 is placed to measure electrical characteristics of the power being supplied to the outlet 606. The power detector 830 can include one or more components placed near, on, around, in series with, or in parallel with the circuit between the plug 704 and the outlet 606.

In some embodiments, the power detector 830 is an integrated circuit capable of measuring electrical characteristics, such as voltage, current, true power, power factor, RMS power, and others. In some embodiments, the power detector 830 can include one or more of a shunt resistor, a voltage detector, a current transformer, a current clamp, a hall effect sensor, or an optoisolator. The power detector 830 can be any suitable current and/or voltage transducer capable of providing calibrated or non-calibrated measurements of electrical characteristics. Other suitable power detectors 830 can be used.

The power detector 830 can be coupled to the CPU/radio 818 directly, or through an isolator 832. The isolator 832 can help separate the hot mains voltage from the low voltage of the CPU/radio 818. In some embodiments without an access port 702, as described in further detail herein, the power detector 830 may be coupled directly to the CPU/radio 818.

An access port 702, such as a USB port, is coupled to the CPU/radio 818. The access port 702 can provide access to download data, such as logged, historical electrical characteristics data, to another device, such as a computer. In some embodiments, the access port 702 can be used to add additional sensors to the network device 600.

In various embodiments, functions may be stored as one or more computer-program products, such as instructions or code, in a non-transitory machine-readable storage medium, such as the flash memory 820 and/or the DRAM 822. The network device 600 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above, for example as described with respect to FIG. 2, may be implemented as code and/or instructions executable by a computer (and/or a processor within a computer); in an aspect, then, such code and/or instructions can be used to configure and/or adapt a computer (or other device) to perform one or more operations in accordance with the described methods. Such functions or code may include code to perform the steps described above with respect to FIG. 2. The memory, such as the flash memory 820 and/or the DRAM 822, may be a processor-readable memory and/or a computer-readable memory that stores software code (programming code, instructions, etc.) configured to cause a processor(s) within the CPU/Radio 818 to perform the functions described. In other embodiments, one or more of the functions described may be performed in hardware.

A set of these instructions and/or code might be stored on a non-transitory machine-readable storage medium, such as the flash memory 820 and/or the DRAM 822. In some cases, the storage medium might be incorporated within a computer system, such as the CPU/Radio 818. In other embodiments, the storage medium might be separate from a computer system (e.g., a removable medium, such as a compact disc), and/or provided in an installation package, such that the storage medium can be used to program, configure and/or adapt a computer with the instructions/code stored thereon. These instructions might take the form of executable code, which is executable by the network device 600 and/or might take the form of source and/or installable code, which, upon compilation and/or installation on the network device 600 (e.g., using compilers, installation programs, compression/decompression utilities, etc.) then takes the form of executable code.

It should be appreciated that the network device 600 may have other components than those depicted in FIGS. 6-8. Further, the embodiment shown in the figures are only one example of a network device that may incorporate an embodiment of the invention. In some other embodiments, network device 600 may have more or fewer components than shown in the figure, may combine two or more components, or may have a different configuration or arrangement of components.

Figure 9:
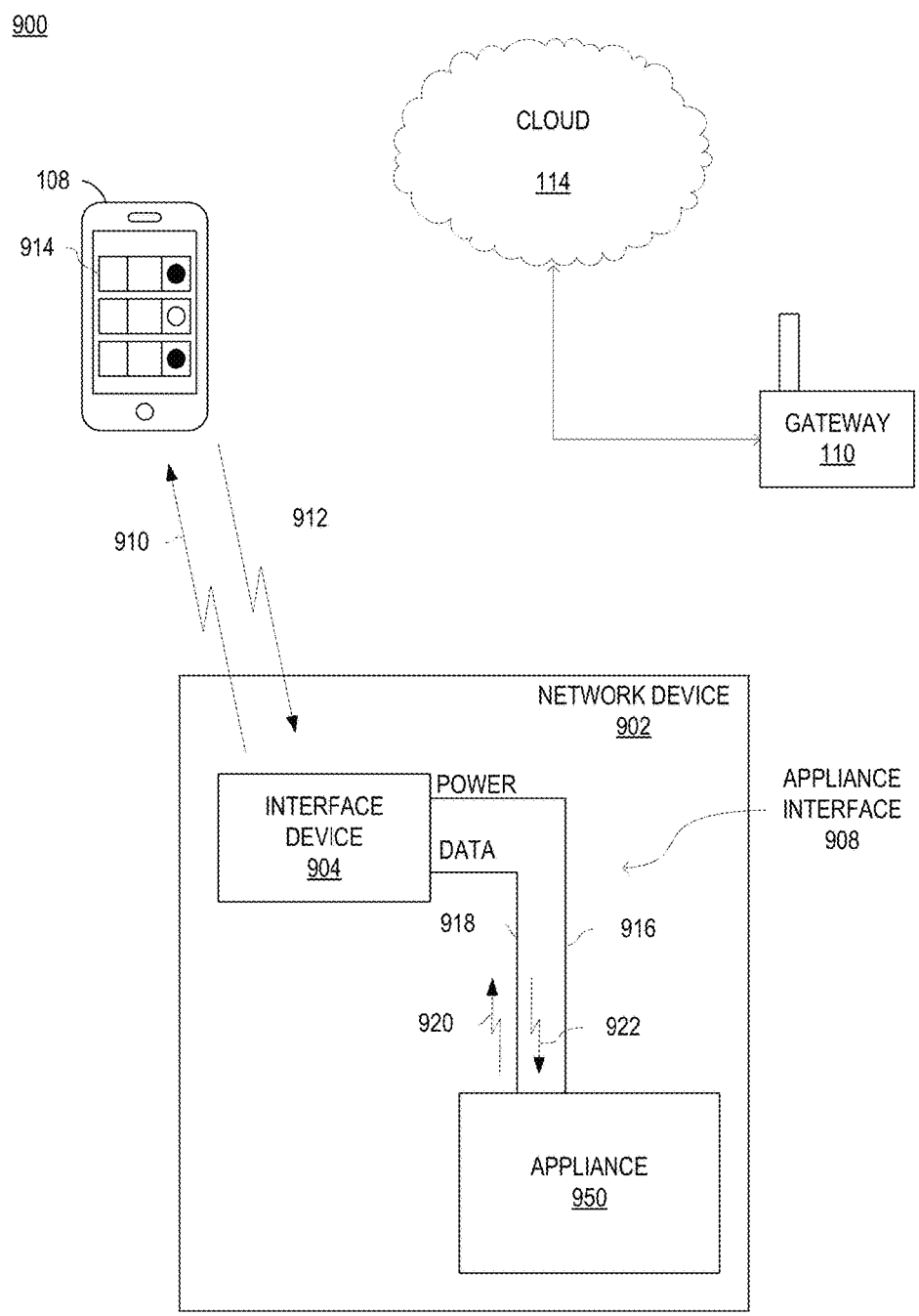
FIG. 9 is a schematic illustration of a local area network including a network device that includes an appliance, in accordance with an embodiment.

FIG. 9 is a schematic illustration of a local area network 900 including a network device 902 that includes an appliance 950. The network device 902 can comprise an interface device 904 and the appliance 950 connected by an appliance interface 908. The appliance interface 908 can include a data connection 918 and a power connection 916. The data connection 918 can be a serial connection (e.g., RS-232, USB, or other), or any other suitable data connection. The interface device 904 can be fully powered by the network device 902 through the power connection 916, or can have a separate source of power.

The appliance 950 can be any suitable electric device, such as a crock pot, a space heater, an iron, a washing machine, a dishwasher, a lamp, a radio, a computer, an amplifier, or another electrical device. Additional examples of suitable electrical devices include electrical devices incorporated into or with non-electrical devices, such as an actuator system in an electrically-actuated deadbolt, a sensing system in a seat cushion, or other suitable electrical device incorporated into or with a non-electrical device. The appliance 950 can be adapted to operate with the interface device 904. The appliance 950 can be any finite state machine. The appliance 950 can, but need not, know or store one or more states related to the appliance. For example, the appliance 950 may know or store data related to whether the appliance 950 is turned on, how long the appliance has been on (or off), among other status data.

The interface device 904 can be positioned within the housing of the appliance 950, or can be attached externally to the appliance 950. The interface device 904 can be removable from the appliance 950, or can be permanently installed in or on the appliance 950.

The interface device 904 can be connected to the local area network 900 through a network interface. The interface device 904 can be connected by a wired or wireless connection (e.g., WiFi, Zigbee, or others described herein or well known). In some embodiments, the interface device 904 can be connected directly to the cloud network 114 through a cellular internet connection (e.g., EDGE, LTE, or others).

The interface device 904 can communicate with another network device, an access device 108, or another client device through the network interface 906. The interface device 904 can transmit a status information signal 910 with status information to the access device 108, and the access device 108 can transmit a network device control signal 912 to the interface device 904. The status information signal 910 and the network device control signal 912 can be transmitted between the interface device 904 and the access device 108 using a telecommunications network (e.g., a cellular network, or other suitable broadband network), using a local area network 900 (e.g., through a gateway 110), or using the cloud network 114, although such a signal may pass through an intermediary device or network to do so.

The interface device 904 can interpret the network device control signal 912 and perform actions based on the contents of the network device control signal 912. The network device control signal 912 can include commands that can be performed by the interface device 904 itself. The network device control signal 912 can also include commands that are to be performed by the appliance 950. Commands that are to be performed by the appliance 950 can include commands like turn on or off, set a desired temperature (e.g., heat up or cool down to 215° F. or any other temperature), or other suitable commands depending on the particular appliance. The interface device 904 can interpret the network device control signal 912 and can send out a command 922, through the data connection 918 of the appliance interface 908, based on the network device control signal 912. The appliance 950 can then perform the command indicated in the network device control signal 912.

The interface device 904 can also transmit commands to the appliance 950 that are not based on a network device control signal received from the access device 108, but are rather based on programming in the interface device 904. Examples of such commands can include commands to update a communication rate, commands to check a state of the appliance 950, commands to set or get a clock time of the appliance 950, or any other suitable commands.

The interface device 904 can receive, through the data connection 918 of the appliance interface 908, a response (e.g., response 920) to any command from the appliance 950. In some examples, the response 920 can include an indication that the command 922 was received. In some examples, the response may include only an indication that a command is received (e.g., an ACK). In some examples, the response 920 can include information for some value on the appliance 950, such as an "on/off" state, a serial number, a product identification, a manufacturer identification, a temperature, a time since live, a setting, or any other value retrievable from the appliance 950. The interface device 904 can interpret the value and can send information about the value (e.g., the state of the appliance is "on," the temperature of the appliance, the time since the appliance first turned on, or other information) as status information (e.g. using status information signal 910) to the access device 108. Additionally, the interface device 904 can send status information about itself (e.g., time since live, supplied power, signal strength, and others) as status information (e.g. using status information signal 910) to the access device 108.

The interface device 904 can also use responses (e.g., response 920) from the appliance 950 to perform additional functions at the interface device 904, such as error handling. In some cases, when performing the additional functions, the interface device 904 does not transmit any status information 910 to the access device 108 based on those particular responses.

The access device 108 can include one or more display tiles (e.g., display tile 914) for displaying information and controls corresponding to the network device 102.

In some embodiments, the interface device 904 can transmit a heartbeat command (e.g., command 922) over the data connection 918 to the network device 902 to determine whether the appliance 950 is working properly and/or in a state of readiness. If the interface device 904 determines that the appliance 950 has had some sort of failure (e.g., the appliance 950 sends a response 920 indicating a failure or the interface device 904 does not receive any response 920), the interface device 904 can take corrective action (e.g., restarting the appliance 950 or an element of the appliance 950), can log the event, or can alert the user).

Figure 10:
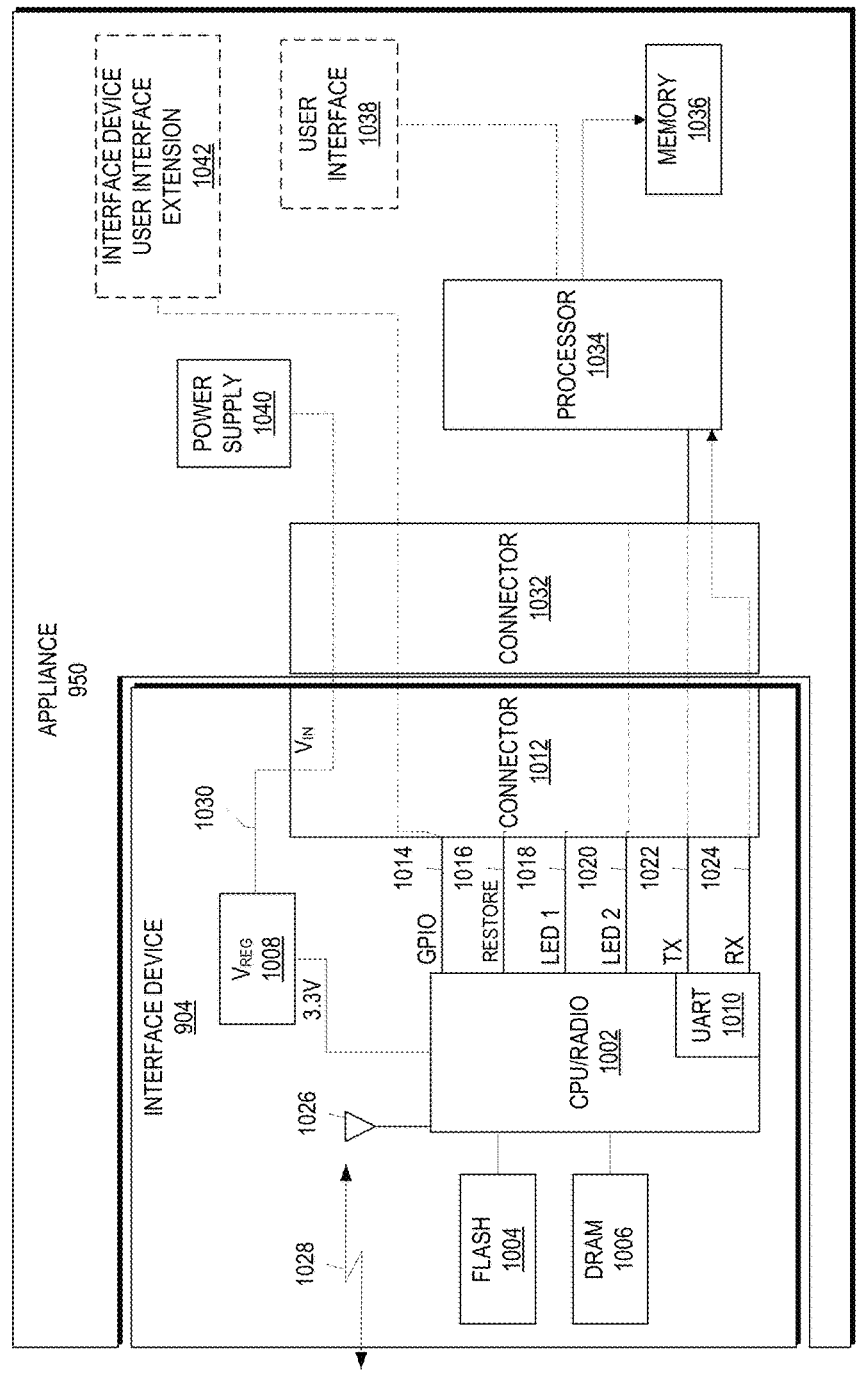
FIG. 10 is an example of a block diagram of a network device including an interface device attached to an appliance, in accordance with an embodiment.

FIG. 10 depicts a block diagram of a network device including an interface device 904 attached to an appliance 950 according to one embodiment. The interface device 904 can include connector 1012 that interacts with connector 1032 of the appliance 950.

The interface device 904 can include flash memory 1004 and dynamic random access memory (DRAM) 1006. The flash memory 1004 may be used to store instructions or code relating to an operating system, one or more applications, and any firmware. The flash memory 1004 can be used to store a cache. The flash memory 1004 may include non-volatile memory so that any firmware or other program can be can updated. In the event the interface device 904 loses power, information stored in the flash memory 1004 may be retained. The DRAM 1006 may store various other types of information needed to run the interface device 904, such as all runtime instructions or code. The flash memory 1004 or DRAM 1006 or a combination thereof may include all instructions necessary to communicate with an appliance 950, including all instructions necessary to communicate using the appliance serial protocol disclosed herein.

The interface device 904 further includes a CPU/Radio 1002. The CPU/Radio 1002 can control the operations of the interface device 904. For example, the CPU/Radio 1002 may execute various applications or programs stored in the flash memory 1004 and/or the dynamic random access memory (DRAM) 1006. The CPU/Radio 1002 may also receive input from the appliance 950, interpret the input, and perform one or more functions in response to the input. The CPU/Radio 1002 may further perform all communications functions in order to allow the interface device 904 to communicate with other network devices, one or more gateways, a cloud network, and/or one or more access devices. The interface device 904 may communicate with other devices and/or networks via antenna 1026. For example, antenna 1026 may include a 2.4 GHz antenna that can transmit and receive WiFi communications signals 1028. The antenna 1026 may include other types of antennas that can transmit and/or receive Bluetooth® signals, Zigbee® signals, Ultra-Wideband (UWB) signals, and/or the like. In some embodiments, the interface device 904 may include multiple antennas for communicating different types of communication signals.

The CPU/Radio 1002 can include at least one universal asynchronous receiver/transmitter (UART) 1010. The CPU/Radio 1002 can use the UART 1010 to send and receive serial communications. The CPU/Radio 1002 can send data through a transmit line 1022 and a receive data through a receive line 1024. The CPU/Radio 1002 can send and receive data through the transmit line 1022 and receive line 1024 using a serial protocol, such as RS232. The CPU/Radio 1002 can also include an input/output (GPIO) line 1014, a restore line 1016, an LED 1 line 1018, and an LED 2 line 1020. The CPU/Radio 1002 can have additional or fewer lines as necessary. The GPIO line 1014 can be used for any suitable function, such as powering an indicator light on an appliance 950 or accepting an input from the appliance 950. A signal sent on the restore line 1016 can be used to restore the CPU/Radio 1002 and/or the interface device 904 to factory defaults. The LED 1 line 1018 and LED 2 line 1020 can be used to power first and second LEDs that can be used to indicate various statuses, such as whether the interface device has a network connection and whether the interface device is powered on.

The interface device 904 further includes a voltage regulator 1008. The voltage regulator 1008 may be used to convert the voltage output from the appliance 950 to a voltage usable by the CPU/Radio 1002. For example, the voltage regulator 1008 may regulate the DC voltage from 5 V to 3.3 V. The voltage regulator 1008 can be supplied with power from a power line 1030.

Each of the interface lines, including the GPIO line 1014, the restore line 1016, the LED 1 line 1018, the LED 2 line 1020, the transmit line 1022, the receive line 1024, the power line 1030, and any additional lines, can be routed through connector 1012. Connector 1012 can be a proprietary or universal connector. Any appliance 950 to which the interface device 904 is attached through the connector 1012 can have the necessary hardware to make use of the interface lines, such as to provide power to the power line 1030 and to provide the first and second LEDs that are driven by the LED 1 line 1018 and LED 2 line 1020.

In alternate embodiments, some interface lines are not routed through the connector 1012. For example, the power line 1030 can be routed to a power supply attached directly to the interface device 904, and the LED 1 line 1018 and LED 2 line 1020 can be routed to first and second LEDs located within the interface device 904.

In various embodiments, functions may be stored as one or more instructions or code in memory, such as the flash memory 1004 and/or the DRAM 1006. The interface device 904 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed below may be implemented as code and/or instructions executable by a computer (and/or a processor within a computer); in an aspect, then, such code and/or instructions can be used to configure and/or adapt a device (e.g. a specialty computer) to perform one or more operations in accordance with the described methods. Such functions or code may include code to perform various steps described below. The memory, such as the flash memory 1004 and/or the DRAM 1006, may be a processor-readable memory and/or a computer-readable memory that stores software code (programming code, instructions, etc.) configured to cause a processor(s) within the CPU/Radio 1002 to perform the functions described. In other embodiments, one or more of the functions described may be performed in hardware.

A set of these instructions and/or code might be stored on a computer-readable storage medium, such as the flash memory 1004 and/or the DRAM 1006. In some cases, the storage medium might be incorporated within a computer system, such as the CPU/Radio 1002. In other embodiments, the storage medium might be separate from a computer system (e.g., a removable medium, such as a compact disc), and/or provided in an installation package, such that the storage medium can be used to program, configure and/or adapt a device (e.g. a computer) with the instructions/code stored thereon. These instructions might take the form of executable code, which is executable by the interface device 904 and/or might take the form of source and/or installable code, which, upon compilation and/or installation on the interface device 904 (e.g., using any of a variety of compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

The interface device 904 may have other components than those depicted in FIG. 10. Further, the embodiment shown in the figures are only one example of an interface device that may incorporate an embodiment of the invention. In some other embodiments, interface device 904 may have more or fewer components than shown in the figure, may combine two or more components, or may have a different configuration or arrangement of components.

The appliance 950 can have a processor 1034. The processor 1034 can be a microcontroller, such as a Peripheral Interface Controller (PIC). The appliance 950 can include a memory 1036 (e.g., a flash memory or other) that is readable by the processor 1034. The memory 1036 can include instructions enabling the innate functionality of the appliance 950, such as heating and timing for a crock pot.

The appliance 950 can include a user interface 1038. The user interface 1038 can provide buttons, displays, LEDs, knobs, and other input and output elements necessary for a user to interact with the appliance 950. For example, a user interface 1038 for a slow cooker can include a display, a power button, a temperature adjustment button, and a start button. The user interface 1038 can be driven and/or monitored by the processor 1034. In some embodiments, the appliance 950 is "headless" or has no user interface 1038.

The appliance 950 can include a power supply 1040 that can provide power to the voltage regulator 1008 of the interface device 904 through connector 1032, connector 1012, and power line 1030.

The appliance 950 can include an interface device user interface extension 1042. The interface device user interface extension 1042 can include various input and output elements that are passed directly to the interface device 904 without being processed by the processor 1034. Examples of input and output elements of the interface device user interface extension 1042 include LEDs associated with the LED 1 line 1018 and LED 2 line 1020, a hardware restore button associated with the restore line 1016, or any other suitable input/output element.

FIG. 11 illustrates an embodiment of a process 1100 for providing a visual interface module for controlling a network device. As shown, the process 1100 may be performed by one or more computing devices, such as network device 102, a server associated with cloud network 114, or access device 108 described above with reference to FIG. 1. In some embodiments, the network device 102 is associated with a home automation network, such as the local area network 100 described above with respect to FIG. 1. Process 1100 is illustrated as a data flow diagram, the operation of which represents operations that can be implemented in hardware, computer instructions, or a combination thereof. Gateway 110 is connected to cloud network 114, and allows network device 102 to connect to the cloud network 114, the Internet, or other external networks via gateway 110. In some embodiments, the network device 102 may be a home automation network device that allows a user to access, monitor, control, and/or configure various electronic devices such as home appliances located within the user's home including, but not limited to, a television, radio, light bulb, microwave, iron, fan, space heater, sensor, and/or the like. In some embodiments, the user can monitor and control network devices by interacting with a visual interface rendered by the gateway 110 (i.e., a web page for gateway 110), a visual interface rendered on display 1122 of the access device 108, or a visual interface rendered by the network device 102.

In an embodiment, an application may be run on the access device 108. The application may cause the access device 108 to present a display 1122 with a modular visual interface for each network device accessible on the local area network 100. When the application is run on the access device 108, the access device 108 can access a cache 1102.

The cache 1102 can be a local cache located in onboard storage of the access device 108. The cache 1102 can contain a known interface list 1120 with records 1124, 1126 and 1128 including interface information for different, known types of network devices. As shown, each of records 1124, 1126 and 1128 can include a device type, a unique interface module ID, and controls information. The known interface list 1120 can include a record for each device known by the access device 108 to exist on the local area network 100. When the application is run on the access device 108, the access device 108 can access the known interfaces 1120 in the cache 1102 to present the display 1122, which lists modular interfaces for each network device on the local area network 100. In an example, the display 1122 can include a modular tile for each connected network device having an interface in the known interface list 1120. Exemplary communications used to populate cache 1102 are described in the following paragraphs.

The process 1100 can include utilizing communication 1106 to register a visual interface module for a network device 102 with a server of cloud network 114. For simplicity, communication 1106 is shown as a direct communication between network device 102 and cloud network 114. However, it is to be understood that, in an embodiment, communication 1106 can be sent from a manufacturer of network device 102 to cloud network 114. In an additional or alternative embodiment, communication 1106 is sent from third party interface developer to cloud network 114. For example, a third party developer of a visual interface module for network device 102 may initiate communication 1106 to cloud network 114. In the example of FIG. 11, communication 1106 includes registration information for the network device 102. For example, communication 1106 can include a unique device ID for network device 102. In some embodiments, the registration information may identify one or more capabilities of network device 102. The registration information can include a unique identifier for the network device, a default name of the network device, one or more capabilities of the network device, and one or more discovery mechanisms for the network device. In one example, communication 1106 can include a resource bundle corresponding to network device 102. The resource bundle can be embodied as a structured folder structure whose contents define all visual and interactive elements/areas in a tile. For example, a resource bundle can be a zip file sent from a device manufacturer or a third party developer that is submitted or uploaded to cloud network 114. The resource bundle includes a unique device ID and files defining graphical content of a visual interface module. The graphical content can include definitions of interactive elements/areas for the interface module. The resource bundle can include templates defining interactive control states for each of the interactive elements, language translations for tile text, any menus for the tile, and graphical content of the menus. For example, the resource bundle can define templates, text, and graphical content using a markup language, such as HTML5.

At 1106, the process 1100 includes transmitting an indication that network device 102 is associated with the network. For example, network device 102 may transmit the indication to the server of the cloud network 114. In some embodiments, transmitting may include transmitting a unique identifier (ID) for the network device 102. For example, the network device 102 may send a communication to the server indicating a unique interface module ID for the network device 102. In such embodiments, the server may then determine that a match between the unique interface module ID and a known interface exists. The cloud network 114 can include a data store 1104 of known interfaces. The access device 108 can download a visual interface module identified in data store 1104 from the cloud network 114, which can be used to render a modular interface within display 1122. In an embodiment, data store 1104 can be a tile database where each record in the database is uniquely identified by a tile ID.

Cloud network 114 can use the unique device ID to determine an interface module for network device 102. As shown in FIG. 11, cloud network 114 can access a data store 1104 of visual interface modules. A plurality of uniquely identified interface modules can be stored in data store 1104. For example, each interface module in data store 1104 can be associated with a unique interface module ID. In an embodiment, data store 1104 is a database configured to store modular tiles for a plurality of network devices, with each of the stored modular tiles being identified by a unique tile ID. For instance, the network device 102 having a unique device identifier may be matched with an existing interface module based on comparing information received from the network device 102 with information stored in data store 1104. In cases where an existing interface module for network device 102 is not found in data store 1104, cloud network 114 can use information in a resource bundle for the network device 102 to generate an interface module, where the resource bundle is provided as part of a registration process for a given network device. The generated interface module can then be stored in data store 1104 and assigned a unique interface module ID. In some embodiments, information in the resource bundle can be used to update an existing interface module stored in data store 1104. After determining the interface module for network device 102, cloud network 114 sends communication 1108 to network device 102 in order to provide a unique interface module ID to the network device 102. In one embodiment, communication 1108 can include a unique tile ID corresponding to a modular tile for network device 102 that is stored in data store 1104. In some embodiments, communication 1108 includes a unique tile ID corresponding to a modular tile defined for network device 102. Upon receiving communication 1108 with the unique interface module ID (i.e., a unique tile ID), the network device 102 can store the unique interface module ID. In one embodiment, for example, the unique interface module ID can be stored by an interface device 1101 of the network device 102 that is configured to provide the interface module ID to an access device or gateway. In an embodiment, the interface device 1101 is implemented as a 'smart module' in hardware and firmware, such as, for example, a system on a chip (SOC) integrated into the network device 102.

The interface device 1101 can include flash memory and dynamic random access memory (DRAM). The flash memory may be used to store instructions or code relating to an operating system, one or more applications, and any firmware. The flash memory may include nonvolatile memory so that any firmware or other program can be can updated. In the event the interface device 1101 loses power, information stored in the flash memory may be retained. The DRAM of the interface device 1101 may store various other types of information needed to run the interface device 1101, such as all runtime instructions or code. The flash memory or DRAM or a combination thereof may include all instructions necessary to communicate with network device 102.

The process 1100 can include sending, from the access device 108, intra-network communication 1110 including a query, to the network device 102. The query can be a request for information such as a query for capabilities, a request for an identity of the network device 102, and/or a request for a unique interface module ID. For example, communication 1110 can be sent from access device 108 to network device 102 to query network device 102 about its identity. In response to the query sent from access device 108, the process 1100 can include receiving intra-network communication 1112 at the access device 108 with device information for the network device 102. According to an embodiment, in response to the query, the network device 102 can send communication 1112 to inform the access device 108 of the identity and/or capabilities of the network device 102. For instance, in response to receiving the query, the network device 102 may send communications 1112 to the access device 108 with at least a unique interface module ID. The process 1100 can include utilizing intra-network device communications 1110 and 1112 as part of a discovery process for the network device 102. For example, when the network device 102 is initially connected to the network, it and access device 108 can automatically exchange communications 1110 and 1112 to provide the access device 108 with information that can be used to determine a basic, default visual interface stored in cache 1102.

Within the context of a modular tile framework, embodiments can dynamically render a functional user interface without having to download the appropriate interface template from a remote server, such as a server associated with the cloud network 114, in order to control a newly discovered network device. These embodiments can be used in cases where a connection to the Internet or the cloud network 114 is unavailable or unreliable, and immediate use of a newly discovered network device is desired. In this case, an application on the access device 108 or a stationary device such as gateway 110 could, based on certain information received from the network device 102, dynamically render a functional interface for immediate use. Such a functional interface may not be the ideal, visually optimized, interface that is downloadable from the cloud network 114. However, such a functional interface will suffice until the application is able connect to the Internet and/or the cloud network 114 and subsequently download the appropriate and visually optimized interface module for the network device 102.

In some embodiments, communication 1112 may be received when the network device 102 is rebooted (e.g., powered on, reset or restored to default settings, or the like). For example, when the network device 102 is rebooted, it may broadcast one or more messages on the local area network 100 to discover whether there are any access devices in the local area network 100. For example, communication 1112 may be broadcast according to a UPnP protocol during a discovery process. The network device 102 may receive communications 1110 from access device 108 indicating that it is located within the local area network 100 and interrogating network device 102 about its functionalities. That is, after receiving a broadcast message from network device 102, access device 108 may then query network device 102 by sending communication 1110 in order to receive the communication 1112 including information about the network device.

After receiving communication 1112, if the access device 108 can access the cloud network 114, it sends a communication 1114 to the cloud network 114 as a request for an interface module for the network device 102. Otherwise, if the access device 108 cannot access the cloud network 114, the access device 108 looks up the unique interface module ID received from the network device 102 in cache 1102. As discussed above, cache 1102 can be a local cache stored on the access device 108. Basic properties for known interfaces can be stored in cache 1102 as a device type and controls information. These basic properties can include, for example, a default icon, a default name, and interactive elements or interactive areas for controlling one or more primary functionalities of a network device. The primary functionalities can include, for example, powering the network device on and off. The basic properties can also include controls information for secondary functionalities.

In some embodiments, when the access device is connected to the cloud network 114, the access device 108 sends communication 1114 to query the cloud network 114 about network device 102. The communication 1114 can include at least the unique interface module ID for the network device 102. At this point, the cloud network 114 can compare the unique interface module ID of the network device 102 to known interface module IDs stored in data store 1104 in order to determine that there is a match between the unique interface module ID sent with communication 1114 and a known interface module. If the cloud network 114 finds an interface module in its data store 1104, it transmits the interface module to the access device 108 via communication 1116. For example, if the access device 108 is currently using a default interface module for network device 102 that was determined based on exchanging communications 1110 and 1112, and then subsequently is able to connect to the cloud network 114, communications 1114 and 1116 between the access device 108 and the cloud network 114 can be used to obtain an updated interface module for the network device 102.

Upon receiving communication 1116 from the cloud network 114, the access device 108 populates a record in cache 1102 corresponding to the network device 102 with device type and controls information received via communication 1116. That is, when the access device is remote from the local area network 100, it can exchange communications 1114 and 1116 with the cloud network 114 to receive an interface module for a network device. Information received via communications 1116 can be used to populate records of cache 1102. Records in cache 1102 can be updated using modular interfaces received via communication 1116. In additional or alternative embodiments, new records can be created in cache 1102 when communication 1116 includes a modular interface for a newly discovered network device.

Records 1124, 1126, 1128 in cache 1102 store network device types, unique interface module IDs, and control information for known network devices. The access device 108 uses the records in cache 1102 to render visual interfaces in the display 1122. For example, the display 1122 can include a navigable list of modular tiles corresponding to network devices in the local area network 100.

Display 1122 can also include an indicator representing a state of network device 102. In embodiments, communications 1112 and/or 1114 can include a last known state of the network device 102 and/or historical data associated with the network device 102. In one embodiment, such state information can be based on information received via communication 1112 from the network device 102 when the access device 108 is connected to the local area network 100. In this way, display 1122 of the access device 108 can reflect a current state and historical data for the network device 102 when the access device is not connected to the local area network 100. In additional or alternative embodiments, the state information can be based on information received via communication 1116 from the cloud network 114 when the access device 108 is connected to the cloud network 114. Using the state information, an interface module or tile for the network device 102 within display 1122 can indicate an 'on' or 'off' state for the network device 102 when the network device is powered on or off.

Figure 12A:
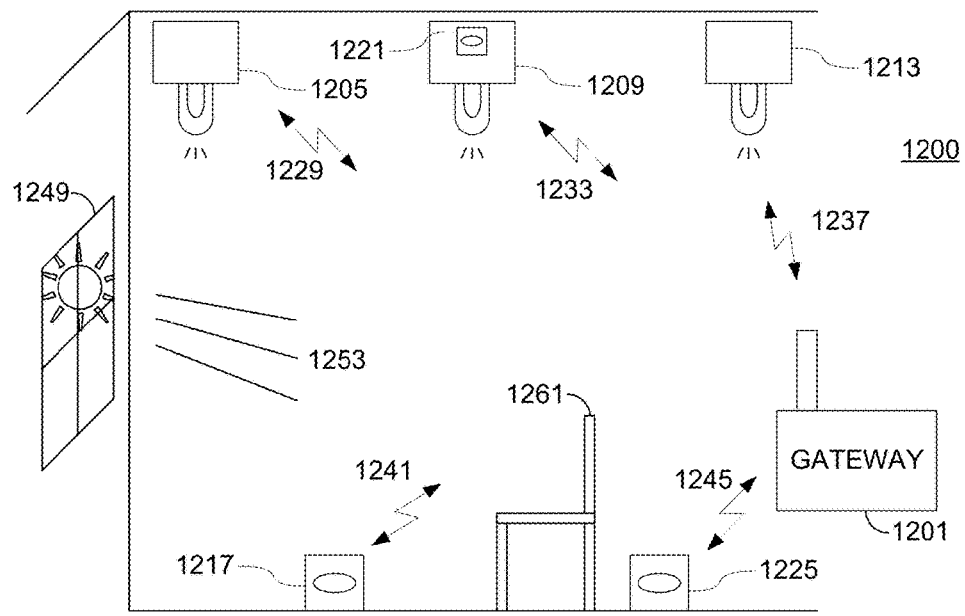
FIG. 12A and FIG. 12B provide illustrations of an example of a network environment, in accordance with some embodiments.
Figure 12B:
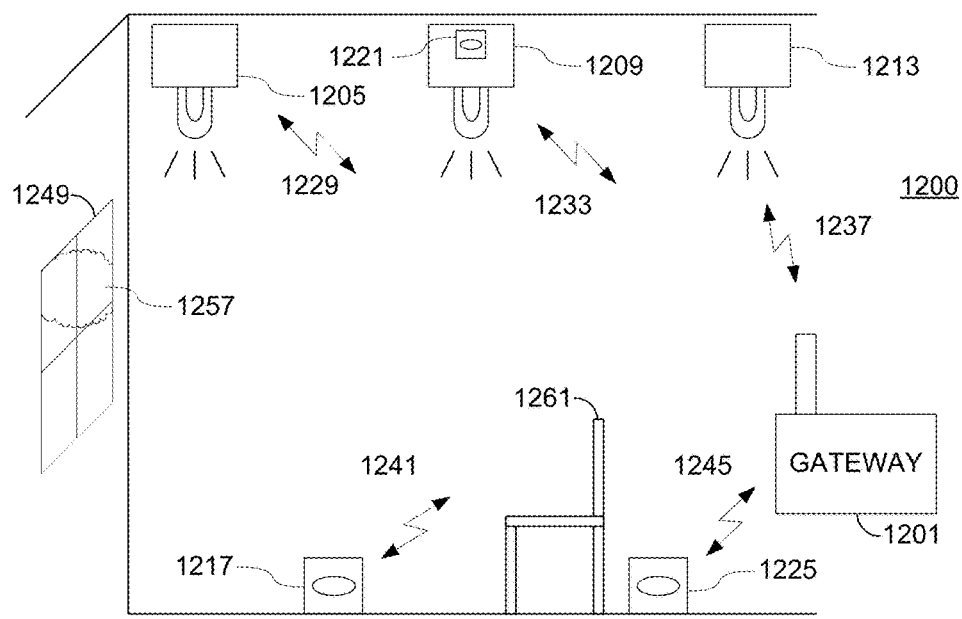

FIG. 12A and FIG. 12B illustrate an embodiment of a local area network 1200 including gateway 1201, network devices 1205, 1209 and 1213, here depicted as network connected light bulbs, and network connected sensors 1217, 1221 and 1225, here depicted as network connected light sensors. As shown in FIGS. 12A and 12B, network device 1209 includes network connected sensor 1221. In the embodiment shown, network devices 1205, 1209, and 1213 are respectively connected to gateway 1201 via wireless connections 1229, 1233, and 1237, while network connected sensors 1217, 1221, and 1225 are respectively connected to gateway 1201 via wireless connections 1241, 1233, and 1245. Other network architectures are contemplated, however, including a mesh network or a relay configuration where one or more network devices or sensors relays wireless transmissions to/from other devices in the local area network. In FIG. 12A, the room containing local area network 1200 includes a window 1249, where sunlight 1253 enters the room. The lighting level in the room, including contributions provided by network devices 1205, 1209, and 1213 and sunlight 1253, is monitored by network connected sensors 1217, 1221, and 1225. If the sensed lighting level falls below a desired reference lighting level, such as may occur as depicted in FIG. 12B where a cloud 1257 obscures entry of the sunlight into the room, the operational status of network devices 1205, 1209, and 1213 is modified to increase an output brightness to bring the overall lighting level closer to the reference lighting level. In addition, should one or more of network devices 1205, 1209, and 1213 malfunction, the operational status of the functioning network devices can be adjusted to accommodate for the lack of light provided by the malfunctioning network device(s).

As shown in the configuration in FIGS. 12A and 12B, the use of multiple network connected sensors allows for a more particularized operational configuration to be established. For example, the lighting levels at various points of the room can be monitored and the output brightness of each of the individual network devices 1205, 1029, and 1213 can be independently controlled to allow more localized lighting conditions in the room to be established. For example, if chair 1261 is positioned to block light from the window 1249 and network devices 1205 and 1209 from being received by network connected sensor 1225, the brightness level of network device 1213 can be increased. Should the brightness level at network connected sensors 1217 and 1221 be brighter than desired due to the increased brightness of network device 1213, the brightness levels of each of network devices 1205, 1209, and 1213 can be independently adjusted.

Figure 13:
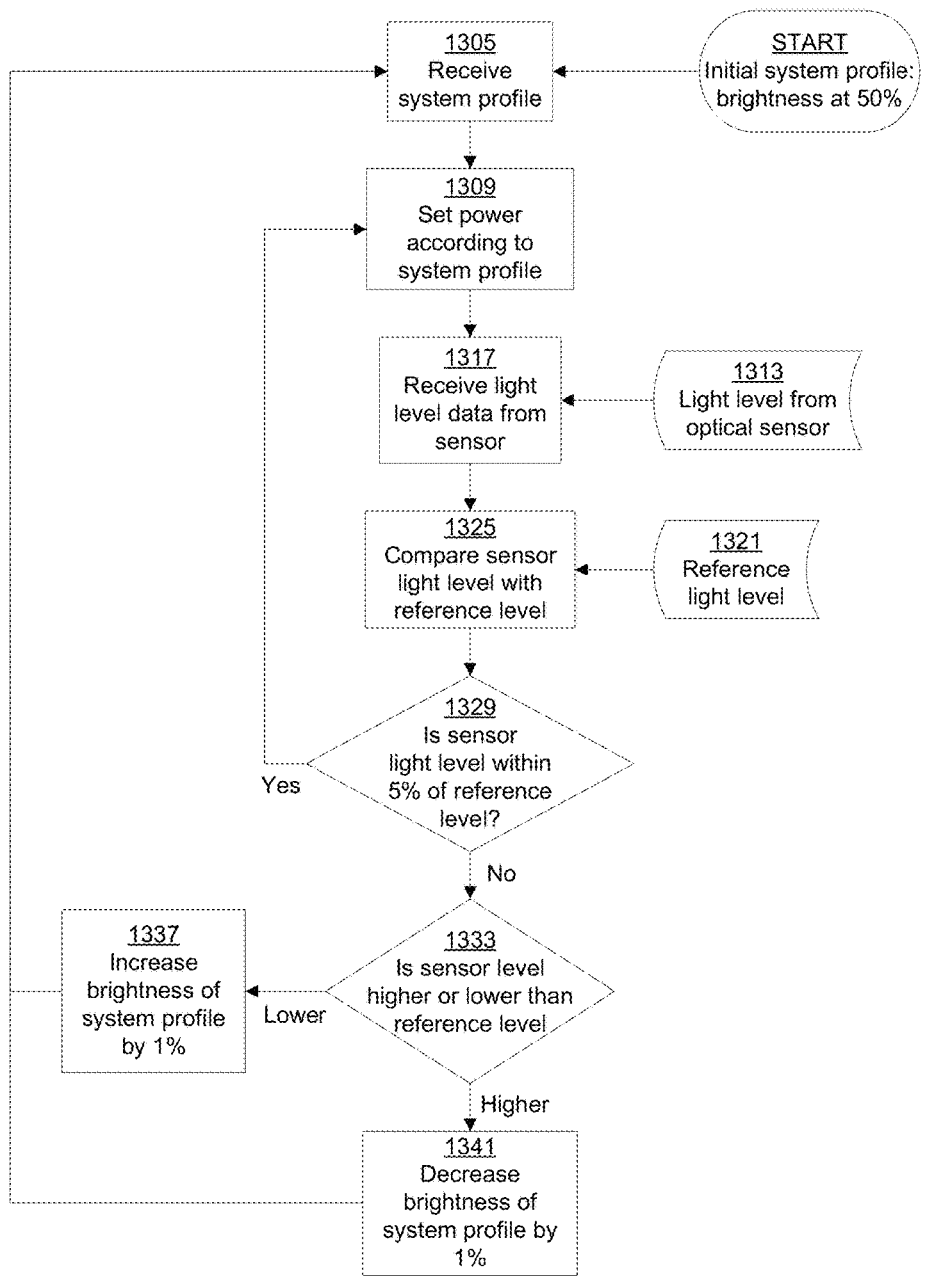
FIG. 13 provides an overview of a method embodiment for autonomously adjusting operation of network devices.

FIG. 13 provides an overview of a method embodiment, such as used with the local area network 1200. An initial system profile is provided and received (1305) at one or more network devices, here exemplified as brightness at 50% of maximum. The network devices are operated according to the initial system profile by setting the brightness at 50%. The light level (1313) from the optical sensor is received (1317) and compared (1325) with a reference light level (1321). In the embodiment shown, if the light level falls within 5% of the reference level, no adjustments are made to the system profile and the devices continue to operate according to the system profile, while additional sensor measurements are made and compared with the reference level. If the sensor light level is not within 5% of the reference level, the power level of the system profile is adjusted depending on whether the sensor level is higher or lower than the reference level (1333). In the case of a sensor level lower than the reference level, the brightness of the system profile is updated and increased by 1% (1337). In the case of a sensor level higher than the reference level, the brightness of the system profile is updated and decreased by 1% (1341). The updated system profile is then received by the network devices (1305) such that the devices can be operated according to the updated system profile, with further monitoring and readjustment of the brightness.

Figure 14:
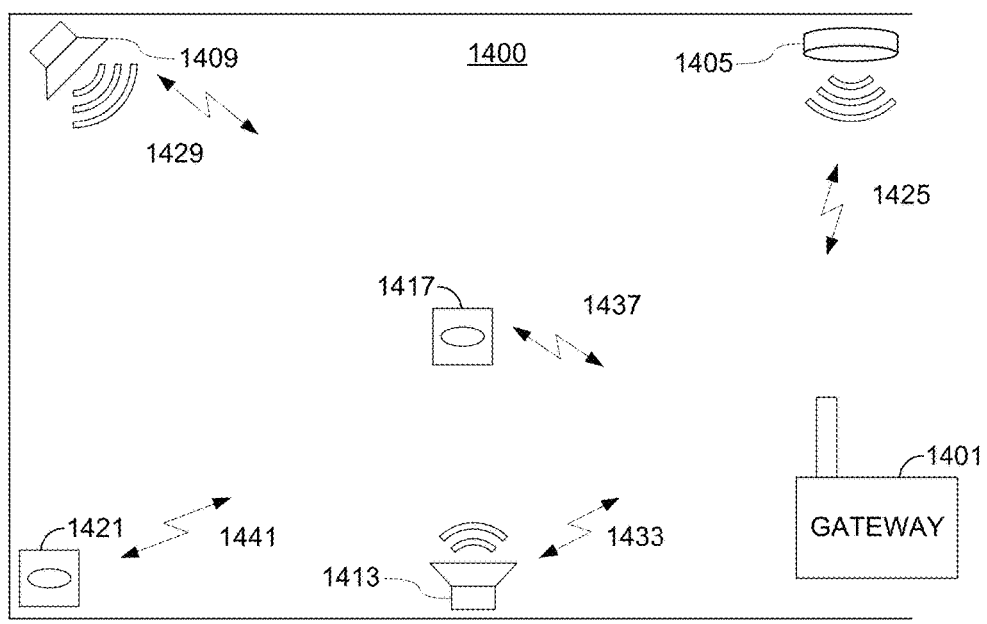
FIG. 14 provides an illustration of an example of a network environment, in accordance with some embodiments.

FIG. 14 illustrates an embodiment of a local area network 1400 including gateway 1401, network devices 1405, 1409, and 1413, here depicted as a network connected smoke detector device 1405 and network connected speaker devices 1409 and 1413, and network connected sensors 1417 and 1421, here depicted as network connected audio monitors (e.g., microphones, sound pressure level sensors, decibel meters, etc.). In the embodiment shown, network devices 1405, 1409, and 1413 are respectively connected to gateway 1401 via wireless connections 1425, 1429, and 1433, while network connected sensors 1417 and 1421 are respectively connected to gateway 1401 via wireless connections 1437 and 1441. Other network architectures are contemplated, however, including a mesh network or a relay configuration where one or more network devices or sensors relays wireless transmissions to/from other devices in the local area network. In embodiments, the local area network can be used to provide audio to multiple locations inside a building, hallway, room, etc. If, for example, the network connected smoke detector device 1405 were to begin emitting an audible alert due to detection of smoke, network connected sensors 1417 and 1421 could monitor the audio levels at their locations away from the network connected smoke detector, such that the audio output levels on network connected speaker devices 1409 and 1413 could be independently set such that they also emitted an audible alert to ensure that the alert was sufficiently audible at the location of network connected sensors 1417 and 1421. Such a configuration allows network connected speaker devices 1409 and 1413 to relay the alert emitted by the network connected smoke detector device 1405 to remote locations, or to be audible in the event that a speaker was malfunctioning or damaged.

Figure 15:
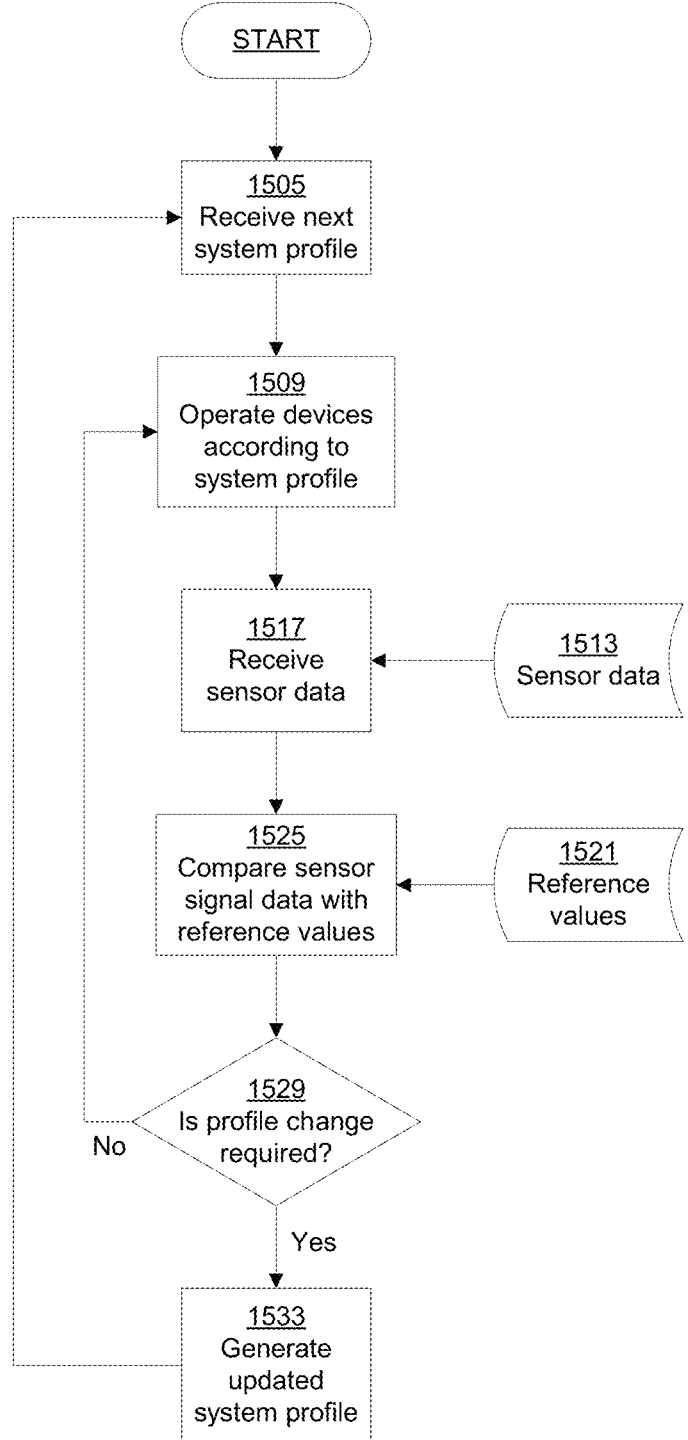
FIG. 15 provides an overview of a method embodiment for autonomously adjusting operation of network devices.

FIG. 15 provides an overview of exemplary method embodiment, such as used with a local area network including one or more network connected sensors and one or more network devices. In the method embodiment described in FIG. 15, a system profile is first received (1505), for example by the one or more network devices. Next the one or more network devices are operated according to the system profile (1509). In general terms, the system profile optionally includes any controllable operational characteristic for the network devices, such as a status of the network device, a power state of the network device, a set point, a level, a position, and the like. Sensor data (1513) is received (1517) and compared (1525) with one or more reference values (1521). Based on the comparison, it is determined whether a change to the system profile is required (1529). If no change is required, the devices continue to operate according to the previous system profile (1509), with subsequent comparison of sensor data with reference values. If a change is required, an updated system profile is generated (1533) and communicated to the one or more network devices. Upon receiving the updated system profile (1505), the devices are operated according to the updated system profile (1509), with subsequent comparison of sensor data with reference values. In this way, the network devices can operate in an iterative fashion to determine whether the changes to the system profile result in a more desirable comparison between the sensor data and the reference values.

For example, in one embodiment, the sensor data comprises a temperature measurement and the reference value comprises a temperature set point. Should the measured temperature fall below the temperature set point, the system profile governing the operation of the network devices can be changed such that the network devices add heat to the environment surrounding the temperature sensor in an attempt to drive the measured temperature closer to the temperature set point. Similar operational principles apply for a cooling configuration, where heat is removed from the environment surrounding the temperature sensor if the measured temperature falls above the temperature set point. Other temperature control schemes are contemplated, including multiple temperature set points (e.g., high and low reference temperatures for cooling and heating, respectively), and time or user controllable schedules.

Figure 16:
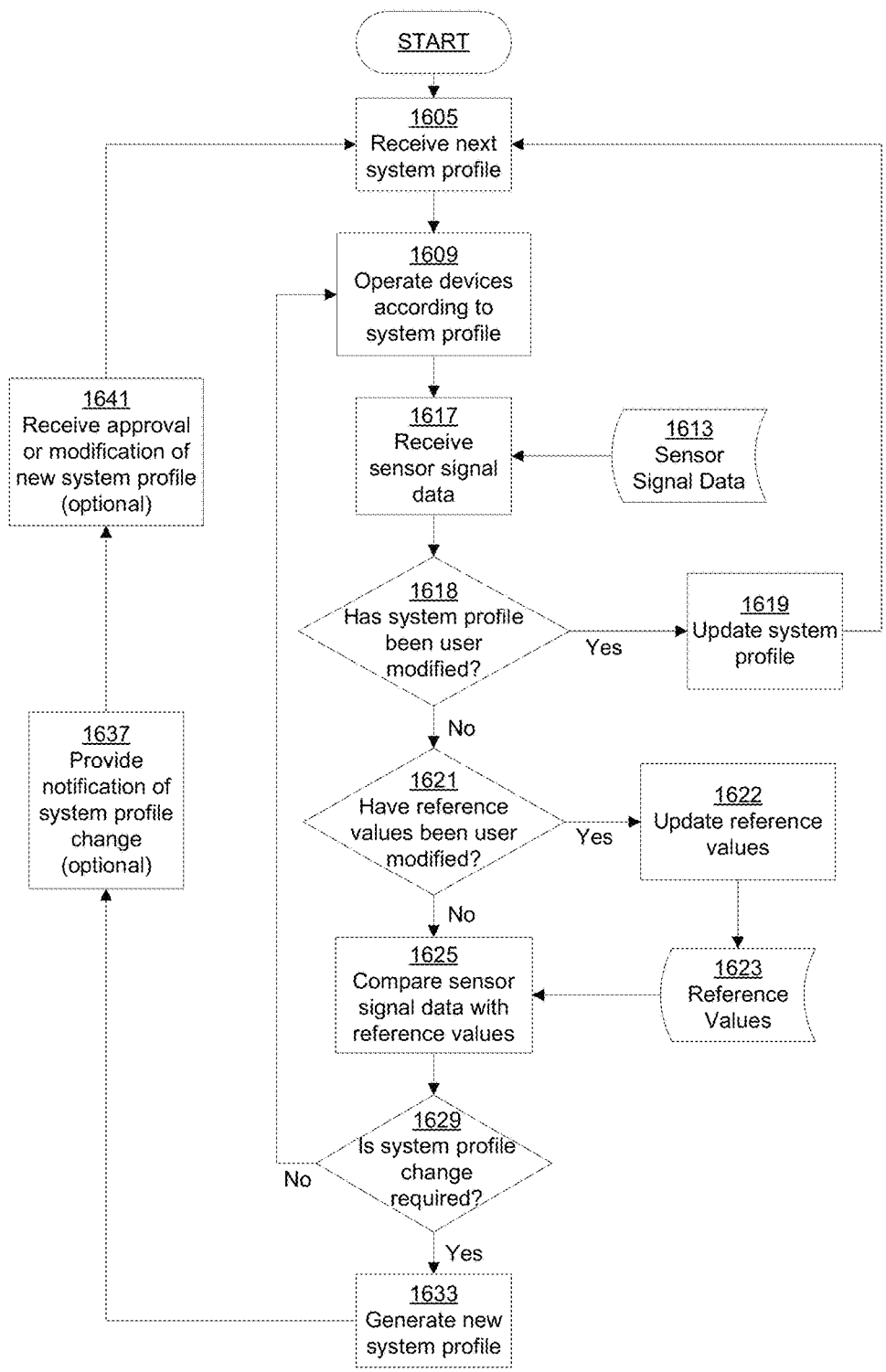
FIG. 16 provides an overview of a method embodiment for autonomously adjusting operation of network devices.

FIG. 16 illustrates an overview of a method embodiment including modification of system profiles and reference values, with optional user notification and approval. Initially, a system profile is received (1605), for example by one or more network devices, that governs the operation of the one or more network devices. Next, the one or more network devices are operated according to the system profile (1609). Sensor data (1613) is received (1617). If the system profile is specifically modified by a user (1618), such as to require a specific network device status or configuration, the system profile is updated (1619) and sent to and received by the one or more network devices (1605). If the reference values (1623) are specifically modified by a user (1621), the reference values are updated (1622). The reference values (1623) are then compared with the signal data (1625) to determine whether a change to the system profile is necessary (1629). If no change is required, the devices continue to operate according to the current system profile (1609). If a change is required, an updated system profile is generated (1633). Optionally, a notification is generated of the change to the system profile (1637) with an optional approval or modification of the updated system profile (1641). The system profile is then sent to and received by the one or more network devices (1605) for the next operation.

Figure 17:
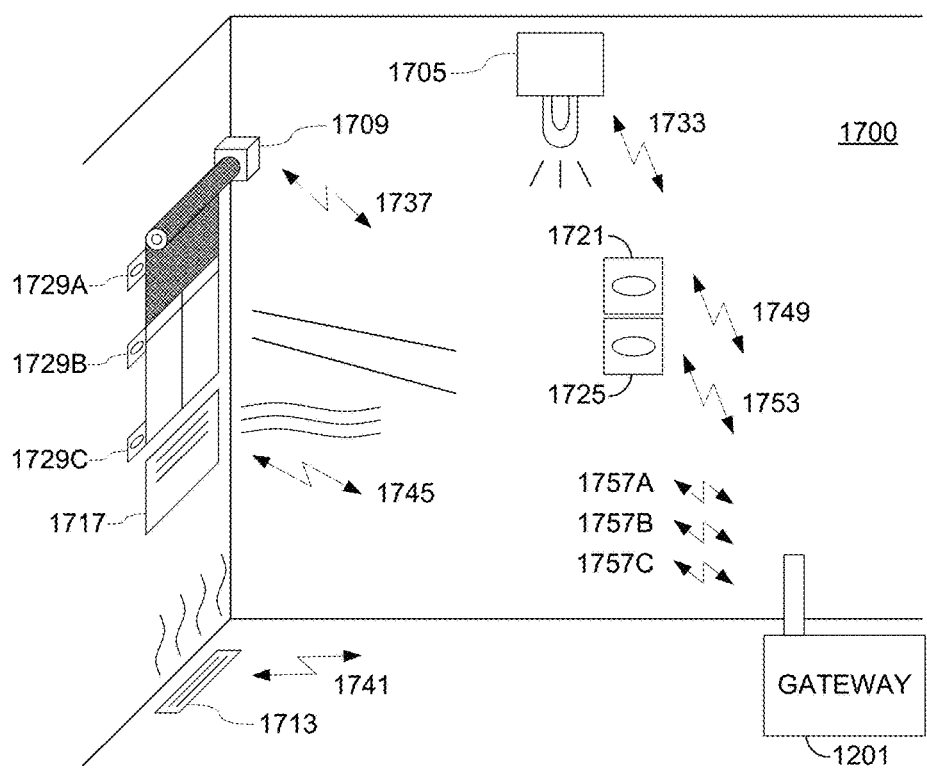
FIG. 17 provides an illustration of an example of a network environment, in accordance with some embodiments.

FIG. 17 illustrates a local area network 1700 including gateway 1701, network devices 1705, 1709, 1713, and 1717, and network connected sensors 1721, 1725, 1729A, 1729B, and 1729C. Network devices 1705, 1709, 1713, and 1717 are respectively depicted here as network connected light bulb device 1705, a network connected shade motor device 1709, a network connected heating system device 1713, and a network connected air conditioner 1717. Network connected sensors 1721, 1725, 1729A, 1729B, and 1729C are respectively depicted here as a network connected light sensor 1721, network connected temperature sensor 1725 and network connected position sensors 1729A, 1729B, and 1729C. Network devices 1705, 1709, 1713, and 1717 and network connected sensors 1721, 1725, 1729A, 1729B, and 1729C, respectively, make network connections 1733, 1737, 1741, 1745, 1749, 1753, 1757A, 1757B, and 1757C with gateway 1701. Status of network devices 1705, 1709, 1713, and 1717, such as operational status, position status, etc., can be changed in response to measurements of network connected sensors 1721, 1725, 1729A, 1729B, and 1729C.

Similar to the above described local area networks and method embodiments, the system profiles for network devices 1705, 1709, 1713, and 1717 can be set such that the status of the network devices influences the sensor measurements, though this is not a requirement for the system. For example, the system profile controlling the operation of network connected light bulb device 1705 can be set such that the light level monitored by light sensor 1725 maintains a relatively constant value, such as may be varied due to daylight conditions entering through the window and the position of the window shade.

Figure 18:
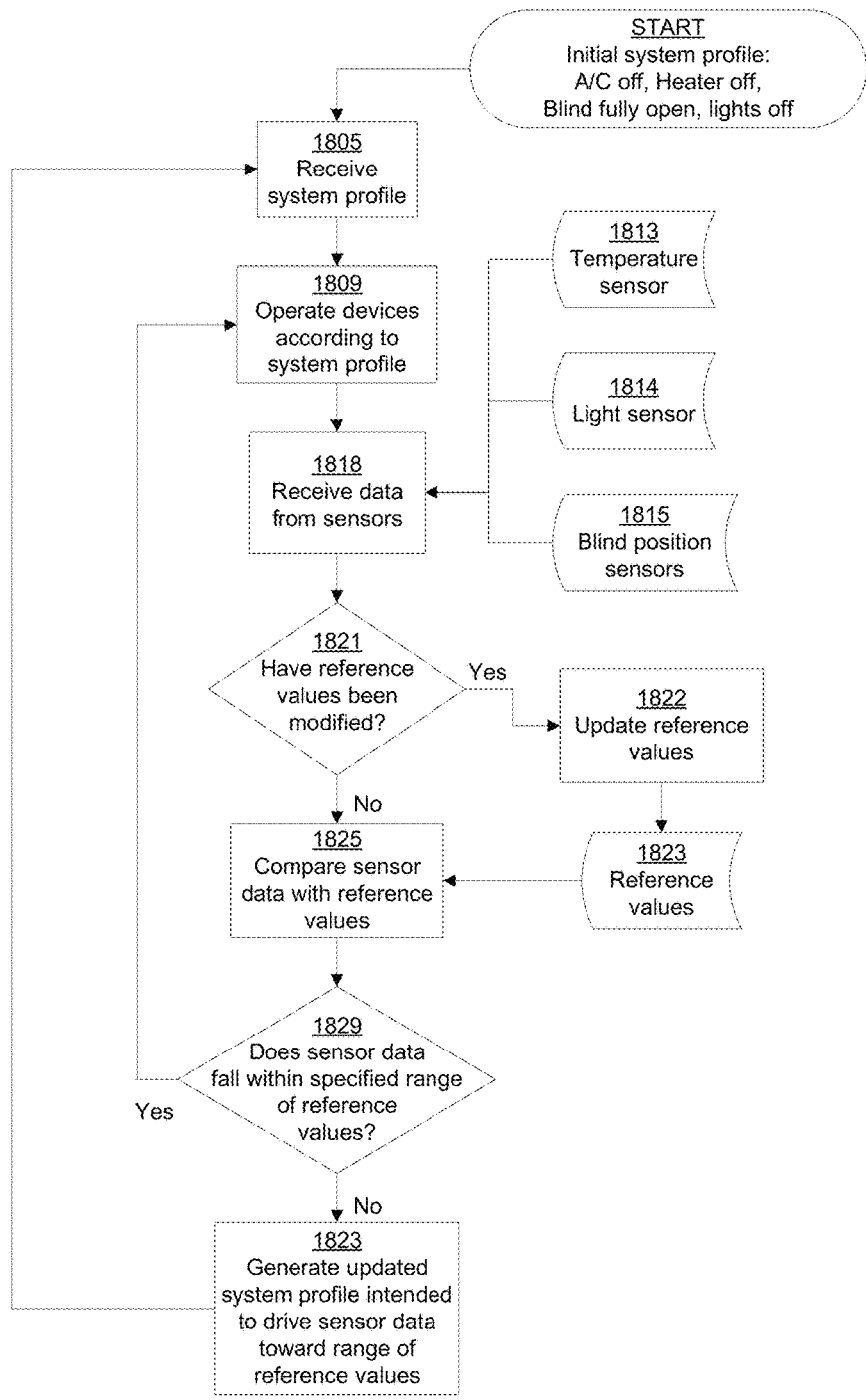
FIG. 18 provides an overview of a method embodiment for autonomously adjusting operation of network devices.

FIG. 18 provides an overview of a method embodiment illustrating such a configuration. First, an initial system profile is received by one or more network devices (1805). The network devices are then operated according to the system profile (1809). Sensor data from the temperature sensor (1813), the light sensor (1814) and the blind position sensors (1815) are received (1818). If the reference values (1823) have been modified (1821), such as by a user or a defined schedule, the reference values are updated (1822). The reference values (1823) and the sensor data are then compared (1825). If the sensor data falls within a defined range of the reference values, no updates are made to the system profile and the network devices continue operating according to the previous system profile (1809). If the sensor data falls outside the defined range of the reference values, an updated system profile is generated, with the intention that the sensor data is driven toward the reference values, such as to minimize the difference between the sensor data and the reference values. Variations on this scheme are contemplated, including introducing one or more time delays to allow the operation of the network devices suitable time to influence the physical quantities sensed by the sensors. In addition, the system profiles can include scheduling information, such as to automatically change a network device's status at a specific time or to limit the available status conditions available to a device during a specific time window.

Additionally, while the control of automatic changes to the system profiles is optionally regimented, such that an iterative method is used for achieving a steady state condition or pseudo-steady state condition, this is not a requirement for the systems and methods described herein. Other techniques are contemplated for changing the system profiles, such as any variety of search heuristics or genetic algorithms. Furthermore, crowd sourced information may be used for establishing a set or permitted range of system profiles. For example, multiple user created system profiles and schedules can be assembled and analyzed to determine patterns of device statuses for similar or comparable local area network configurations. Other algorithms can be implemented for regulating the system profiles, such as to minimize or maximize energy, water or fuel usage, to maximize efficiency, to minimize changes to environmental conditions, such as lighting changes or temperature changes, or to maintain device operational conditions within a targeted range in the event of device malfunction or failure.

Alternatively, however, the system profile controlling the operation of a network connected device can be controlled based on unrelated sensor types and settings. For example, a temperature monitored by temperature sensor can optionally govern the status of a network connected light bulb. In one embodiment, for example, if the temperature detected by sensor is above a specific value, the brightness of network connected light bulb can be increased.

Figure 19:
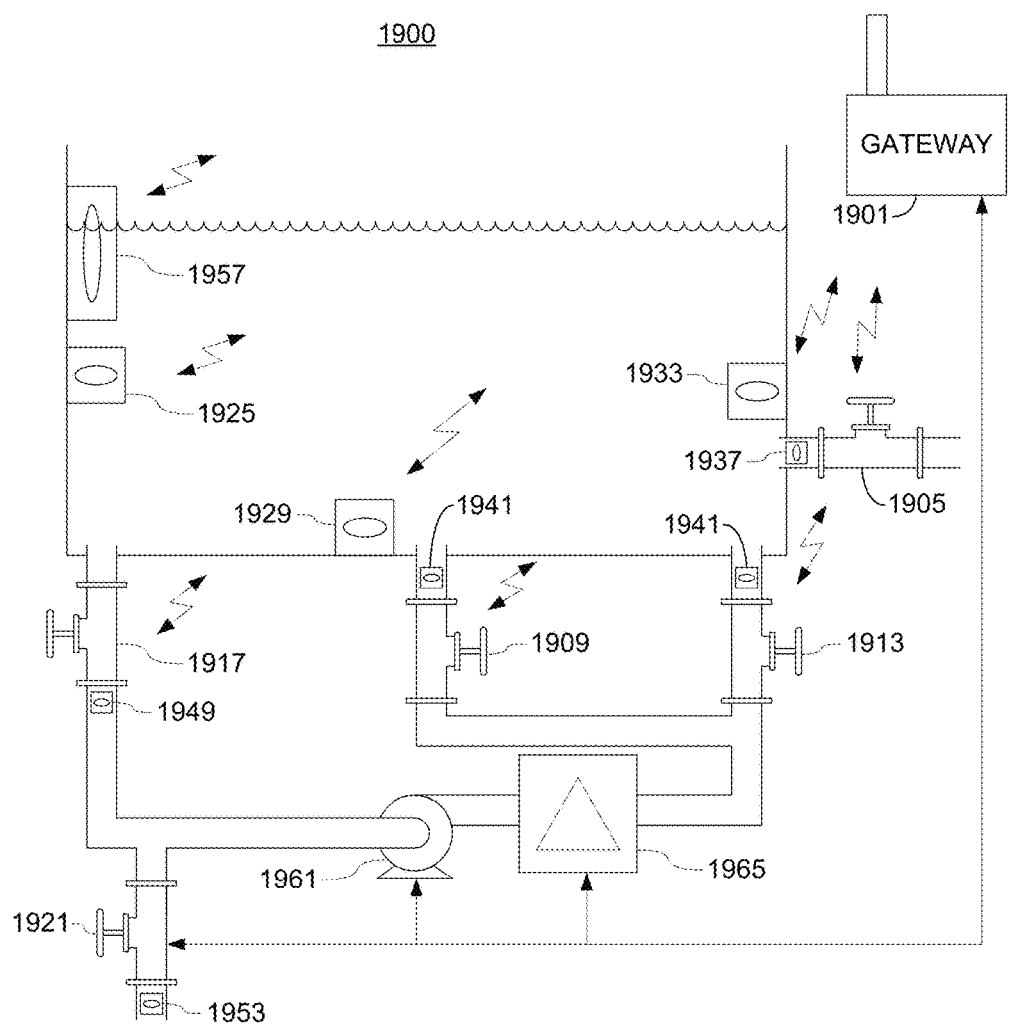
FIG. 19 provides an illustration of an example of a network environment, in accordance with some embodiments.

Any variety of complex network configurations are useful with the systems and methods described herein, such as including both wireless and wired network connections. For example, FIG. 19 illustrates a swimming pool with a local area network 1900, featuring level control and temperature control. Here, a variety of network devices and sensors are connected to a gateway 1901 over wireless network connections, including network connected source valve 1905, network connected inlet valves 1909, 1913, network connected outlet valve 1917 and network connected drain valve 1921 and network connected temperature sensors 1925, 1929, and 1933, network connected flow sensors 1937, 1941, 1945, 1949, and 1953 and network connected level sensor 1957, while other network devices are connected using wired network connections, including network connected drain valve 1921, network connected pump 1961 and network connected water heater 1965. Although not shown, other attributes of the swimming pool are optionally controllable by suitable network connected devices and network connected sensors, such as lighting levels, chemical concentrations, filtration and physical access by control over a mechanically controlled cover or a locking mechanism on a doorway or gate. As with the other systems described herein, an initial system profile governing the operation of the network connected devices establishes their operational status. Upon receiving sensor data, the sensor data can be compared with reference values to determine whether any device is malfunctioning, or whether the operational status of the network devices needs to be updated in order to bring the sensor values closer in line with the reference values. For example, upon detection of a cooler temperature than set point at temperature sensor 1925 but a warmer temperature than the set point at temperature sensor 1933, the outlet valve 1917 and inlet valve 1909 can be opened to permit water to be pumped through the water heater 1965 to circulate heated water to the region nearby to temperature sensor 1925. Depending on the temperature differences, the water heater could also be in an off state, with inlet valve 1913 also open to allow circulation and mixing of the different temperature water in the pool. In an event where the drain valve 1921 is malfunctioning, for example leaking water as detected by flow sensor 1953, the system profile could be updated to open the source valve 1905 to allow the flow rate detected by flow sensor 1937 to match that detected by flow sensor 1953 in order to maintain a substantially constant level in the pool, as detected by level sensor 1957. A variety of other system profile updates are contemplated in response to the various sensor measurements made.

Figure 20:
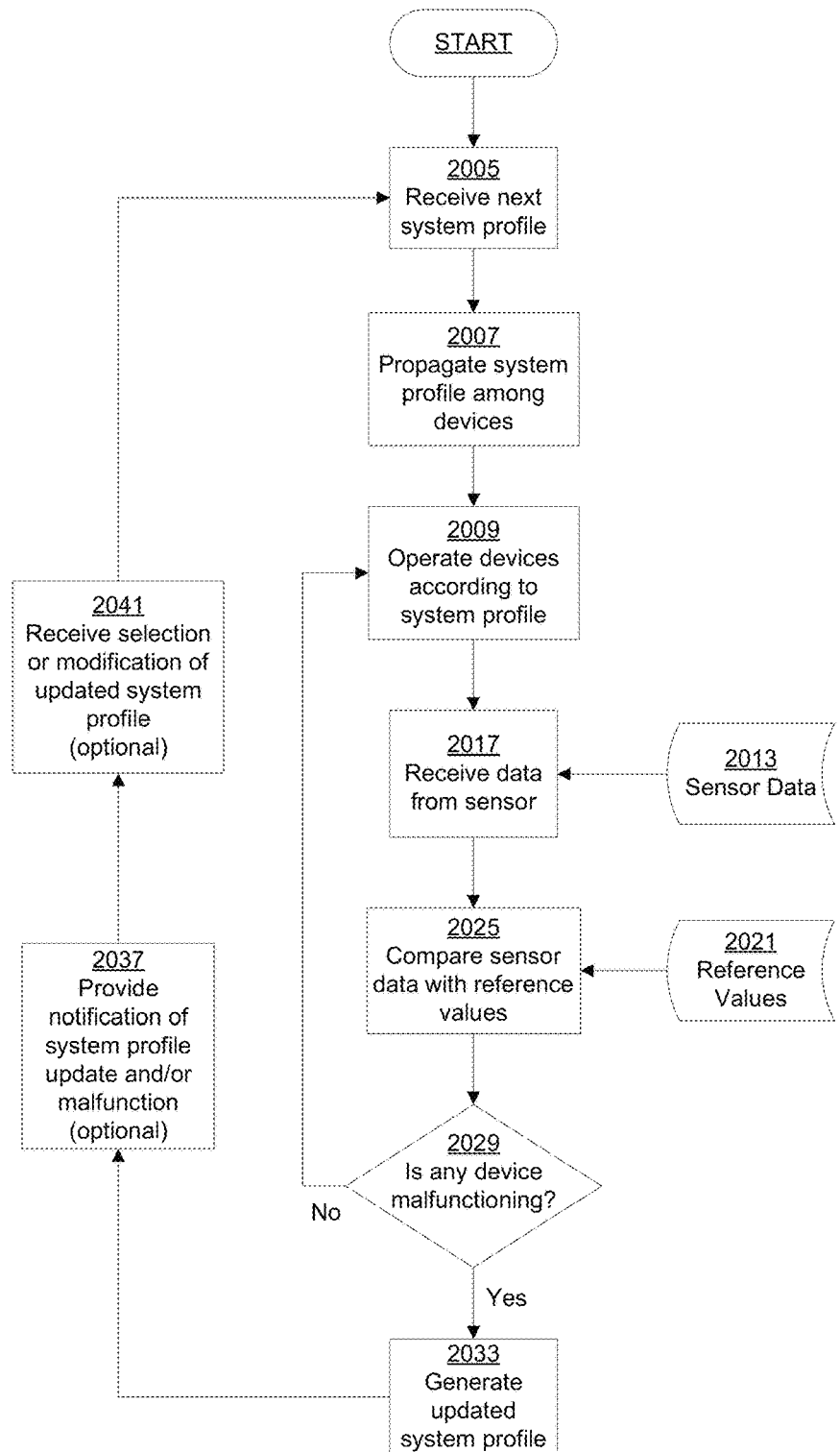
FIG. 20 provides an overview of a method embodiment for autonomously adjusting operation of network devices.

FIG. 20 provides an overview of a method incorporating a check of whether a device is malfunctioning. First, an initial system profile is received (2005) and propagated (2007) among a plurality of network devices. The devices are operated according to the conditions established in the system profile (2009). Sensor data (2013) is received (2017) and compared (2025) with one or more reference values (2025). If, for example based on the comparison, any device is determined to be malfunctioning (2029), a new system profile is generated (2033), such as to accommodate or correct for the malfunctioning device, and a notification of the system profile change and/or malfunction is generated (2037). Optionally, a selection or modification of the updated system profile is received (2041) and the updated system profile is received by one of the network devices (2005) and propagated among the other network devices (2007).

Figure 21:
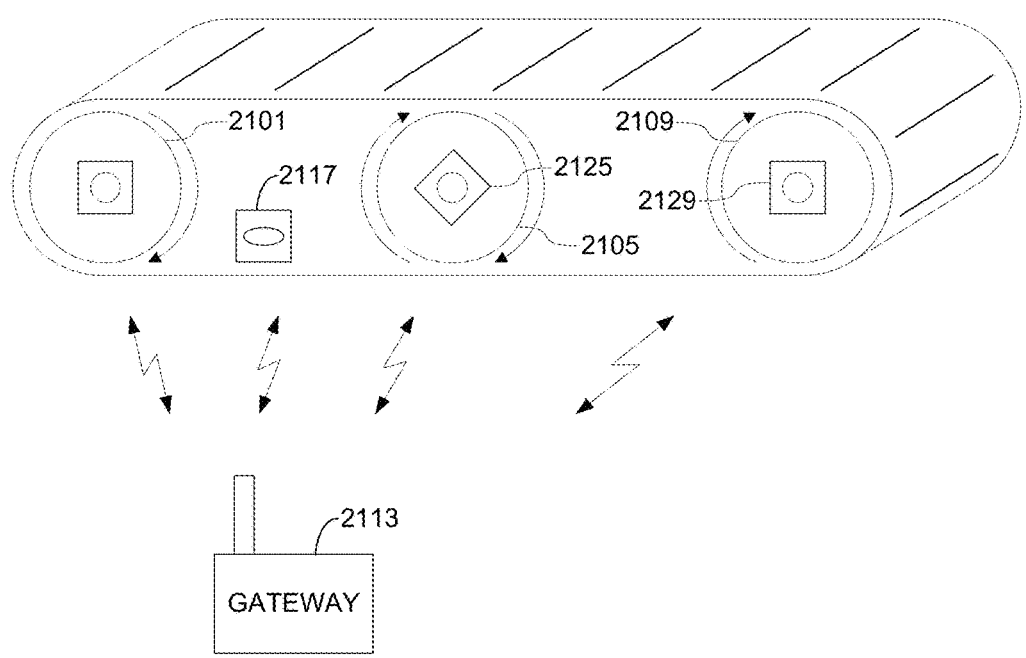
FIG. 21 provides an illustration of an example of a network environment, in accordance with some embodiments.

As an example of detection of device failure or malfunction, FIG. 21 illustrates an embodiment of a local area network 2100 including a conveyor, where motors 2101, 2105, and 2109 and velocity sensor 2117 are network connected via wireless connections to gateway 2113. Velocity sensor 2117 monitors a velocity of the conveyor belt, while motor 2101 includes a rotation sensor 2121, motor 2105 includes a torque sensor 2125, and motor 2109 includes a power sensor 2129. Velocity sensor 2117 can determine an overall change in speed of the conveyor belt, potentially indicating a malfunction of one or more of the network connected motors 2101, 2105, and 2109. Upon detection of a change in speed of the conveyor, the speed of the network connected motors 2101, 2105, and 2109 of the system profile for the system can be modified, updated and propagated to the devices to maintain a belt speed within a specified range or to shut off the belt altogether to minimize damage to the belt or the network connected motors 2101, 2105, and 2109, or to permit inspection. Inclusion of rotation sensor 2121 on network connected motor 2101 serves a somewhat similar purpose to the velocity sensor 2117, although rotation sensor 2121 can also optionally indicate a malfunction in the mechanical interface between the motor 2105 and the belt. Torque sensor 2125 provides insights as to the operational characteristics of motor 2105 and can indicate a problem with motor 2105 and/or the other motors 2101 and 2109. Upon detection of such a problem, a change to the system profile of the motors can be propagated to maintain a useful conveyor speed. Power sensor 2129 can provide further insights as to the current being drawn by motor 2109 and/or the power usage and can indicate whether motor 2109 is operating correctly or malfunctioning and/or whether other motors are malfunctioning, allowing a malfunctioning motor to be taken offline by a change of device status in an updated system profile.

Figure 22:
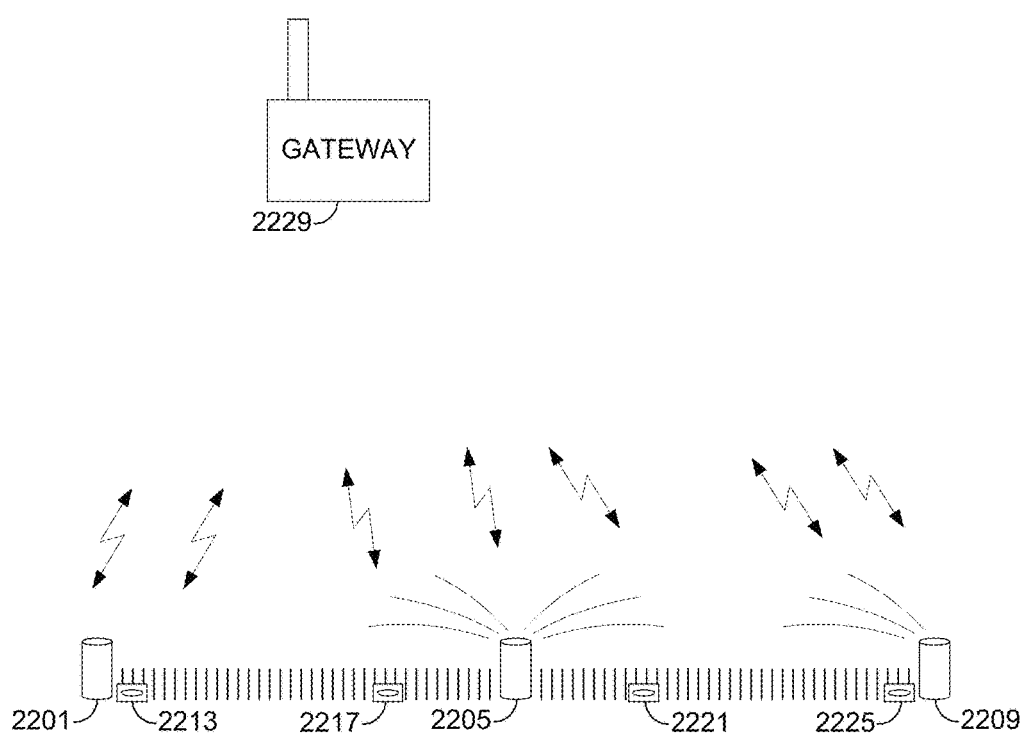
FIG. 22 provides an illustration of an example of a network environment, in accordance with some embodiments.

As an example of detection of device failure or malfunction, FIG. 22 illustrates an embodiment of a local area network 2200 including network connected sprinkler heads 2201, 2205, and 2209 and network connected water sensors 2213, 2217, 2221, and 2225, wirelessly connected to gateway 2229. Alternative to the scheme illustrated in FIG. 22, network connected valves which regulate the flow of water to the sprinkler heads individually or in groups are contemplated. As depicted in FIG. 22, sprinkler heads 2205 and 2209 are in an operation state where water is being provided to the adjacent ground and sensors 2213, 2217, 2221, and 2215. Sprinkler head 2201, however, is in a malfunctioning state, where no water is being provided. Here, water sensor 2213 can determine that the adjacent sprinklers heads are not providing enough water to the ground in the vicinity of water sensor 2213. In order to accommodate the reduction in water being delivered to the ground by the malfunction of sprinkler head 2201, the system profile for the sprinkler heads 2205 and 2209 can be modified such that extra water is delivered to the ground adjacent to water sensor 2213. This can be achieved in a variety of ways, such as by increasing the overall watering duration provided by sprinkler head 2205 with a potential decrease in watering duration provided by sprinkler head 2209 in order not to over water the ground adjacent to water sensors 2221 and 2225. Alternatively, by adjusting the duration, watering direction, water pressure, etc. of sprinkler head 2205, the impact on the amount of water delivered to the ground adjacent to water sensors 2221 and 2225 can be minimized. Optional inclusion of other sensors into the local area network 2200, such as water flow sensors, water pressure sensors, etc., and other network devices, such as water pressure regulators, water flow controllers, etc., allows for further error detection, error correction and overall control of the system.

Although the embodiments described herein may be referenced to the specific local area networks illustrated in the accompanying drawing figures, the embodiments are useful with any of a variety of local area networks including one or more network connected devices and network connected sensors. In embodiments, the system profile corresponding to the operation of the network devices is communicated to all the network devices, such that each device has knowledge of every other device's status. This configuration advantageously allows devices to suggest operational statuses for themselves and/or other devices, which is useful, in embodiments, when devices malfunction and the status of other devices can be changed to accommodate the malfunction while maintaining operational parameters or sensor measurements within target ranges, for example, until the malfunction can be corrected.

FIG. 23 depicts an example interface for controlling network devices and electronic devices coupled with network devices, in accordance with some embodiments. Display 2300 is a visual interface usable to monitor and control one or more network devices. Display 2300 includes modular tiles 2302A, 2302B, and 2302C (hereinafter "tiles 2302") for interacting with network devices in a network. In this embodiment, tiles 2302A, 2302B, and 2302C correspond with three different network devices, including an outlet, motion sensor, and light switch.

In some embodiments, the information contained in tiles 2302 can be received via an intra-network communication (e.g., communication 1110) between the computing device operating the display 2300 and the network device. For example, the information in the communication can include information about icons, names, status, or capabilities of one or more network devices. In some embodiments, a communication can be sent from the computing device to a network device to query the network device about its identity. In response to receiving the query, the network device may send communications to the computing device operating the display 2300 with at least a unique interface module ID. The communication may provide the computing device with information that can be used to determine a basic, default visual interface that includes the tiles 2302.

The communication may be transmitted between the computing device operating the display 2300 and the network during the initial discovery process. For example, when the network device is initially connected to the network, it and the computing device can automatically exchange these communications. The information in the communications can establish the initial information in tiles 2302.

The tiles 2302 may also include icons 2304A, 2304B, and 2304C (hereinafter "icons 2304"). The icons 2304 can include default images corresponding to each network device. For example, the default images may include an outline, silhouette, photograph, or other visual representation of the network device. As illustrated, the image data for tile 2302A includes an outline of an outlet, the image data for tile 2302B includes an outline of a motion sensor, and the image data for tile 2302C includes an outline of a light switch.

The tiles 2302 may also include a name 2306A, 2306B, and 2306C (hereinafter "names 2306") for the corresponding network device. The names 2306 include a default description of the network device (e.g., "outlet") or the electronic device. In some embodiments, the default description can be associated with each network device during the registration process described above. As illustrated, tile 2302A corresponds with an outlet network device and is named "outlet," tile 2302B corresponds with a motion sensor network device and is named "motion sensor," and tile 2302C corresponds with light switch network device and is named "light switch."

As described above, when the network devices are first discovered on the network, the network devices can be associated with icons 2304 that may include default images (e.g., an outline of an image of an outlet, motion sensor, and light switch) and further associated with names 2306 that may correspond with default names (e.g., "outlet," "motion sensor," and "light switch"). The default information in tiles 2302 may be customizable by developers and/or manufacturers of the network devices and/or provided in a resource bundle for the network device to generate the corresponding icon and name.

The tiles 2302 may also include interactive elements configured to control one or more states, settings, attributes, and/or other aspects of the network devices. For example, in FIG. 23, the interactive elements can include a power button, as illustrated as a power button 2308A in tile 2302A, for turning the outlet on and off. The interactive element 2308A can be selected with a click or press (e.g., a tap gesture) to turn the outlet on and off. Similarly, in the example described in FIG. 23, tile 2302C includes a power button 2308C for turning a light switch on and off.

In certain embodiments, the status or state of a network device (used interchangeably) can be indicated within the tile, including any piece of information pertinent to that particular network device. For example, the status of a network device may include a state of the network device itself (e.g., on or off) or how the network device is situated within the network with respect to other network devices in the network. For example, the status of a network device may refer to the network device's proximity to another network device and/or its ability to communicate with another network device because of the relative signal strength between the two network devices. In some embodiments, tiles 2302 can convey status information about a network device, including, but not limited to, a firmware version, a last known firmware update status, connectivity to cloud status, registration status (e.g., an indication that the network device has a key or does not), a primary mode of the network device (e.g., on or off), a secondary mode of the device (e.g., standby, high, low, etc.), a schedule, and settings for the network device.

In some embodiments, the status can include a value or some other information indicating a unit of measure for a setting or an attribute related to operation of a network device. The setting or attribute can be adjustable within a range of values in some embodiments. For example, the network device can be a light bulb and the status can include a value corresponding to brightness (e.g., a percentage of total or maximum brightness) emitted by the light bulb when the light bulb is powered-on. In another embodiment, the network device can be a motion sensor and the status can include a value corresponding to sensitivity of the sensor in a range of values between 0 to 100 when the sensor is powered-on.

The displayed status of a network device can change based on time (e.g., a period, an interval, or other time schedule). For example, tile 2302B may indicate a sensor-specific status 2310B that changes when an event such as motion is detected. In an illustrative embodiment, the tile may provide a status that includes "Motion sensed in the living room at 11:05 AM."

Status information may be provided in multiple locations in tiles 2302 as well. For example, tile 2302C includes icon 2304C representing a light switch and name 2306C for the light switch (e.g., "light switch" as a default). As shown, the status 2310C in the tile 2302C for the light switch can indicate a brightness level for the light switch. In the exemplary display 2300, status 2310C indicates that the light switch is at 0%, which corresponds to the light switch being turned off. In some embodiments, this status may also be reflected by the power button 2308C for the light switch not being lit up or shaded/bolded.

When a network device has extended capabilities, such as secondary or tertiary functionalities, an interactive element 2312 can be selected to expand and contract a menu including controllable settings for the capabilities. The menu can be, for example, a full drop down menu or drawer with interactive elements for setting the extended capabilities of the network device to be displayed within the graphical interface. The display 2300 can enable control of settings and/or attributes related to operation of the network device corresponding to the tile. For example, the tiles 2302 can include a drawer that displays the operations for secondary functionalities in response to a selection made for a primary functionality (e.g., controlling a power state) for a network device. In certain embodiments, the drawer can display secondary settings, including a default, implied secondary setting for a network device that can affect the operation of the network device and can be related to scheduling operation of the network device (e.g., setting on/off times), selecting auto off timeouts or thresholds, selecting settings for putting the network device into standby, hibernate, or sleep mode, and/or controlling adjustable features (e.g., lighting or speed). By enabling a user control features and secondary settings of a network device, the user is enabled with the ability to remotely control multiple features for several network devices without being present at a location for those devices.

Display 2300 can also include selectable icons and links 2314, 2316, 2318, 2320, 2322, and 2324 outside of the tile display area. For example, refresh icon 2314 can be selected to refresh information presented in display 2300, such as status and state information displayed in tiles 2302A, 2302B, and 2302C. For instance, the status 2310B in tile 2302B for the motion sensor can be refreshed on an automatic, periodic basis, in addition to being manually updated when refresh icon 2314 is selected. Similarly, the brightness status 2310C in tile 2302C for the light switch can be updated when refresh icon 2314 is selected.

The edit link 2316 can be selected to edit the list of tiles 2302A, 2302B, and 2302C. For example, edit link 2316 can be selected to sort or re-order the sequence of tiles 2302A, 2302B, and 2302C displayed in display 2300. Edit link 2316 can also be selected to delete one of the tiles 2302A, 2302B, and 2302C in cases where a user no longer wants to view a given tile. Devices icon 2318 can be selected to list discovered network devices in a network.

Rules icon 2320 can be selected to display rules pertaining to network devices. For example, rules icon 2320 can be selected to display a rule that turns on the light switch of tile 2302C for a specified duration when the motion sensor of tile 2302B detects motion. That is, by selecting rules icon 2320, a user can create or edit a rule that turns on a light switch for a certain number of minutes when a motion sensor detects motion in a room. In this way, rules can relate functionalities of multiple network devices to each other. News icon 2322 can be selected to review news items, such as news associated with network devices and/or the application. For instance, news icon 2322 can be selected to view announcements and news items relevant to network devices controlled via tiles 2302A, 2302B, and 2302C and/or information relevant to the application, such as messages of available tile updates. The more icon 2324 can be selected to access additional features of the application.

As described above, in some embodiments, network devices may be initially associated with default icons and descriptions (e.g., names). In some instances, a user may desire to customize this information to indicate a specific electronic device (e.g., an appliance) that is coupled to the network device. For example, if a lamp (e.g., the electronic device) is plugged into an outlet (e.g., the network device), the user may want to replace the default icon with image data (e.g., a photograph of the lamp) and further replace the default description with a customized textual data (e.g., "My Lamp," "Bedroom Lamp," etc.). Some embodiments may allow a user to provide such customized image data and textual data.

Figure 24:
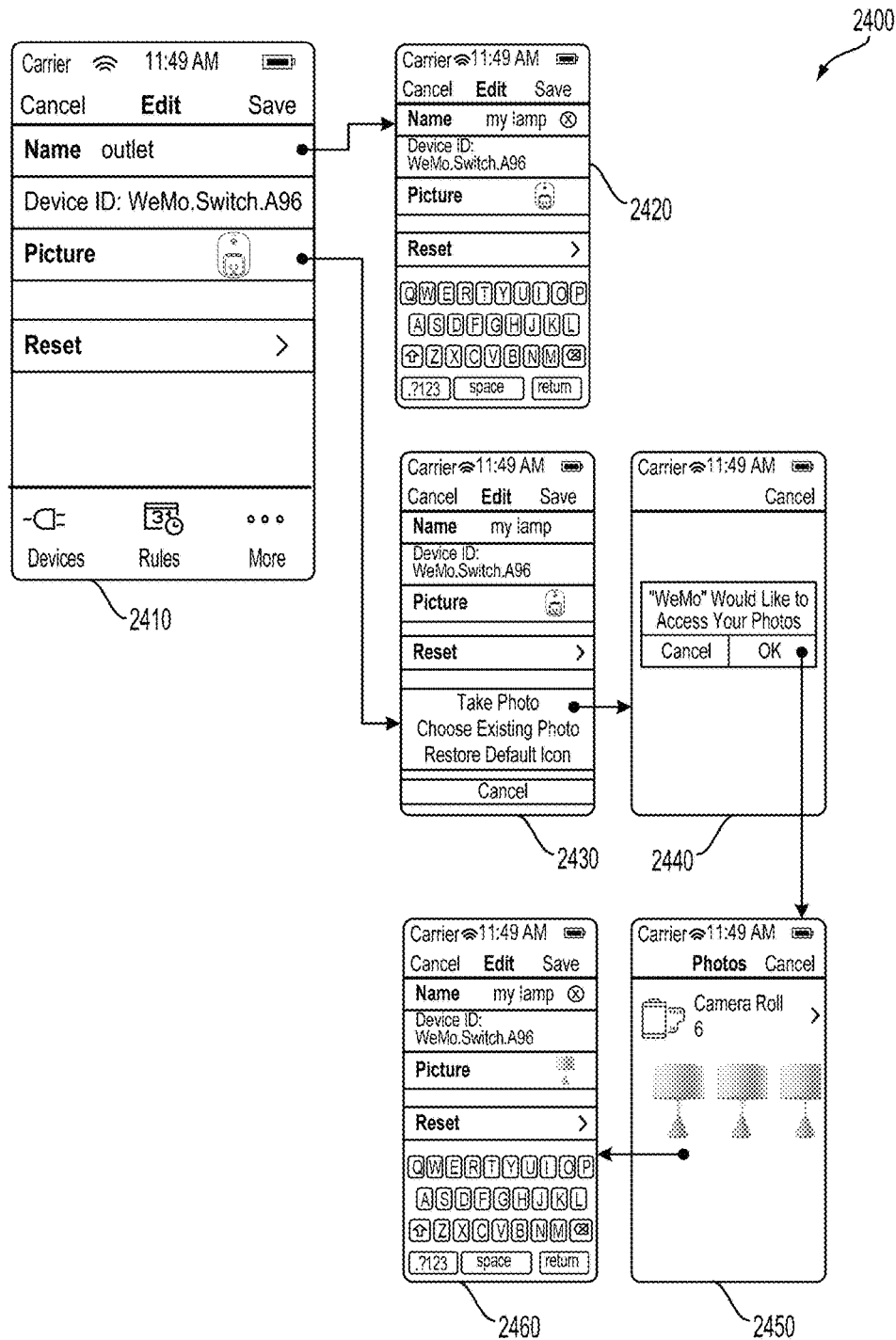
FIG. 24 shows example interfaces for providing image data and textual data corresponding to an electronic device, in accordance with some embodiments.

FIG. 24 shows example interfaces for providing image data and textual data corresponding to an electronic device, in accordance with some embodiments. In some embodiments, the interfaces 2400 can be displayed on a user device such as an access device (e.g., cellular phone) or any other suitable device. The interfaces 2400 may include one or more displays to edit, change, add, remove, alter, or otherwise adjust a tile corresponding to a network device. For example, a user may select the edit link 2316 from display 2300 to provide image data and textual data corresponding to an electronic device coupled to a network device.

At 2410, an illustrative interface for providing image data and textual data may be displayed. For example, a default icon (e.g., an image of the outlet) and a default name or description (e.g., "outlet") may be initially included within the interface for the network device, and one or more fields may be provided for a user to replace the default icon and description with customized image data and textual data. As illustrated, in some embodiments, the default description (i.e., "outlet") can be selected (e.g., via a tap gesture or other input) to activate a field for modifying the description.

At 2420, the display may provide text entry elements (e.g., a soft keyboard) to accept a different name for the outlet from the user. The user may select letters, numbers, and/or symbols using the text entry elements to provide textual data in the form of a customized description to be associated with the network device. The digital display may disappear after the user provides the textual data (e.g., by pressing enter or next to deactivate the text entry elements). As illustrated, the user may provide textual data including "my lamp" to replace the default description "outlet" for the particular electronic device (e.g., a lamp) electronically coupled with the network device (e.g., the outlet).

At 2430, the user may also choose to provide image data as a replacement of the default icon for the network device. The display may provide an interface to allow the user to provide the image data. For example, the interface can allow the user to take a photo (e.g., of the electronic device coupled with the network device), choose an existing photo (e.g., stored in a data store within the computing device or another device in the network), or restore the image data to a default icon (e.g., a silhouette of an outlet or lamp). In an embodiment, the user may select the "Choose Existing Photo" option and progress to 2440.

At 2440, a notification may be displayed. The notification may request that the user authorize access to stored graphical data (e.g., photographs). Such graphical data may be accessed and/or retrieved from the computing device, network device, cloud network, or other location. As illustrated, the user may select "OK" or "Cancel" when asked to authorize access. When the user selects "OK," the display may progress to 2450.

At 2450, the display may provide indications of the stored graphical data. For example, the indications can include photographs from a camera roll stored at the access device, cloud network, or other location. In some embodiments, the user can browse through and select one or more photographs to use as the image data for the tile associated with the network device. As illustrated, the user may select one of the lamp images to use as image data.

At 2460, the tile corresponding to the network device can display the provided image data and textual data instead of the original default icon and default description. In some embodiments, the selection of the image data and textual data can be copied and/or transmitted to a data store (e.g., a cloud storage device, etc.), and associated with the tile.

Figure 25:
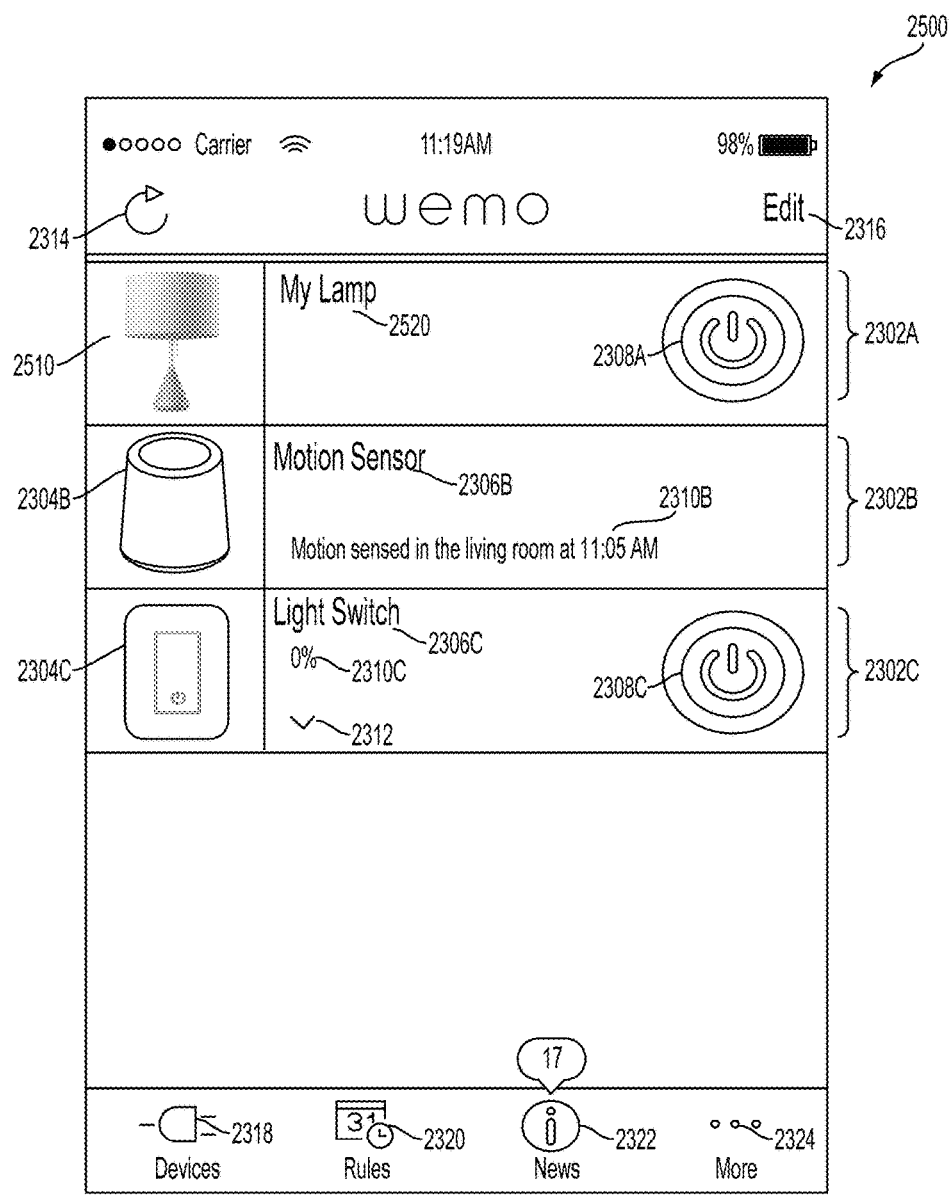
FIG. 25 depicts an example interface with received image data and textual data, in accordance with some embodiments.

FIG. 25 depicts an example interface with received image data and textual data, in accordance with some embodiments. The display 2500 may be similar to the display 2300 illustrated in FIG. 23. The display 2500 may also include the received image data and textual data received for a particular network device. For example, where the default icon 2304A of FIG. 23 included an outline image of an outlet, the new image data in FIG. 25 includes a photograph of a lamp 2510 that is electronically coupled with the outlet. Further, where the default description 2306A of FIG. 23 included a default description of the network device (e.g., "Outlet"), the new textual data in FIG. 25 includes a customized description of the electronic device coupled to the network device (e.g., "My Lamp").

Figure 26:
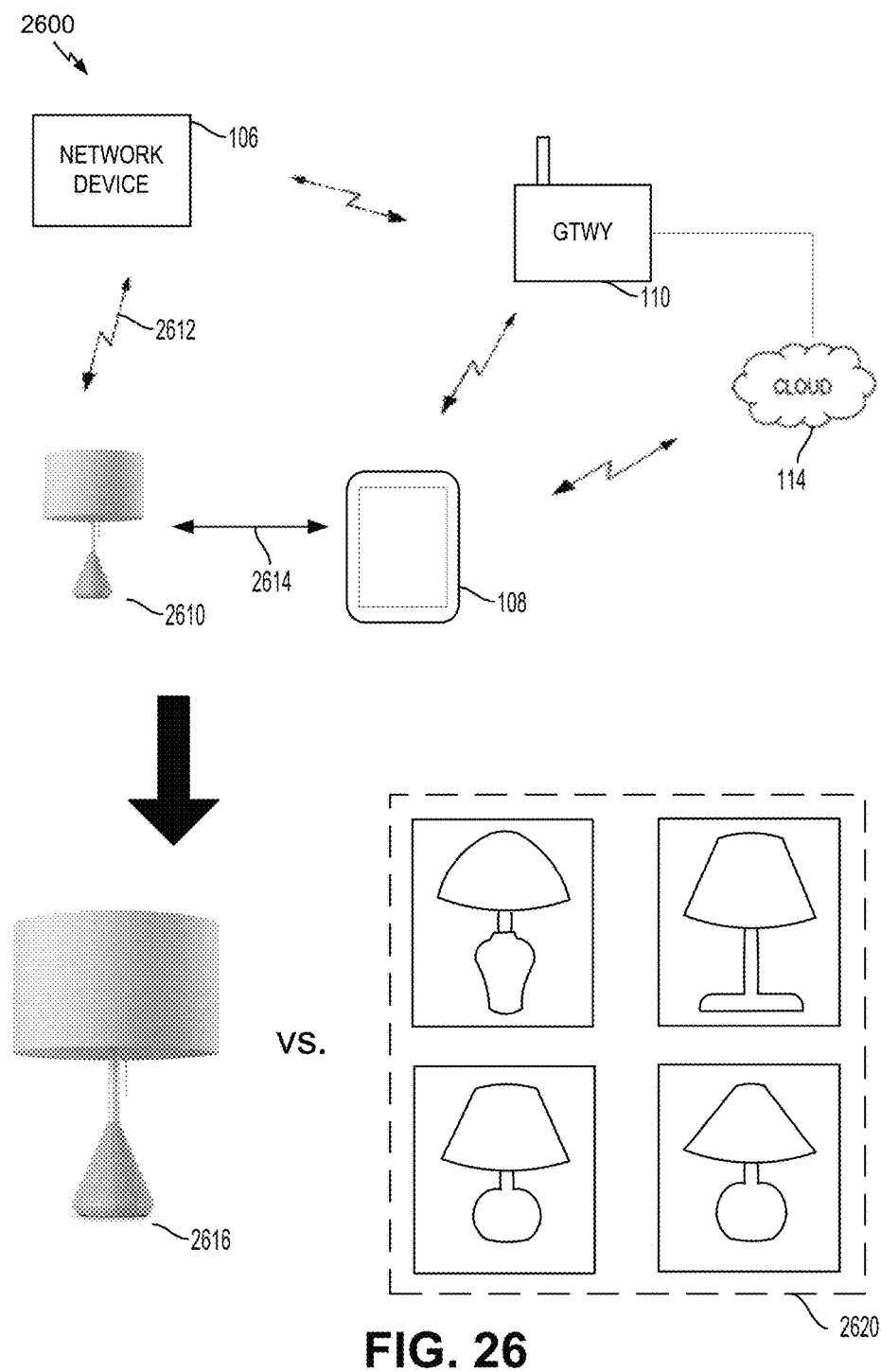
FIG. 26 shows an example process for analyzing image data and textual data, in accordance with some embodiments.

FIG. 26 shows an example process for analyzing image data and textual data, in accordance with some embodiments. The process may be performed by any suitable computing device including one or more of the devices included in the wireless network environment 100 described with FIG. 1, including any of network devices 102, 104, 106, access device 108, gateways 110, 112, and/or the cloud network 114. The network may also include an electronic device 2610, illustrated herein as a lamp. It should be understood that electronic device 2610 is illustrated as a lamp, but could be any suitable electronic device.

As illustrated in FIG. 26, a network device 106 is coupled 2612 with an electronic device 2610, such that the network device 106 transfers energy or data with the electronic device 2610. For example, the electronic device 2610 (e.g., the lamp) can be plugged into a network device 106 (e.g., the outlet). In another example, the electronic device 2610 (e.g., a battery-operated mobile device) may receive energy or data through an electronic coupling with a network device 106 (e.g., a wireless charging station or data store). In each instance, the network device 106 and electronic device 2610 may be coupled 2612.

In some embodiments, access device 108 can receive an image 2614 of an electronic device 2610. For example, as described in FIGS. 23-25 and described above, the user can take a picture of the lamp using the access device 108 (e.g., a cellular phone). The picture of the lamp can be stored on the user's access device, a cloud network 114, data store, or other location.

The image data and textual data may be transmitted between one or more computing devices in the wireless network environment 100. For example, the access device 108 may interact with the gateway 110 to transmit the image data and textual data to the gateway 110. The gateway may transmit the image data and textual data to the cloud network 114. In some embodiments, the access device 108 can transmit the image data and textual data to the cloud network 114 without utilizing the gateway 110 (e.g., using a cellular or other data network).

In some embodiments, the picture of the lamp can be received as image data 2616. As further described above, textual data may also be received (not shown). The textual data can include a customized description of the lamp coupled with the outlet.

As illustrated in FIG. 26, the image data and textual data can be analyzed by the cloud network 114 to determine a type of the electronic device 2610. In some embodiments, the image data can be analyzed using image processing, pattern or gradient matching, object recognition, scene change detection, or any other suitable technique in an attempt to determine the type of the electronic device 2610 from the image data. In some embodiments, natural language processing, optical character recognition (OCR), or any other suitable technique may be used in an attempt to determine the type of the electronic device 2610 from the image data.

In some embodiments, the image data 2616 (e.g., the lamp photograph) can be compared to other image data 2620 corresponding to other electronic devices associated with other users and/or networks. In some embodiments, one or more points of interest in each photograph may be compared. Images with the fewest number of differences may be considered of the same type within some level of confidence. Analysis of the textual data can also affect the confidence that the electronic device 2610 is of a particular type. In the example illustrated in FIG. 26, it can be determined that the type of the electronic device 2610 is "a lamp" based on the analysis of the image data and textual data.

The identified type of the electronic device may be compared with other electronic devices of the same or similar type in order to identify usage data associated with such other electronic devices. Such usage data may include rules, settings, and/or attributes utilized by other users for electronic devices of the same type. For example, in the lamp example, analyzing usage data can result in a determination that some percentage of other outlets coupled to lamps are associated with a user-provided rule that power to the outlet is to turned on the lamp thereby turned on after 6 PM local time. Further examples are described below.

It should also be appreciated that the wireless network environment 100 may transfer, receive, and store information without cloud network 114 in some embodiments, and that any of the functionalities described with respect to FIG. 26 may be performed by any suitable computing device, such as the access device 108, network device 106, gateway 110, etc.

Figure 27:
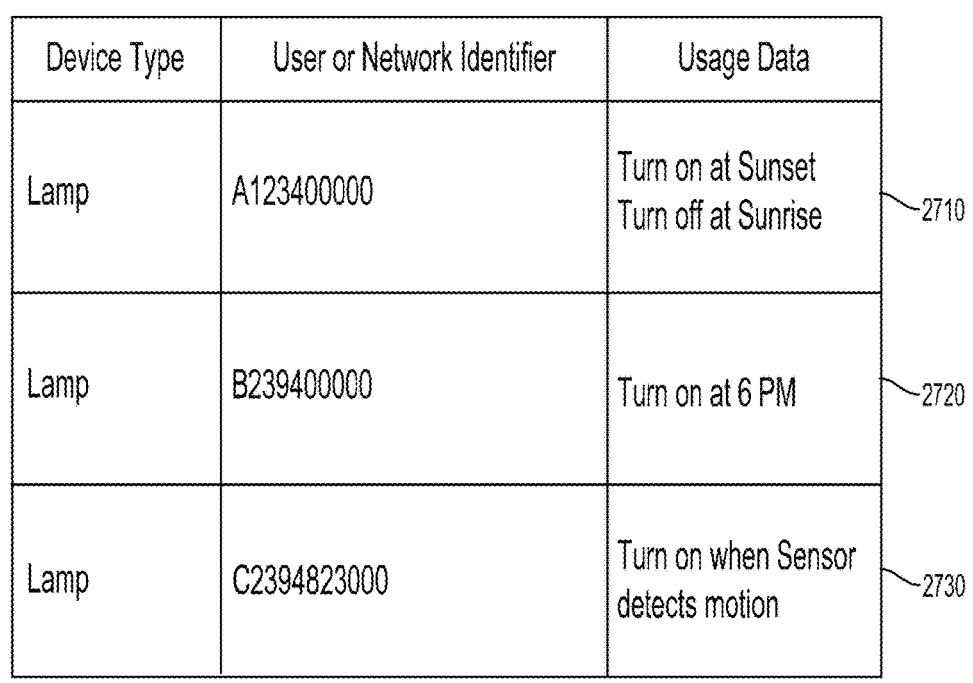
FIG. 27 shows an illustration of a data store including usage data, in accordance with some embodiments.

FIG. 27 shows an illustration of a data store including usage data, in accordance with some embodiments. The data store 2700 may include one or more electronic device types, corresponding user or network identifiers, and usage data. In the example illustrated in FIG. 27, data store 2700 includes usage data for lamps. It should be appreciated, however, that data store 2700 can include usage data describing any other suitable electronic devices such as a fan, garage door opener, sprinklers, heater, television, etc. In some embodiments, data store 2700 can be included in the cloud network 114 illustrated in FIGS. 1 and 26. In some other embodiments, data store 2700 can be included in any other suitable device such as network device 106, access device 108, gateway 110, etc.

In some embodiments, a record or profile may be created in a data store 2700 for associating each network device and/or electronic device with a corresponding, known interface module so that the interface module can be provided to the computing device (e.g., access device operating display 2300 in FIG. 23). For example, as described in FIG. 1, the server of the cloud network 114 may associate the first network device 102 with a first interface module and the second network device 104 with a second interface module. In some embodiments, the server performs the association by generating and storing a record including the unique ID of the network device (e.g., MAC address or serial number of a network device), a unique ID of an interface module suitable to control the network device, and/or any other information relevant to the network device and/or the interface module. For example, the server may store a first record at a first memory space (e.g., in Flash, DRAM, a data store, a database, or the like) with the unique ID of the network device 102 and the unique ID of an interface module for monitoring and controlling the network device 102. The server may also store a second record at a second memory space along with the unique ID of the network device 106 and the unique ID of an interface module for monitoring and controlling the network device 106.

In FIG. 27, electronic device types (e.g., lamps) can be associated with user identifiers associates with multiple user or network identifiers associated with multiple networks. In some embodiments, network device identifiers (e.g., MAC address, serial number, etc.) can be associated with device types (e.g., identifiers of outlets coupled to outlets in other networks associated with other users). As further illustrated in FIG. 27, data store 2700 can associate each electronic device type with usage data relating to usage of the electronic device (e.g., usage of the coupled network device) by other users and/or in other networks. In some embodiments, such usage data can include one or more rules or other automation settings used to control the functionalities of the corresponding electronic device type (e.g., the functionalities of the coupled network device). Usage of network devices and coupled electronic device types can be monitored for many users in many different networks.

The usage data may include various types of information. For example, as illustrated in FIG. 27, the usage data can include a rule 2710 that causes an outlet in a first network (or associated with a first user) to power on a lamp at sunset and power off the lamp at sunrise, a rule 2720 that causes an outlet in a second network (or associated with a second user) to power on a lamp at 6 PM, and a rule 2730 that causes an outlet in a third network (or associated with a third user) to power on a lamp when another network device (i.e., a motion sensor) detects motion.

The usage data may be analyzed. In some embodiments, the analysis can include an identification of the most common rules or other automation parameters used to operate other electronic devices of the same type. In some embodiments, rules and other automation parameters may be ranked, filtered, and/or sorted using various metrics, such as frequency, duration, recency, proximity, or any other suitable metrics. In some embodiments, based on the analysis of usage data stored in data store 2700, a message related to usage of the particular device type can be transmitted to a user device (e.g., a cellular phone) after determining that a device of the same type has been added to a network associated with the user device.

Figure 28:
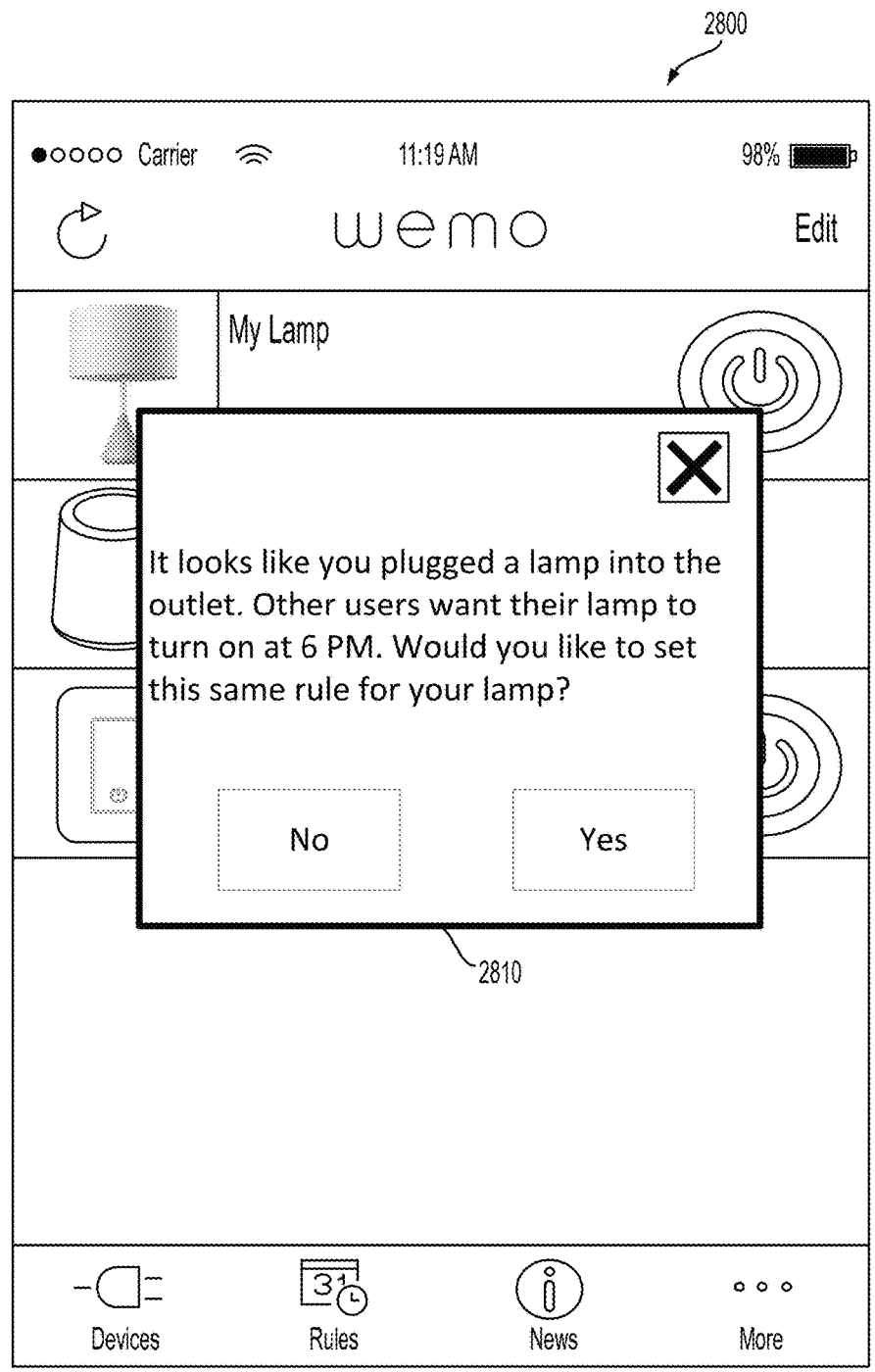
FIG. 28 shows an illustration of an example interface for providing a notification related to usage of an electronic device, in accordance with some embodiments.
Figure 29:
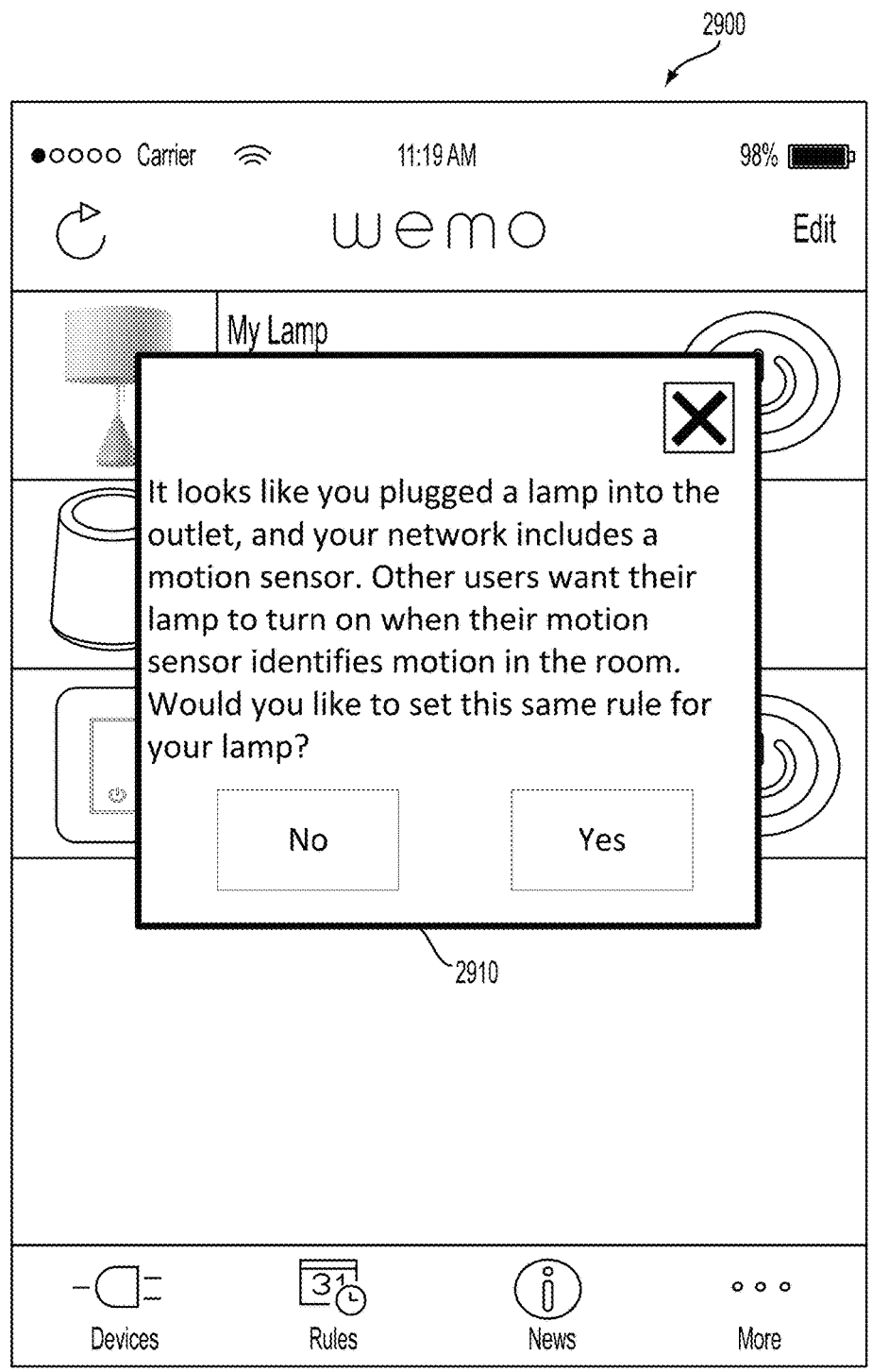
FIG. 29 shows an illustration of an example interface for providing a notification related to usage of an electronic device, in accordance with some embodiments.

FIGS. 28 and 29 depict example interfaces that provide a message related to usage of an electronic device. The interfaces may be similar to the interface 2300 described with FIG. 23. The interface may include tiles, icons, names identifying different network devices and/or electronic devices electronically coupled with the network device, a status of the corresponding device, and one or more selectable icons and links (e.g., edit link, rules icon, etc.). The message may be transmitted to a user device (e.g., a cellular phone) or any other suitable device. In some embodiments, the messages can be provided through other means, including transmitting the message to a user device as a text message or Short Message Service (SMS), email message, audible message, or other suitable message format.

FIG. 28 shows an illustration of an example interface for providing a notification related to usage of an electronic device, in accordance with some embodiments. The interface 2800 may be configured to display the message 2810. The message 2810 can include content related to the usage of the electronic device. As illustrated, the message includes "It looks like you plugged a lamp into the outlet. Other users want their lamp to turn on at 6 PM. Would you like to set this same rule for your lamp?" As described above, such a rule can be identified by analyzing usage data associated with the user of other electronic devices of the same type. The user may respond to the message by selecting "yes" or "no" to establish a rule for their corresponding electronic device (e.g., lamp).

FIG. 29 shows an illustration of an example interface for providing a notification related to usage of an electronic device, in accordance with some embodiments. The interface 2900 may be configured to display message 2910. As illustrated with message 2810, message 2910 may be transmitted to a user device. The content of message 2910 may relate to usage of other electronic devices of the same type. For example, as illustrated, the message 2910 includes "It looks like you plugged a lamp into the outlet, and your network includes a motion sensor. Other users want their lamp to turn on when their motion sensor identifies motion in the room. Would you like to set this same rule for your lamp?" The user may respond to the message by selecting "yes" or "no" to establish a rule for the corresponding electronic device (e.g., lamp) such that it is turned on when a motion sensor in the same network detects motion.

Figure 30A:
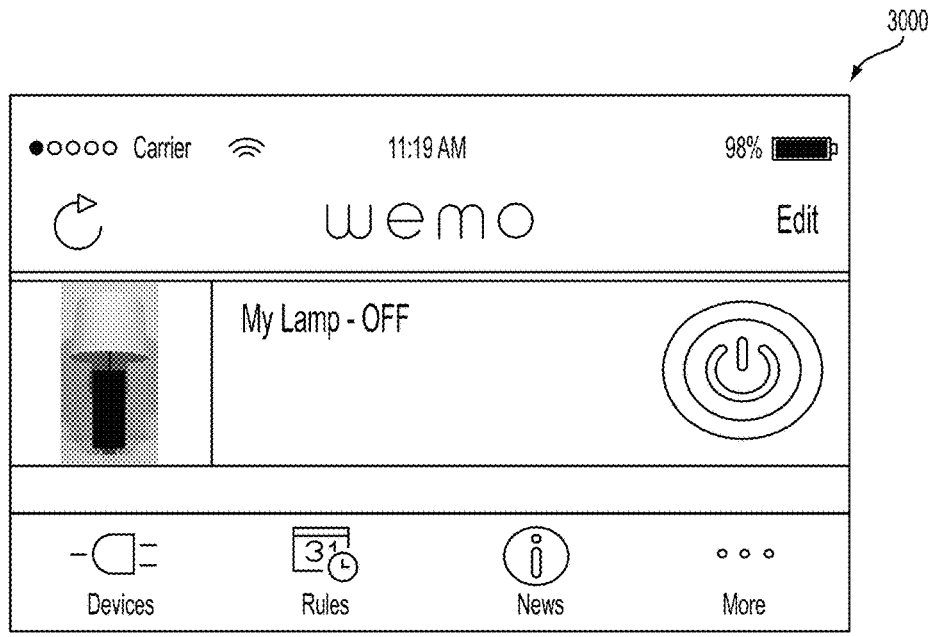
FIGS. 30A and 30B show example interfaces for providing a state of an electronic device, in accordance with some embodiments.
Figure 30B:
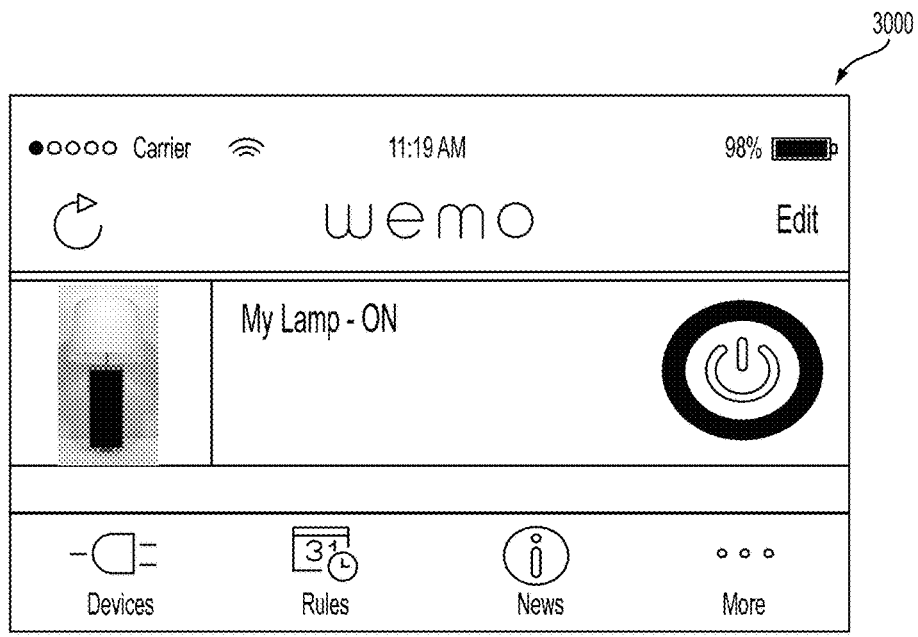

FIGS. 30A and 30B show example interfaces for providing a state of an electronic device, in accordance with some embodiments. As illustrated in FIG. 23, a status or state of the electronic device may be provided on a display. In some embodiments, different graphical data (e.g., user-provided photographs) may correspond with different states of an electronic device. Different textual data (e.g., user-provided descriptions) may also correspond with different states of an electronic device. For example, FIG. 30A illustrates an electronic device "my lamp" in an "off" state and FIG. 30B illustrates the same electronic device in an "on" state. The image data may correspond with the state (e.g., an image of the lamp off in FIG. 30A and an image of the lamp off in FIG. 30B) and the textual data may further correspond with the state (e.g., the name of the lamp is "my lamp—OFF" in FIG. 30A and the name of the lamp is "my lamp—ON" in FIG. 30B). The state of any suitable electronic device can be indicated using image data and/or textual data corresponding to particular states of such devices according to various embodiments. The state of an electronic device can be monitored and, when a change is detected, image data and/or textual data corresponding to the new state can be displayed.

Figure 31:
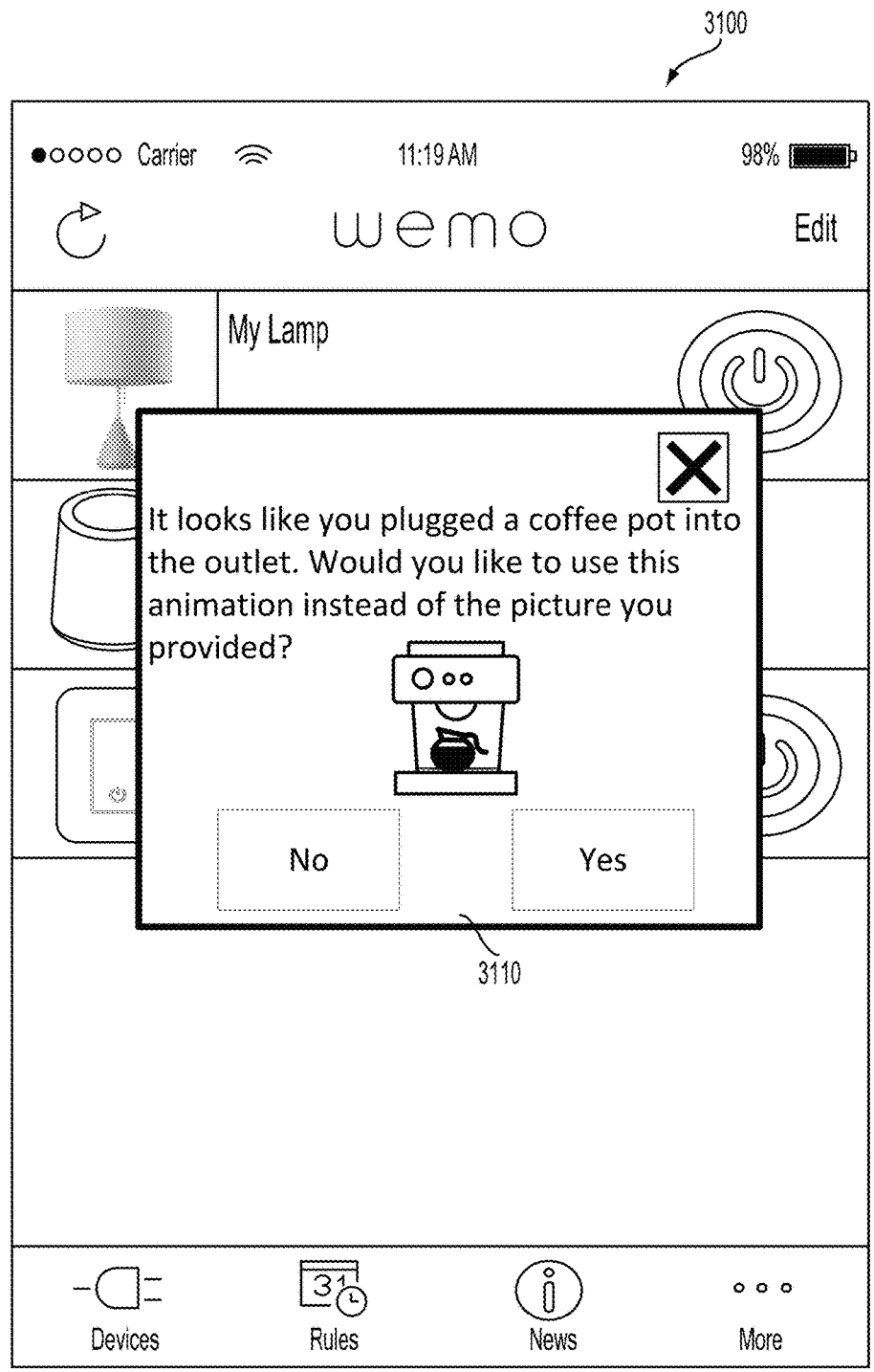
FIG. 31 shows an illustration of an example interface for providing a notification related to an animation corresponding to an electronic device, in accordance with some embodiments.

FIG. 31 shows an illustration 3100 of an example interface for providing a notification related to an animation corresponding to an electronic device, in accordance with some embodiments. In some embodiments, upon receiving image data (e.g., a photo) provided by the user, the message 3110 may provide the user with an opportunity to instead associate an animation with the electronic device instead of the image data. For example, upon determining that the electronic device type is a "coffee pot" using image data (e.g., a photo of a coffee pot) and textual data (e.g., a description of the coffee pot) provided by the user, an animation of a coffee pot can be identified (or generated).

The message can be a notification asking the user whether they wish to associated the animation with the electronic device in the user interface (e.g., the corresponding tile). As illustrated, the message 3110 may include "It looks like you plugged a coffee pot into the outlet. Would you like to use this animation instead of the picture you provided?" The message can accompany a sample of the animation and the user can respond to the message (e.g., "yes" or "no"). One or more animations can be provided for any suitable electronic device.

Figure 32A:
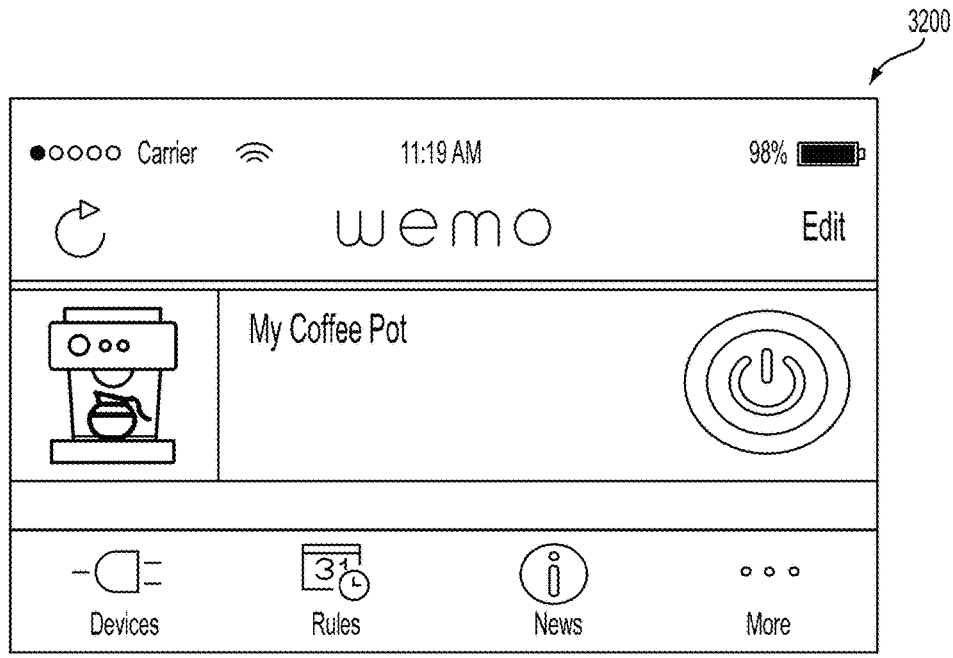
FIGS. 32A and 32B show an example interface including an animation corresponding to an electronic device at two points of time, in accordance with some embodiments.
Figure 32B:
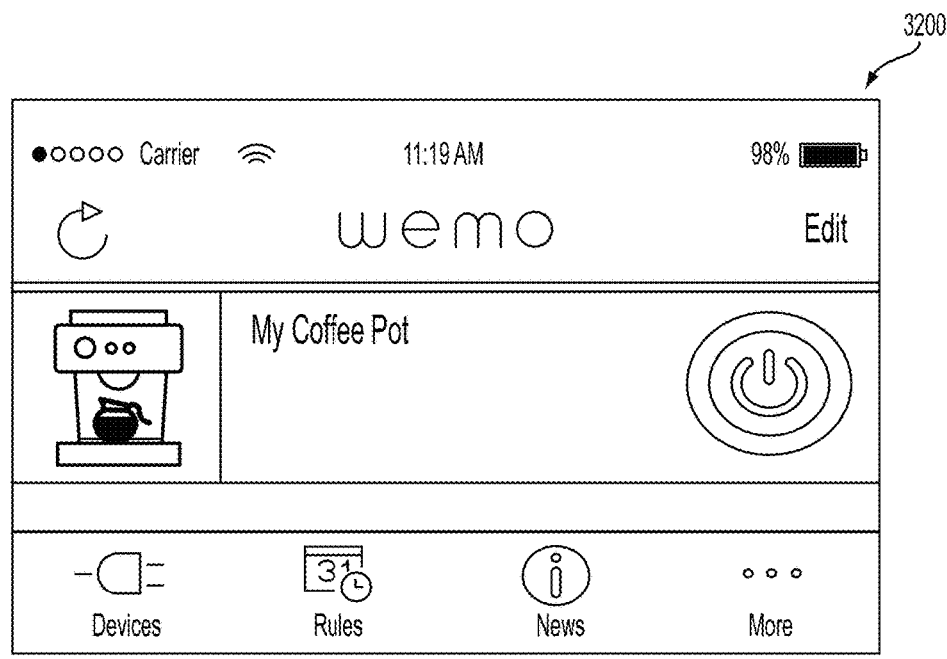

In some embodiments, the animation may indicate a state of the electronic device. FIGS. 32A and 32B show an example interface including an animation corresponding to an electronic device at two points of time, in accordance with some embodiments. The interface 3200 can show the animation of the coffee pot at two points of time in two different states. For example, FIG. 32A may include the animation at time 0 indicating that the coffee pot is off or just beginning to brew coffee and FIG. 32B may include the animation 5 minutes later indicating that the coffee pot is on and brewing (or the brewing is complete). Any suitable states of any suitable electronic device can be indicated by one or more animations according to various embodiments.

Figure 33:
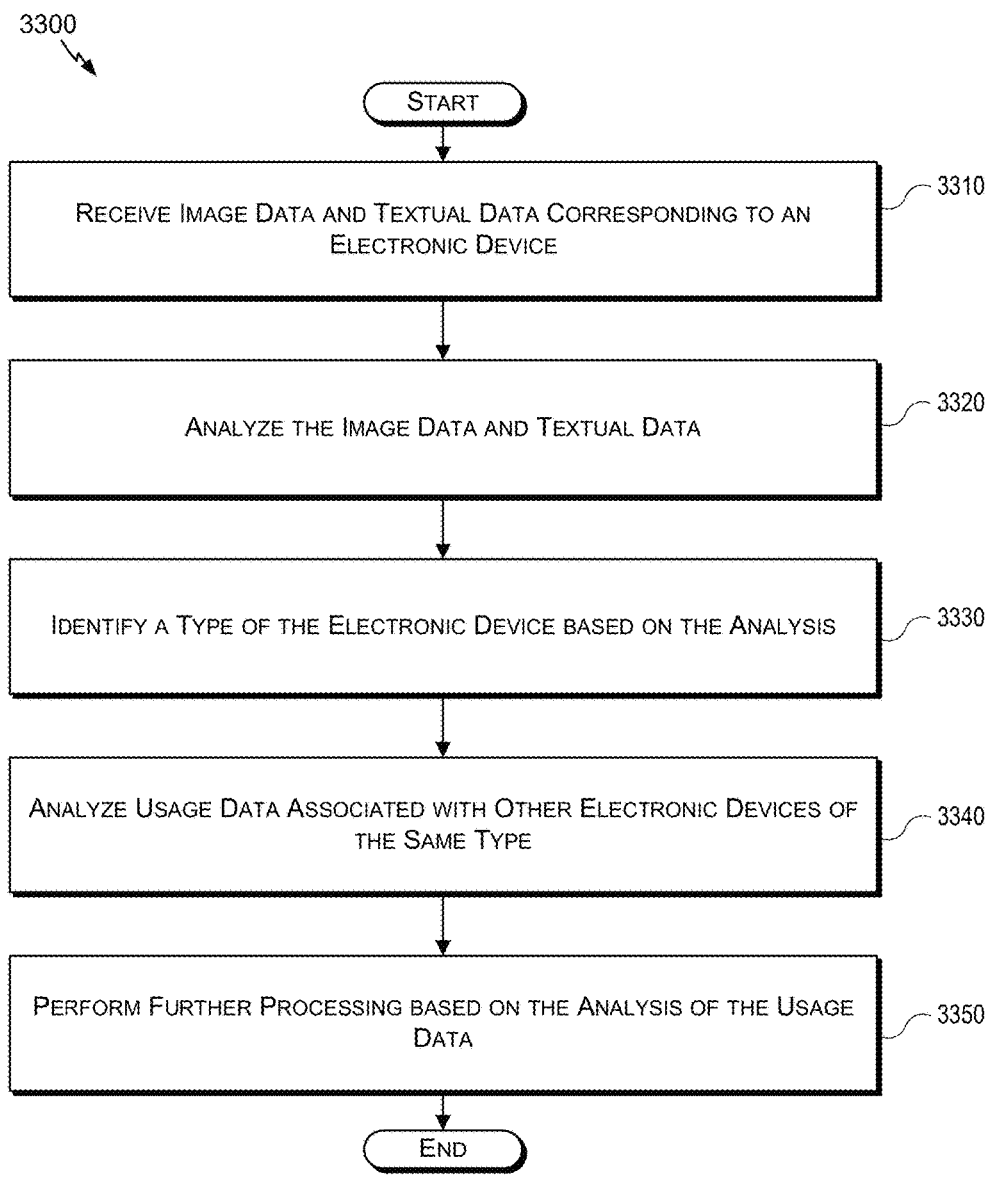
FIG. 33 is a flowchart illustrating a process for identifying a type of an electronic device using image data corresponding to the electronic device, in accordance with some embodiments.

FIG. 33 is a flowchart illustrating a process for identifying a type of an electronic device using image data corresponding to the electronic device, in accordance with some embodiments. Specifically, the process 3300 provides a technique to identify a type of an electronic device through an analysis of image data and textual data. The analysis may include an analysis of the usage data associated with other electronic devices of the same type. The technique can be implemented by a computing device which may be a network device, a user device, or a cloud-based device.

Process 3300 is illustrated as a logical flow diagram, the operation of which represents operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, applications, objects, components, data structures, and the like that perform particular functions or implement particular data types. The order in which the operations are described is not intended to be construed as a limitation, and any number of the described operations can be combined in any order and/or in parallel to implement the processes.

Additionally, the process 3300 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory.

At 3310, the process 3300 can include receiving image data and textual data corresponding to an electronic device. In some embodiments, the image data may include a photograph of the electronic device, a drawing of the electronic device, or any other suitable image data corresponding to the electronic device. The textual data can include a name or description (e.g., entered by the user) or any other suitable textual data corresponding to the electronic device. In some embodiments, the electronic device can be electrically coupled to a network device (e.g., an outlet). As an illustration, as described above, the image data can include a photograph of a lamp plugged into an outlet and the textual data can include the description "My Lamp."

At 3320, the process 3300 can include analyzing the image data and textual data. In some embodiments, the process can analyze the image data through image processing and analyze the textual data through natural language processing. For example, referring back to the above illustration, the received image data (e.g., the photograph of the lamp provided by the user) with other image data (e.g., photographs of other electronic devices provided by other users), and the received textual data (e.g., "My Lamp") can be compared with descriptions of electronic devices provided by other users. In some embodiments, the analysis may include using natural language processing to parse the received textual data to identify significant terms that may suggest the type of the electronic device (e.g., "Lamp").

At 3330, the process 3300 can include identifying a type of the electronic device based on the analysis. Using the image data and textual data, a type of the electronic device can be determined. Referring back to the above illustration, by performing an image processing of the photograph of the lamp in combination with the term "Lamp" being included in the user-provided description, it can be determined that the electronic device type is a "lamp."

In some embodiments, a confidence value can be generated that corresponds with a confidence that the electronic device is of a particular type. For example, the image data and textual data may result in a 75% confidence that the electronic device type is a "lamp," a 5% confidence that the electronic device type is a "television," and a 1% confidence that the electronic device type is a "garage door opener." In some embodiments, the type of the electronic device can be the device type associated with the highest confidence value. In some embodiments, if a threshold level of confidence is not attained, the type of the electronic device may be considered unknown or indeterminate.

At 3340, the process 3300 can include analyzing usage data associated with other electronic devices of the same type. In some embodiments, analyzing the usage data associated with other electronic devices includes analyzing rules associated with usage of the other electronic devices. For example, upon determining a type of the electronic device, usage patterns (e.g., rules and other automation parameters) associated with other electronic devices of the same type can be analyzed. Referring back to the above illustration, the usage data can include rules used to control usage of other lamps (e.g., "turn the lamp off at midnight" or "turn the lamp on at sunset"). In some embodiments, the usage data may relate to interactions of the other electronic devices with additional electronic devices in the same network (e.g., "when the motion sensor senses movement in a room, turn on the lamp").

In some embodiments, analyzing usage data includes analyzing one or more rules associated with usage of other electronic devices. For example, 50% of the lamps in a geographic area may be associated with the rule "turn the light off at midnight" or "turn the light on when motion is sensed." The analysis may identify one or more frequent rules among a particular type of electronic device (e.g., lamps).

At 3350, the process 3300 can include performing further processing based on the analysis of the usage data. In some embodiments, the further processing may include transmitting a message to a user device, the message including content related to usage of the electronic device. Various types of messages may be transmitted to the user device. In some embodiments, the content related to usage of the electronic device can correspond to a rule. For example, if other users of lamps have a rule set that the lamp is to be "turned on at sunset and turned off at sunrise," the message can ask the user whether such a rule should be established. In some embodiments, the content related to usage of the electronic device may correspond to an interaction between the electronic device and another electronic device in the network. For example, if users with networks including both a lamp and a motion sensor have a rule set that the lamp is to be turned on "when the motion sensor detects motion," the message can ask the user whether such a rule should be established.

It will be appreciated that process 3300 is illustrative and that variations and modifications are possible. Steps described as sequential may be executed in parallel, order of steps may be varied, and steps may be modified, combined, added, or omitted. Process 3300 can be performed for each device that is determined to be connected to the network. It should be noted that process 3300 can be performed concurrently for other devices that are determined to be connected to the network. Process 3300 can be performed for any number of settings and/or attributes that are related to operation of a device. Process 3300 can be performed several times to make adjustments to a setting or an attribute related to operation of a device.

As described above, network device 600 can be used to control an external electrical device (e.g., an appliance, etc.) coupled to outlet 606. For example, network device 600 can be used to control whether an operating current to power the external electrical device is provided to the external electrical device via outlet 606, such that the external electronic device can be turned on and off by network device 600. When network device 600 is in a power-off state, relay 810 can be opened to disrupt the current flow from plug 708 to outlet 606 such that an operating current does not flow to the external electrical device. When network device 600 is in a power-on state, relay 810 can be closed to allow an operating current to flow to the external electrical device. According to some embodiments, power button 602 can be used to switch network device 600 between the power-on and power-off states. Alternatively or additionally, an access device can be used to send wireless communication signals to instruct network device 600 to close or open relay 810 to switch network device 600 between the power-on and power-off states.

In some scenarios, the external electrical device coupled to outlet 606 may have its own power control mechanism (e.g., power button, ON/OFF switch, etc.) to turn on and off the external electrical device at the external electrical device. However, if network device 600 is in the power-off state, attempting to turn on the external electrical device using the power control mechanism at the external electrical device may fail because relay 810 is open and the operating current for the external electrical device is unable to flow from plug 708 to outlet 606. Consequently, a user may have to manually set network device 600 to the power-on state via power button 602 on network device 600, or use an access device to communicate with network device 600 to remotely set network device 600 to the power-on state. In some instances, the user may be physically away from network device 600 or away from an access device, and it may be cumbersome for the user to get to the location of network device 600 or to the location of an access device. To eliminate the need for the user to manually set network device 600 to the power-on state via power button 602 or via an access device, the techniques described herein can be used to detect the power draw state of the external electrical device such that network device 600 can be automatically switched on in response to detecting that the external electrical device is being turned on at the external electrical device.

Figure 34:
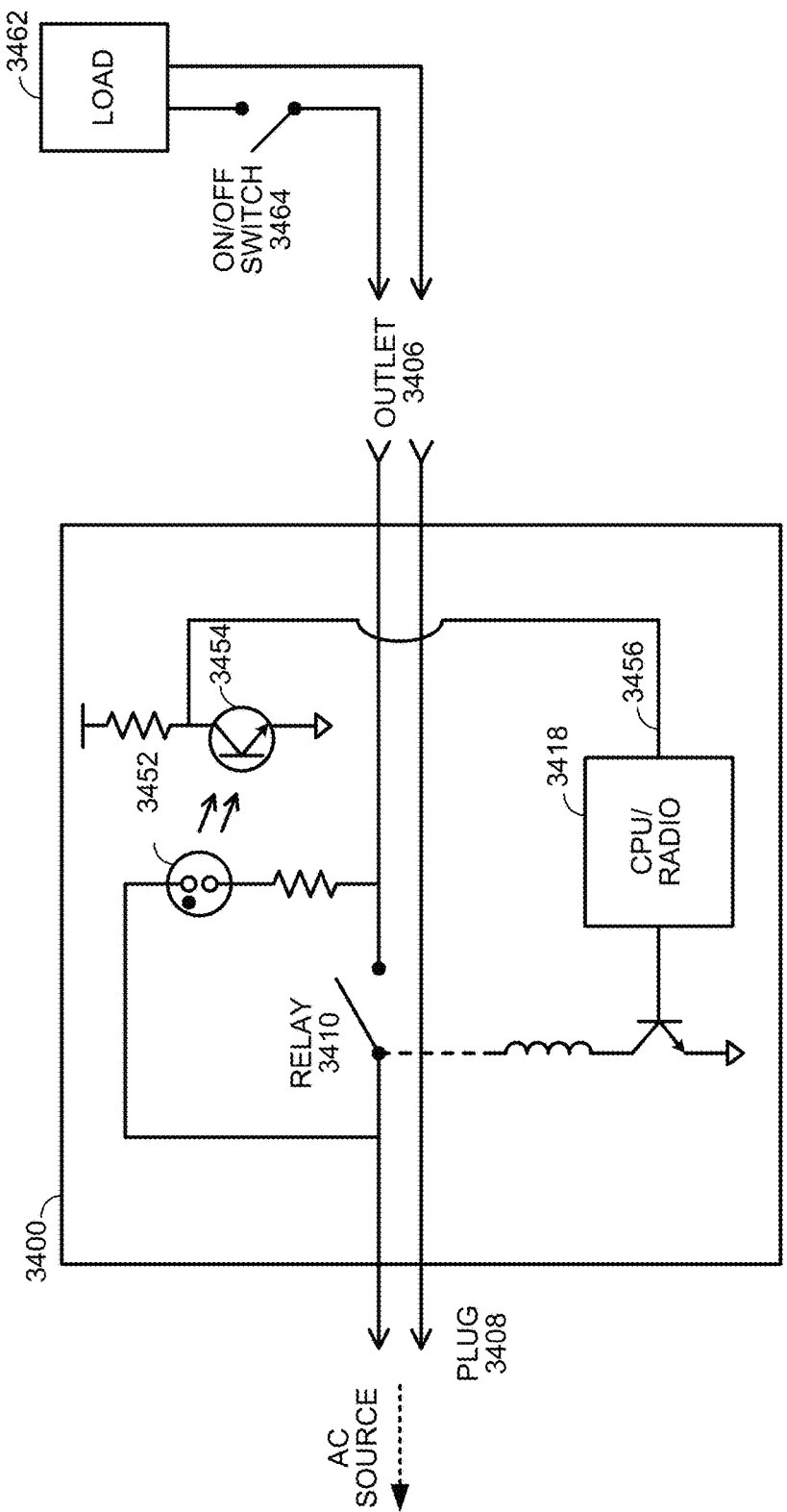
FIG. 34 is an example of a block diagram of a power control device, in accordance with some embodiments.

FIG. 34 illustrates a block diagram of a power control device 3400 that can automatically detect the power draw state of an external electronic device, according to some embodiments. Power control device 3400 can be used, for example, with an external electronic device that has a resistive load such as a lamp. In some embodiments, power control device 3400 may be, for example, network device 600, and may include one or more components of network device 600 not specifically shown in FIG. 34. Furthermore, power control device 3400 may include more or fewer components than shown in FIG. 34.

Power control device 3400 includes a plug 3408, an outlet interface 3406, and a relay 3410 coupled between plug 3408 and outlet interface 3406 to implement a main power path in power control device 3400 that can supply an operating current to power an external electrical device 3462. Plug 3408 may receive input power from a power source such as a wall socket that provides electrical power (e.g., AC power at 120 V, 200 V, etc.). Relay 3410 operates as a switch that controls whether power is relayed from plug 3408 to outlet interface 3406. When relay 3410 is closed, power control device 3400 is a power-on state, and outlet interface 3406 may provide output power (e.g., an operating current) from plug 3408 to external electronic device 3462 coupled to outlet interface 3406. When relay 3410 is open, power control device 3400 is a power-off state, and the main power path between plug 3408 and outlet interface 3406 is interrupted such that an operating current is unable to flow from plug 3408 to outlet interface 3406 along the main power path. Relay 3410 can be controlled by a controller 3418 (e.g., CPU/radio 818 of FIG. 8). As described above with reference to FIG. 6, a power button (not shown) coupled to controller 3418 can be used to manually control relay 3410, and/or wireless communication signals can be used to remotely provide controller 3418 with instructions to control relay 3410. According to some embodiments, additionally or alternatively, a power draw state signal 3456 coupled to controller 3418 can be used to control relay 3410 as described further below. Power draw state signal 3456 can be coupled to, for example, a general purpose input/output (GPIO) pin of controller 3418, and controller 3418 can be programmed to close or open relay 3410 in response to the power draw state signal 3456.

Power control device 3400 further includes a power draw test circuit and a power draw detection circuit for detecting the power draw state of external electronic device 3462. Power draw test circuit is coupled in parallel to relay 3410 between plug 3408 and outlet interface 3406, and provides an electrical current path (may be referred to herein as a power draw test current path) between plug 3408 and outlet interface 3406 when the power control device is in a power-off state. Power draw detection circuit is coupled to controller 3418, and is used for monitoring the power draw test current path provided by the power draw test circuit. When the behavior of the power draw test current path or a response to the power draw test current path indicates external electronic device 3462 is being turned on at external electronic device 3462 (e.g., via the power control mechanism of external electronic device 3462), power draw detection circuit may assert power draw state signal 3456 to instruct controller 3418 to automatically switch power control device 3400 from the power-off state to the power-on state by closing relay 3418.

For example, external electronic device 3462 may have its own power control mechanism (e.g., on/off switch 3464) at external electronic device 3462 that can be used to turn on or turn off external electronic device 3462. When the power control mechanism at external electronic device is activated (e.g., on/off switch 3464 set to the ON position) in an attempt to turn on external electronic device 3462, this may cause a change to the behavior or response to the power draw test current path provided by the power draw test circuit. The power draw detection circuit can monitor the power draw test current path provided by the power draw test circuit, and sense this change in the behavior or response to the power draw test current path as an indication that the power draw state of external electrical device 3462 has switched from an idle or OFF state that does not draw normal operational power to an ON state that demands operational power from power control device 3400. In response to detecting this change, power draw detection circuit may assert power draw state signal 3456 to close relay 3410 and enable the main power path in power control device 3400 to allow operating current to flow from plug 3408 to outlet interface 3406.

According to some embodiments, the power draw test circuit of power control device 3400 may include a photoemitter 3452, which may be coupled in series with a resistor. The series resistor may have a resistance of, for example, 1-10 M Ohm, and is used to limit the electrical current along the power draw test current path of the power draw test circuit. In some embodiments, photoemitter 3452 may be a miniature gas discharge bulb, such as a neon bulb. The gas discharge bulb may house a mixture of neon gas and/or other gases such that when sufficient voltage is applied, the gas (or gases) housed in the bulb excites and produces a glow discharge, resulting in photoemission or light being emitted from the gas discharge bulb. In some embodiments, the current required to cause the gas discharge bulb to emit light may be of the order of milliamps or less, for example, of the order of microamps or less.

When the power control mechanism at external electronic device 3462 is deactivated or switched OFF at external electronic device 3462, external electronic device 3462 may act as an open circuit across outlet interface 3406. As a result, no current may flow along the electrical current path of the power draw test circuit, and photoemitter 3452 may not emit any light. When the power control mechanism at external electronic device 3462 is activated or switched ON at external electronic device 962, the external circuit across outlet interface 3406 is closed, and current begins to flow along the electrical current path of the power draw test circuit to cause photoemitter 352 to emit light.

According to some embodiments, the power draw detection circuit of power control device 3400 may include a photodetector 3454 placed in proximity to photoemitter 3452 such that light given off by photoemitter 3452 can be detected by photodetector 3454. In some embodiments, photodetector 3454 and photoemitter 3452 can be housed in an enclosure to prevent photodetector 3454 from sensing light from other light sources within power control device 3400 or from outside of power control device 3400 (e.g., ambient light). Photodetector 3454 can be, for example, a phototransistor. When photodetector 3454 does not sense any light from photoemitter 3452, the power draw detection circuit may maintain power draw state signal 3456 in a deasserted state. When photodetector 3454 senses photoemission or light from photoemitter 3452 indicating that external electronic device 3462 is being turned ON at external electronic device 3462, the power draw detection circuit may assert power draw state signal 3456 to instruct controller 3418 to close relay 3410 and automatically switch power control device 3400 from the power-off state to the power-on state. Once relay 3410 is closed, an operating current for external electronic device 3462 is provided via the main power path from plug 3408 to outlet interface 3406 to power external electronic device 3462.

Accordingly, by including in power control device 3400 a power draw test circuit (e.g., photoemitter 3452) to provide an electrical current path between plug 3408 and outlet interface 3406 when the power control device is in a power-off state, and a power draw detection circuit (e.g., photodetector 3454) that monitors the electrical current path provided by the power draw test circuit, the power draw state of external electronic device 3462 can be detected based on monitoring of the electrical current path such that power control device 3400 can be automatically switched on when a user turns on external electronic device 3462 at external electronic device 3462. The use of photoemitter 3452 in combination with photodetector 3454 also provides electrical isolation between the power draw test circuit and the power draw detection circuit to reduce the likelihood of false triggers due to disturbances at the AC power source.

Figure 35:
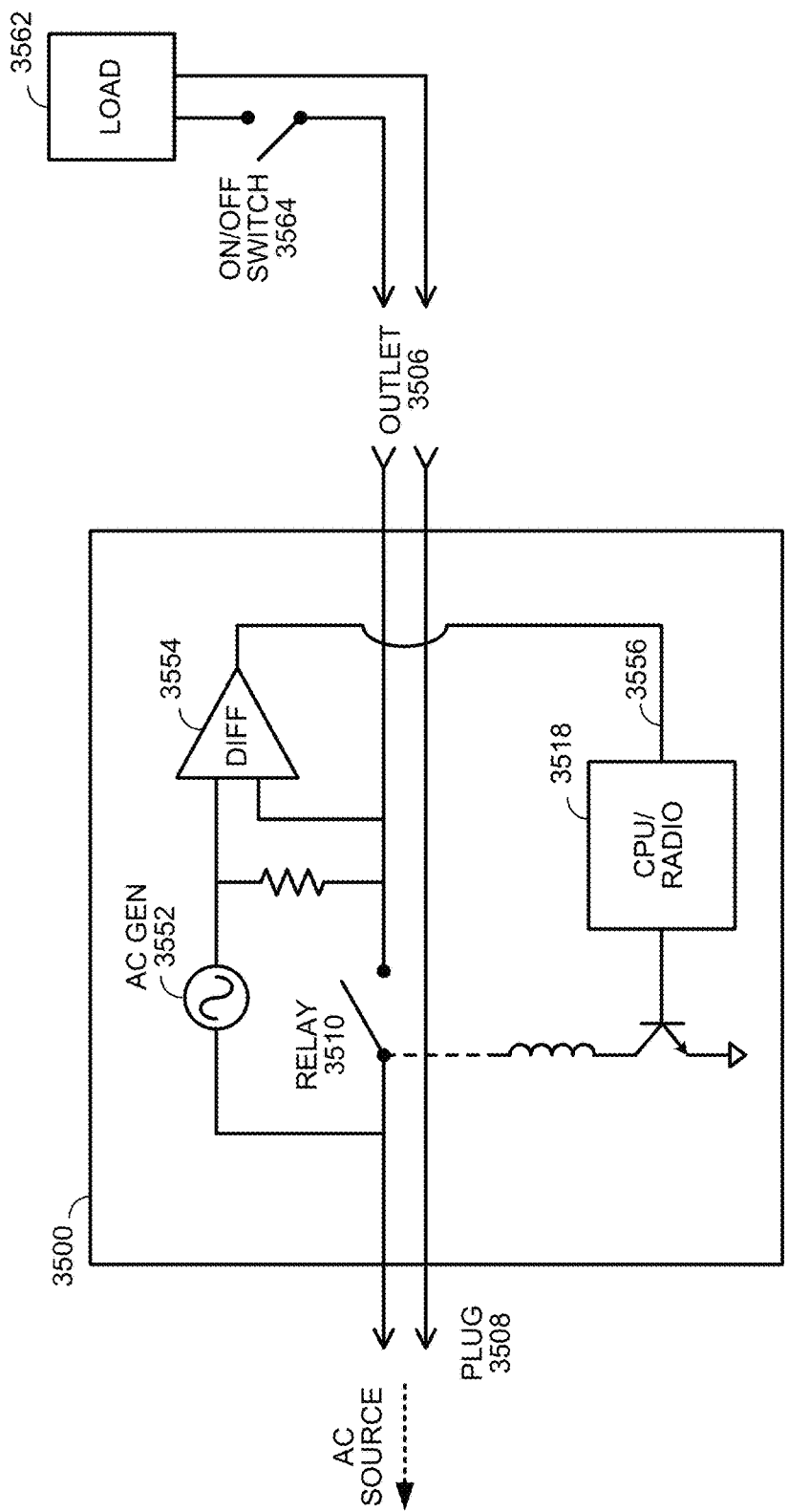
FIG. 35 is another example of a block diagram of a power control device, in accordance with some embodiments.

FIG. 35 illustrates a block diagram of a power control device 3500 that can automatically detect the power draw state of an external electronic device, according to some embodiments. Power control device 3500 can be used, for example, with an external electronic device that may have a complex load with a reactance component (e.g., inductive, capacitive, or a combination thereof) as well as complex load that may include both a resistive component and a reactive component. In some embodiments, power control device 3500 may be, for example, network device 600, and may include one or more components of network device 600 not specifically shown in FIG. 35. Furthermore, power control device 3500 may include more or fewer components than shown in FIG. 35. Reference numbers in FIG. 35 with similar numbering as FIG. 34 may denote similar components, and thus a detailed description of similar components need not be repeated.

According to some embodiments, the power draw test circuit of power control device 3500 coupled in parallel to relay 3510 may include an AC signal generator 3552 that generates and provides a periodic power draw test signal to outlet interface 3506. The AC signal generator may be coupled in series with a resistor. In some embodiments, the periodic power draw test signal generated by AC signal generator 3552 may be a low-power high-frequency RF signal, and may have a frequency, for example, between 10 kHz to 1 MHz. In some embodiments, the periodic power draw test signal may have a frequency between 30 kHz to 100 kHz. As will be explained further below, the particular frequency of the periodic power draw test signal generated by AC signal generator 3552 is not important, and thus AC signal generator 3552 need not be crystal controlled or amplitude controlled. As such, in some embodiments, AC signal generator 3552 can be implemented using a free running oscillator circuit, such as a transistor coupled with a coil, a pair of cross-coupled transistors, etc.

According to some embodiments, the power draw detection circuit of power control device 3500 may include a differentiator 3554 that monitors the output of AC signal generator 3552, and detects a difference between the periodic power draw test signal at the output of AC signal generator 3552 and the periodic signal appearing at outlet interface 3506. In some embodiments, the two inputs of differentiator 3554 can be coupled, respectively, to the output of the AC signal generator 3552 and to the line on outlet interface 3506 (e.g., across the series resistor of the power draw test circuit). The output of differentiator 3554 can be coupled to power draw state signal input of controller 3518. Differentiator 3554 may compare the amplitude and/or frequency of the periodic power draw test signal at the output of AC signal generator 3552 with the amplitude and/or frequency of the periodic signal appearing at outlet interface 3506, and asserts the output of differentiator 3556 (and hence power draw state signal 3556) when a difference in the amplitude and/or frequency is detected.

When the power control mechanism at external electronic device 3562 is deactivated or switched OFF at external electronic device 3562, external electronic device 3562 appears as a high impedance load to outlet interface 3506. As a result, the periodic power draw test signal generated by AC signal generator 3552 and the periodic signal appearing at outlet interface 3506 may have substantially the same amplitude and/or frequency, and differentiator 3554 may maintain power draw state signal 3556 in a deasserted state. When the power control mechanism at external electronic device 3562 is activated or switched ON at external electronic device 3562, the impedance at external electronic device 3562 may change due to the reactance and/or resistive change in the load of external electronic device 3562. This may cause a change in the voltage drop across the series resistor of the power draw test circuit, resulting in an amplitude or frequency difference between periodic power draw test signal at the output of AC signal generator 3552 and the periodic signal appearing at outlet interface 3506.

Differentiator 3554 can detect the amplitude and/or frequency difference indicating that external electronic device 3562 is being turned ON at external electronic device 3562, and may assert power draw state signal 3556 to instruct controller 3518 to close relay 3510 to automatically switch power control device 3500 from the power-off state to the power-on state. Once relay 3510 is closed, an operating current for external electronic device 3562 is provided via the main power path from plug 3508 to outlet interface 3506 to power external electronic device 3562. As described above, because the difference in the amplitude and/or frequency between periodic power draw test signal at the output of AC signal generator 3552 and the periodic signal appearing at outlet interface 3506 is used to indicate the power draw state of external electronic device 3562, the particular frequency and/or amplitude of the signal generated by AC signal generator 3552 is not important.

In some embodiments, to reduce the likelihood of false triggers, differentiator 3554 can be configured to assert power draw state signal 3556 when the amplitude difference is above a voltage threshold and/or when the frequency difference is above a frequency threshold. In some instances, even though external electronic device 3562 may appear as a high impedance load when external electronic device 3562 is turned OFF at external electronic device 3562, the impedance presented to outlet interface 3506 while external electronic device 3562 is turned OFF may still cause a disturbance on outlet interface 3506. For example, in some scenarios, external electronic device 3562 may be in an idle state with a minimal amount of active circuitry drawing current while external electronic device 3562 is turned OFF. In such scenarios, the active circuitry in external electronic device 3562 may cause an amplitude and/or frequency difference between the periodic power draw test signal at the output of AC signal generator 3552 and the periodic signal appearing at outlet interface 3506, even though external electronic device 3562 is turned OFF. Hence, in some embodiments, the voltage difference threshold and/or the frequency difference threshold to cause differentiator 3554 to assert power draw state signal 3556 can be set to be above the amplitude and/or frequency difference detected when external electronic device 3562 is in the OFF state. In some embodiments, differentiator 3554 can be programmed to learn the amplitude and/or frequency difference when a new external electronic device is coupled to outlet interface 3506 such that the appropriate threshold can be set for each external electronic device.

FIG. 36 illustrates a block diagram of a power control device 3600 that can automatically detect the power draw state of an external electronic device, according to some embodiments. Power control device 3600 can be used, for example, with an external electronic device that may have a complex load with a reactance component (e.g., inductive, capacitive, or a combination thereof) as well as complex load that may include both a resistive component and a reactive component. In some embodiments, power control device 3600 may be, for example, network device 600, and may include one or more components of network device 600 not specifically shown in FIG. 36. Furthermore, power control device 3600 may include more or fewer components than shown in FIG. 36. Reference numbers in FIG. 36 with similar numbering as FIG. 34 may denote similar components, and thus a detailed description of similar components need not be repeated.

According to some embodiments, the power draw test circuit of power control device 3600 coupled in parallel to relay 3610 may include a pulse generator 3652 that generates a pulse signal, which is provided as a power draw test pulse signal to outlet interface 3606. In some embodiments, the power draw test pulse signal can be generated at a predetermined interval (e.g., every millisecond, every second, etc.), and/or can be a square wave signal. According to some embodiments, the power draw detection circuit of power control device 3600 may include a standing wave ratio detector 3654 that monitors outlet interface 3606, and is used to detect the reflected energy at outlet interface 3606 responsive to the power draw test pulse signal provided to outlet interface 3606. Standing wave ratio detector 3654 can be implemented, for example, using a differentiator that detects a difference between the voltage on outlet interface 3606 when external electronic device 3662 is turned OFF at the external electronic device 3662 and the voltage on outlet interface 3606 when external electronic device 3662 is turned ON at the external electronic device 3662.

According to some embodiments, the power cord of external electronic device 3662 that is used to couple external electronic device 3662 to outlet interface 3606 and/or the load of external electronic device 3662 may be modeled as a transmission line. When the power control mechanism at external electronic device 3662 is deactivated or switched OFF at external electronic device 3662, the transmission line is unterminated at outlet interface 3606. Depending on the transmission line impedance characteristic of the power cord and/or load of external electronic device 3662 when external electronic device 3662 is turned OFF, some or all of the energy of the power draw test pulse signal provided to outlet interface 3606 by pulse generator 3652 may be reflected back, causing a standing wave with a certain voltage characteristic to be present at outlet interface 3606. Standing wave ratio detector 3654 can detect this voltage characteristic and associate it with the OFF state of external electronic device 3662.

When the power control mechanism at external electronic device 3662 is activated or switched ON at external electronic device 3662 to turn ON external electronic device 3662, the transmission line terminates at external electronic device 3662 with a transmission line impedance characteristic that is different than the transmission line impedance characteristic when external electronic device 3662 is turned OFF. As a result, only a portion (or in some cases none) of the energy of the power draw test pulse signal provided to outlet interface 3606 by pulse generator 3652 may be reflected back. This may cause a change in the standing wave voltage characteristic at outlet interface 3606. When standing wave ratio detector 3654 detects this change in the voltage characteristic at outlet interface 3606, standing wave ratio detector 3654 may assert power draw state signal 3656 to instruct controller 3618 to close relay 3610 and automatically switch power control device 3600 from the power-off state to the power-on state. Once relay 3610 is closed, an operating current for external electronic device 1062 is provided via the main power path from plug 3608 to outlet interface 3606 to power external electronic device 3662.

According to some embodiments, to accommodate different types of loads that may be coupled to the outlet interface, a power control device may include a combination of the power draw test circuits and power draw detection circuits described above with reference to FIGS. 34-36. For example, a power control device may include a photoemitter and a photodetector to sense the power draw state of a resistive load using the techniques described above, as well as an AC signal generator and/or pulse generator, and a differentiator and/or standing wave ratio detector to sense the power draw state of a complex load. In such embodiments, the power control device can be automatically switched to the power-on state when any of the power draw detection circuits senses the external electronic device is being turned on at the external electronic device.

FIG. 37 illustrates a flow diagram 3700 of a method for automatically turning on a power control device, according to some embodiments. The power control device may include a main power path between a plug and an outlet interface that can be enabled or disabled via a relay. The power control device may, for example, include two states or modes, where in the power-on state, the power control device provides power from the plug to the outlet interface for an external electronic device, and in the power-off state, the power control device does not provide operating power from the plug to the outlet interface for an external electronic device:

Referring to FIG. 37, at block 3702, an electrical current path (may be referred to herein as a power draw test current path) is provided between the plug and the outlet interface via a power draw test circuit when the power control device is in the power-off state. It should be understood that this power draw test current path is a different current path than the main power path in the power control device. For example, the power draw test circuit can be coupled in parallel to the relay along the main power path to provide the power draw test current path. According to some embodiments, the power draw test circuit may include a photoemitter (e.g., a gas discharge bulb such as a neon bulb, etc.), an AC signal generator (e.g., an oscillator, etc.) that generates and provides a periodic power draw test signal (e.g., a AC signal having a frequency such as a frequency between 10 kHz and 1 MHz, etc.) to the outlet interface, and/or a pulse generator that generates and provides a power draw test pulse signal to the outlet interface.

At block 3704, the electrical current path is monitored with a power draw detection circuit. According to some embodiments, the power draw detection circuit may include a photodetector, a differentiator that detects a difference between the periodic power draw test signal at the output of the AC signal generator and a periodic signal at the outlet interface, and/or a standing wave detector that detects reflected energy at the outlet interface.

At block 3706, the power control device is automatically switched from the power-off state to a power-on state in response to detecting the external electronic device is being turned on at the external electronic device based on monitoring of the electrical current path. In some embodiments, detection of light from the photoemitter of the power draw test circuit by the photodetector of the power draw detection circuit may indicate that the external electrical device is being turned on at the external electrical device. In some embodiments, detection of an amplitude and/or frequency difference between the periodic power draw test signal at the output of the AC signal generator and the periodic signal at the outlet interface may indicate that the external electrical device is being turned on at the external electrical device. In some embodiments, detection of a differential in the reflected energy at the outlet interface may indicate that the external electrical device is being turned on at the external electrical device. Once the power control device is automatically switched from the power-off state to a power-on state (e.g., by closing the relay in the main power path), an operating current can flow from the plug to the outlet interface to power the external electronic device.

Figure 38:
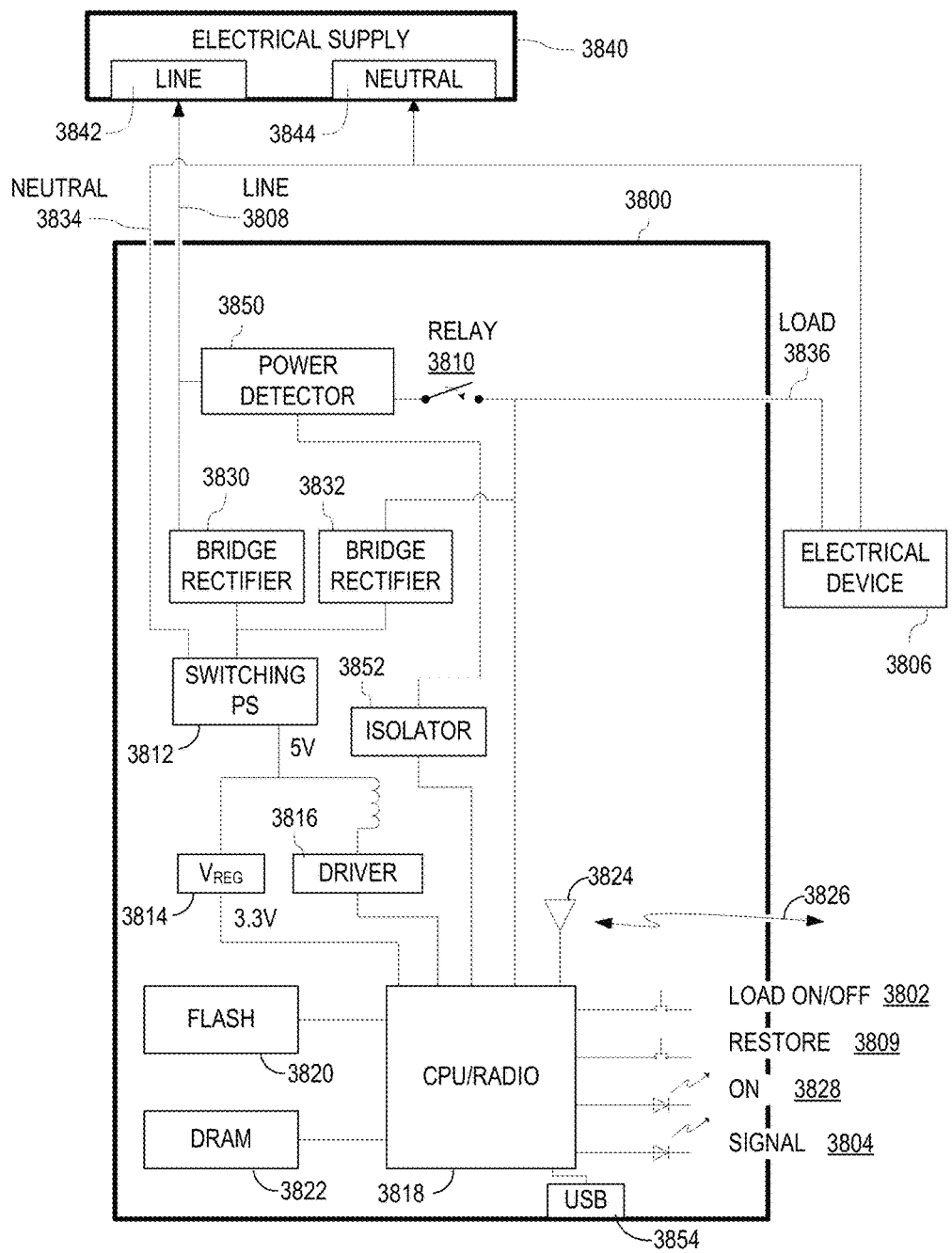
FIG. 38 is an example of a block diagram of a network device, in accordance with an embodiment.

FIG. 38 is an example of a block diagram of a network device 3800 depicting different hardware and/or software components of the network device 3800. As described herein, the network device 3800 includes the electrical device 3806, which may be an outlet, the connection to an electrical supply 3840, the power button 3802, the restore button 3809, and the communications signal indicator 3804. The network device 3800 also includes a power indicator 3828 associated with the power button 3802. As previously described, the power indicator 3828 may be illuminated when the network device 3800 is powered on.

The network device 3800 further includes a relay 3810. The relay 3810 is a switch that controls whether power is relayed from the electrical supply 3840 to the electrical device 3806. The relay 3810 may be controlled either manually using the power button 3802 or remotely using wireless communication signals. For example, when the power button 3802 is in an ON position, the relay 3810 may be closed so that power is relayed from the electrical supply 3840 to the electrical device 3806. When the power button 3802 is in an OFF position, the relay 3810 may be opened so that current is unable to flow from the electrical supply 3840 to the electrical device 3806. As another example, an application or program running on an access device may transmit a signal that causes the relay 3810 to be opened or closed. For instance, an access application may display a graphical interface on the access device that includes a power button. The user may tap or otherwise select the power button, and the access application may send a communication signal (e.g., over a WiFi network) to the network device 3800 instructing the network device 3800 to open or close the relay 3810.

The network device 3800 further includes flash memory 3820 and dynamic random access memory (DRAM) 3822. The flash memory 3820 may be used to store instructions or code relating to an operating system, one or more applications, and any firmware. The flash memory 3820 may include nonvolatile memory so that any firmware or other program can be can updated. In the event the network device 3800 loses power, information stored in the flash memory 3820 may be retained. The DRAM 3822 may store various other types of information needed to run the network device 3800, such as all runtime instructions or code.

The network device 3800 further includes a CPU/Radio 3818. The CPU/Radio 3818 controls the operations of the network device 3800. For example, the CPU/Radio 3818 may execute various applications or programs stored in the flash memory 3820 and/or the dynamic random access memory (DRAM) 3822. The CPU/Radio 3818 may also receive input from the various hardware and software components, interpret the input, and perform one or more functions in response to the input. As one example, the CPU/Radio 3818 may determine whether the power button 3802 has been pressed, and determines whether the relay 3810 needs to be opened or closed. The CPU/Radio 3818 may further perform all communications functions in order to allow the network device 3800 to communicate with other network devices, one or more gateways, a cloud network, and/or one or more access devices. While the CPU and radio of the network device 3800 are shown to be combined in the CPU/Radio 3818, it will be appreciated that, in some embodiments, the CPU and radio (also referred to herein as a wireless transceiver) may be separately located within the network device 3800. For example, CPU circuitry may be situated at a separate location on a circuit board from the location of radio circuitry, the CPU circuitry may be located on a different circuit board from the radio circuitry, or the like.

The network device 3800 may communicate with other devices and/or networks via wireless signal 3826 using antenna 3824. For example, antenna 3824 may include a 2.4 GHz antenna, a 5 GHz antenna, or the like, that can transmit and receive WiFi communications signals. The antenna 3824 may include other types of antennas that can communicate Bluetooth® signals, Zigbee® signals, Ultra-Wideband (UWB) signals, and/or the like. In some embodiments, the network device 3800 may include multiple antennas for communicating different types of communication signals. As one example, the network device 3800 may include both a 2.4 GHz antenna and a 5 GHz antenna.

The network device 3800 further includes a driver 3816, a switching power supply 3812, and a voltage regulator 3814. The driver 3816 may include instructions or code that can be used to translate control signals or commands received from applications running on the DRAM 3822 to commands that the various hardware components in the network device 3800 can understand. In some embodiments, the driver 3816 may include an ambient application running on the DRAM 3822. The switching power supply 3812 may be used to transfer power from the electrical supply 3840 to the various loads of the network device 3800 (e.g., CPU/Radio 3818). The switching power supply 3812 may efficiently convert the voltage and current characteristics of the electrical power to a level that is appropriate for the components of the network device 3800. For example, the switching power supply 3812 may perform AC-DC conversion. In some embodiments, the switching power supply 3812 may be used to control the power that is relayed from the electrical supply 3840 to the electrical device 3806. The voltage regulator 3814 may be used to convert the voltage output from the switching power supply 3812 to a lower voltage usable by the CPU/Radio 3818. For example, the voltage regulator 3814 may regulate the DC voltage from 5 V to 3.3 V.

The network device 3800 can include a neutral connection 3834, a line connection 3808, and a load connection 3836 that connect the network device 3800 to the electrical supply 3840 and the electrical device 3806. The electrical supply 3840 can include a line supply 3842 and a neutral supply 3844. Both the neutral connection 3834 and the neutral wire of the electrical device 3806 can be connected to the neutral supply 3844. The line connection 3808 and load connection 3836 are connected, in series, between the line supply 3842 and the electrical device 3806, to switch the electrical device 3806.

The switching power supply 3812 can draw power through the neutral connection 3834 and either the line connection 3808 or load connection 3836, allowing the network device 3800 to operate even if the line connection 3808 and load connection 3836 are installed improperly (e.g., if the load connection 3836 is connected to the line supply 3842 and the line connection 3808 is connected to the electrical device 3806). The switching power supply 3812 is connected to a first bridge rectifier 3830 that is connected to the line connection 3808 and a second bridge rectifier 3832 that is connected to the load connection 3836. The dual bridge rectifiers 3830, 3832 prevent undesired current from flowing between the line connection 3808 and load connection 3836. The dual bridge rectifiers 3830, 3832 allow the switching power supply 3812 to receive power from the line supply 3842 regardless as to whether the line connection 3808 or the load connection 3836 is connected to the line supply 3842. The dual bridge rectifiers 3830, 3832 can increase the ease of installation significantly and reduce the number of instances where a user believes a device is malfunctioning when the actual problem is incorrect installation, whether due to user error or incorrect wire labeling from the electrical supply 3840.

The network device 3800 can include a power detector 3850 positioned to measure electrical characteristics of power being supplied to the electrical device 3806. In some embodiments, the power detector 3850 can be placed to measure electrical characteristics of the power being supplied to the electrical device 3806. The power detector 3850 can include one or more components placed near, on, around, in series with, or in parallel with the circuit between the electrical supply 3840 and the electrical device 3806.

In some embodiments, the power detector 3850 is an integrated circuit capable of measuring electrical characteristics, such as voltage, current, true power, power factor, RMS power, and others. In some embodiments, the power detector 3850 can include one or more of a shunt resistor, a voltage detector, a current transformer, a current clamp, a hall effect sensor, or an optoisolator. The power detector 3850 can be any suitable current and/or voltage transducer capable of providing calibrated or non-calibrated measurements of electrical characteristics. Other suitable power detectors 3850 can be used.

The power detector 3850 can be coupled to the CPU/radio 3818 directly, or through an isolator 3852. The isolator 3852 can help separate the hot mains voltage from the low voltage of the CPU/radio 3818. In some embodiments without an access port 3854, as described in further detail herein, the power detector 3850 may be coupled directly to the CPU/radio 3818.

An access port 3854, such as a USB port, is coupled to the CPU/radio 3818. The access port 3854 can provide access to download data, such as logged, historical electrical characteristics data, to another device, such as a computer. In some embodiments, the access port 3854 can be used to add additional sensors to the network device 3800.

In various embodiments, functions may be stored as one or more computer-program products, such as instructions or code, in a non-transitory machine-readable storage medium, such as the flash memory 3820 and/or the DRAM 3822. The network device 3800 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above, for example as described with respect to FIG. 2, may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform the steps described above with respect to FIG. 2. The memory, such as the flash memory 3820 and/or the DRAM 3822, may be a processor-readable memory and/or a computer-readable memory that stores software code (programming code, instructions, etc.) configured to cause a processor(s) within the CPU/Radio 3818 to perform the functions described. In other embodiments, one or more of the functions described may be performed in hardware.

A set of these instructions and/or code might be stored on a non-transitory machine-readable storage medium, such as the flash memory 3820 and/or the DRAM 3822. In some cases, the storage medium might be incorporated within a computer system, such as the CPU/Radio 3818. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the network device 3800 and/or might take the form of source and/or installable code, which, upon compilation and/or installation on the network device 3800 (e.g., using any of a variety of generally available compilers, installation programs, compression/decompression utilities, etc.) then takes the form of executable code.

It should be appreciated that the network device 3800 may have other components than those depicted herein. Further, the embodiments shown in the figures are only one example of network devices that may incorporate embodiments of the invention. In some other embodiments, network device 3800 may have more or fewer components than shown in the figure, may combine two or more components, or may have a different configuration or arrangement of components.

Figure 39:
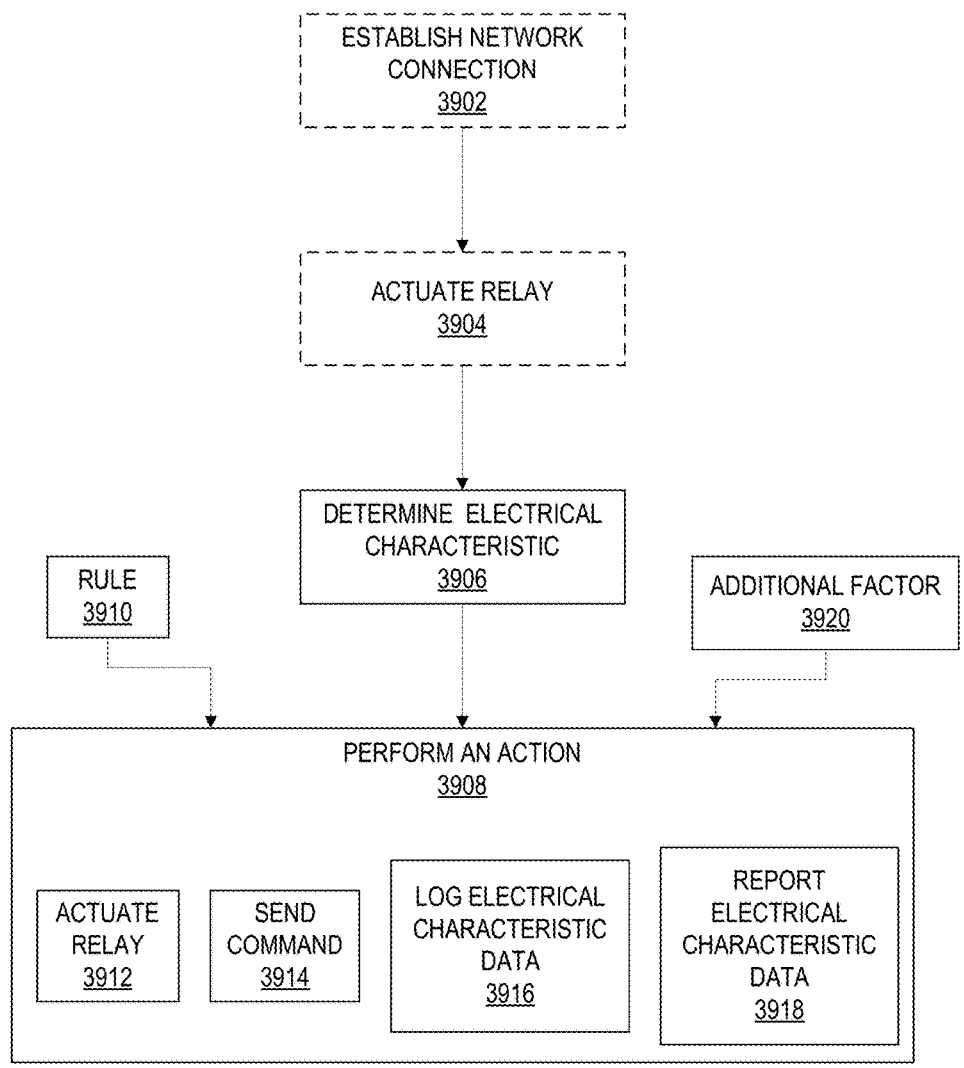
FIG. 39 is a flow chart depicting a method of performing electrical characteristic based actions according to one embodiment.

FIG. 39 is a flow chart depicting a method of performing electrical characteristic based actions 3900 according to one embodiment. Optionally, at block 3902, a network device can establish a network connection, such as with a local network, as described above. Optionally, at block 3904, the network device can actuate a relay, such as through an access device as described above.

At block 3906, the network device can determine an electrical characteristic of the power being supplied to an electrical device attached to the network device. Determining an electrical characteristic can involve measuring an electrical characteristic by the power detector and/or calculating an electrical characteristic based on measurements from the power detector. For example, some electrical characteristics that can be determined include voltage supplied, current supplied, true power, power factor, RMS power, energy consumption, and others. At block 3906, the network device can determine more than one electrical characteristic.

At block 3908, the network device can perform an action. Performance of an action at block 3908 can be based on one or more electrical characteristics determined at block 3906. Examples of suitable actions include actuating (e.g., closing or opening) the relay of the network device at block 3912, sending a command (e.g., to another network device, such as to turn on/off an electrical device connected to another network device) at block 3914, logging the electrical characteristic data as historical electrical characteristic data at block 3916, and reporting the electrical characteristic data, such as to an access device, at block 3918.

Sending a command at block 3914 can include sending any information over a network, including transmitting commands to other network devices. Sending a command can also include other network-based actions, such as composing and sending an email, sending a text message, and updating a value on a remote server (e.g., the cloud). Any command sent at block 3914 can include the determined electrical characteristic (e.g., as a number or number and unit) or any other relevant piece of information (e.g., a timestamp).

Logging electrical characteristic data at block 3916 can include logging the data in a memory of the network device. Logging electrical characteristic data can further include logging data in a memory of a remote server (e.g., the cloud). Logging electrical characteristic data can include logging the determined electrical characteristic, as well as logging any other piece of relevant information (e.g., a timestamp).

Reporting electrical characteristic data at block 3918 can include reporting data in response to determining the electrical characteristic at block 3906 and receiving a request from an access device. In some embodiments, the network device can report data without first receiving a request, such as by sending a signal to an access device indicating that the electrical device being supplied power through the network device has turned on or off.

In some embodiments, performing an action at block 3908 can be based on both the one or more electrical characteristics determined at block 3906 and a rule 3910. A rule 3910 can be stored in memory of the network device or otherwise accessible to the network device. A rule 3910 can be any instruction for the network device to perform an action at block 3908 in response to fulfilling the conditions of the rule 3910. Example rules are provided above, but additional rules can be used. Rules 3910 can be based on any piece of information available to a network device, including the determined electrical characteristic from block 3906. In some embodiments, rules 3910 can be programmed by a user through an access device.

In some embodiments, performing an action at block 3908 can be based on both the one or more electrical characteristics determined at block 3906 and an additional factor 3920. The additional factor 3920 can be an external factor, such as a command from an access device or a current status from another network device.

In some embodiments, performing an action at block 3908 can be based on all three of one or more electrical characteristics determined at block 3906, a rule 3910, and an additional factor 3920. A rule 3910 can therefore be based in part on the electrical characteristic determined at block 3906 and an additional factor 3920.

In some embodiments, an action is performed at block 3908 without any rule 3910 being evaluated or additional factor 3920 being required.

Figure 40:
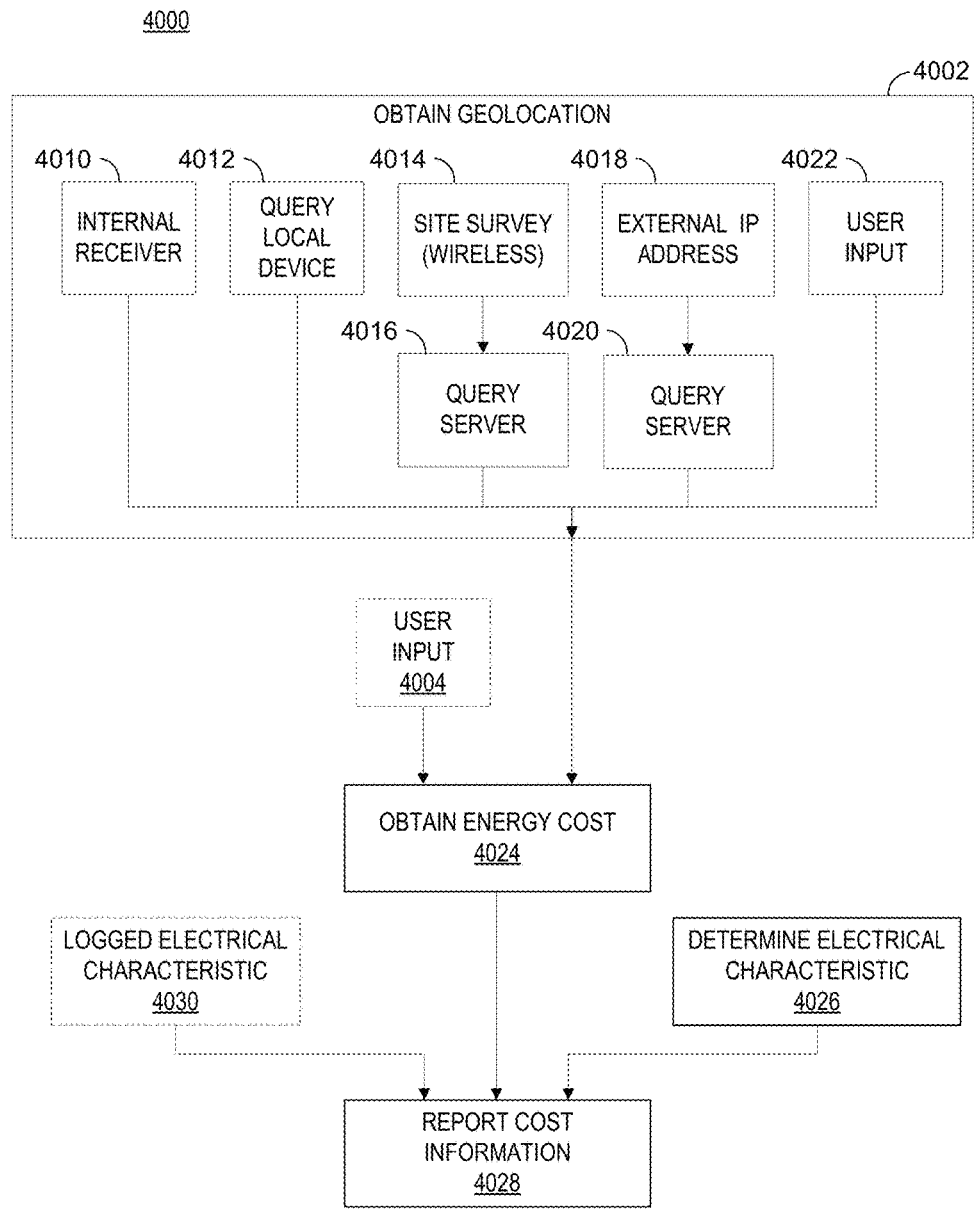
FIG. 40 is a flow chart depicting a method of estimating cost information according to one embodiment.

FIG. 40 is a flow chart depicting a method 4000 of estimating cost information according to one embodiment. The method 4000 of estimating cost information includes obtaining an energy cost at block 4024, determining an electrical characteristic at block 4026, and reporting cost information at block 4028.

Obtaining energy cost at block 4024 can be based on user input at block 4004. User input provided at block 4004 can be in the form of cost (e.g., in dollars) per unit of energy (e.g., kilowatt-hours). In some embodiments, the user input at block 4004 can be based on a selected energy provider, in which case the network device and/or an access device can query a server (e.g., the cloud) in order to determine the actual or estimated cost per unit of energy based on the energy provider. In some embodiments, obtaining the energy cost at block 4024 is based on a geolocation obtained at block 4002. The network device or access device can query a server (e.g., the cloud) to determine the actual or estimated cost per unit of energy based on the geolocation.

At block 4002, the geolocation is obtained. The geolocation can be any representation of a physical location, such as a terrestrial location (e.g., a street address or a specific longitude and latitude). The geolocation can be obtained in any suitable way, such as through an internal receiver at block 4010 (e.g., a global positioning satellite (GPS) receiver and/or other location-determining receivers), by querying a local device at block 4012 (e.g., receiving and using another device's geolocation, such as the geolocation of a network device or an access device), by performing a site survey at block 4014 (e.g., a wireless network site survey) and querying a server with the results of the site survey at block 4016 to determine an approximate location; by determining the external internet protocol (IP) address of the network device at block 4018 and querying a server at block 4020 to determine an approximate location of the external IP address; or by accepting user input at block 4022 (e.g., by providing a prompt to a user on an access device, such as asking for the user's address, city, or zip code). Additionally, when a user provides user input at block 4022, the user input can be processed by the network device and/or a server to translate the user input into a location (e.g., to translate a city name into approximate longitude and latitude coordinates). Other ways of determining a geolocation can be used.

In some embodiments, the geolocation is the location of the network device itself. In other embodiments, the geolocation is the location of an access device. In some embodiments, the geolocation is a location of another networked device.

A geolocation can be obtained from one or multiple of the aforementioned sources. In some embodiments where a geolocation is obtained from multiple of the aforementioned sources, a priority and/or weighting of the sources can be established such that more accurate and/or more desirable sources overrule or outweigh less accurate and/or less desirable sources. For example, a user's input at block 4022 can have the highest priority, querying a local device at block 4012 can have a lower priority, using an internal receiver at block 4010 can have a lower priority, performing a site survey at block 4014 can have a lower priority, and querying a server at block 4020 based on an external IP address can have the lowest priority. Other priority rankings can be used.

At block 4026, one or more electrical characteristics can be determined, as described above. At block 4028, the cost information can be reported. Cost information can include average and/or current cost to operate the electrical device powered by the network device. Cost information can include a cost per unit of time based on the electrical characteristic (e.g., kilowatt-hour) from block 4026 and the energy cost from block 4024. In some embodiments, logged electrical characteristics can be obtained at block 4030, including historical electrical characteristics of the electrical device supplied power from the network device. The cost information can include an average cost per unit and/or estimated future cost per unit based on logged electrical characteristics from block 4030 and the energy cost from block 4024. Reporting cost information at block 4028 can include providing the cost information to an access device, such as for display to a user. Reporting cost information can also include providing cost information to an external server (e.g., the cloud) and storing cost information in a log.

Figure 41:
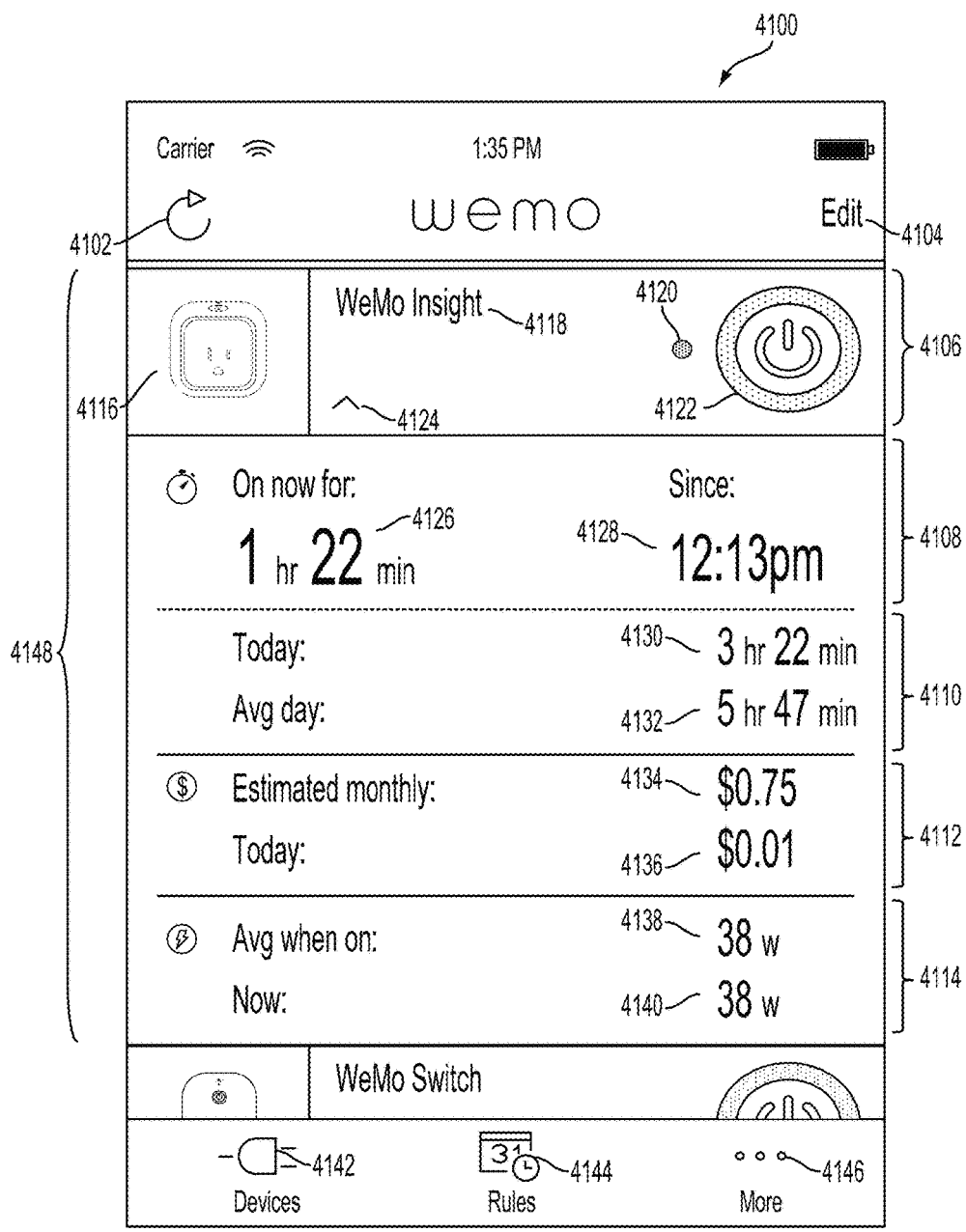
FIG. 41 is a schematic figure of a display on an access device for accessing a network device according to one embodiment.

FIG. 41 is a schematic figure of a display 4100 on an access device for accessing a network device according to one embodiment. The display 4100 can include a refresh element 4102 that can be pressed to refresh information presented on the display 4100. An edit element 4104 can be included that can be pressed to edit the display 4100, which can include removing and repositioning network devices presented on the display 4100. Each network device accessible from the access device can be represented by a network device access group 4148. The network device access group 4148 can include a main panel 4106. The main panel 4106 can include an image 4116 associated with the network device, a name 4118 associated with the network device, and a primary control 4122. The primary control 4122 can change in display depending on the power state of the network device. For example, if the network device is powered (e.g., the relay is closed), the primary control 4122 can display as filled-in with green, whereas if the network device is not powered (e.g., the relay is open), the primary control 4122 can display without being filled-in. Other changes in display can be used. The main panel 4106 can further include an electrical device power indicator 4120. The electrical device power indicator 4120 can be indicative of the power state of the electrical device. For example, the electrical device power indicator 4120 can change color based on the sensed on/off state of the electrical device (e.g., green for full on, yellow for standby on, and red for off) or based on other electrical characteristics of the electrical device. Other changes in display can be used.

The main panel 4106 can include a collapse/expand element 4124 that can hide or reveal one or more subpanels. The subpanels can display information based on the electrical characteristics determined by the network device. A first subpanel 4108 can include recent power on duration 4126 and recent power on time 4128 information, indicative of the length of time the electrical device has been sensed as being in an on state (e.g., standby on or full on) and the time when the electrical device changed to that on state, respectively, since the last time the electrical device was in an off state. A second subpanel 4110 can include a power on time 4130 and a daily power on time 4132, indicative of the length of time the electrical device has been on for the current day and the length of time the electrical device has been on per day on average, respectively. A third subpanel 4112 can include an estimated monthly cost element 4134 and a current daily cost element 4136, which can display the estimated cost of operating the electrical device for a month (e.g., based on the daily power on time 4132) and the estimated cost of operating the electrical device from the beginning of the day to the current time, respectively. A fourth subpanel 4114 can include an average power usage 4138 and a current power usage 4140 of the electrical device as sensed by the network device. The display 4100 can also include a devices element 4142 that can be pressed to access a list of network devices accessible to the access device. The display 4100 can also include a rules element 4144 that can be pressed to add, modify, or delete rules associated with the network devices. The display 4100 can also include a more element 4146 that can be pressed to access additional features of the software running on the access device for interacting with network devices.

The display 4100 can include any combination of the above elements, as well as other elements. The display 4100 can include any elements related to or derived from determined electric characteristics that are measured by the network device.

Figure 42:
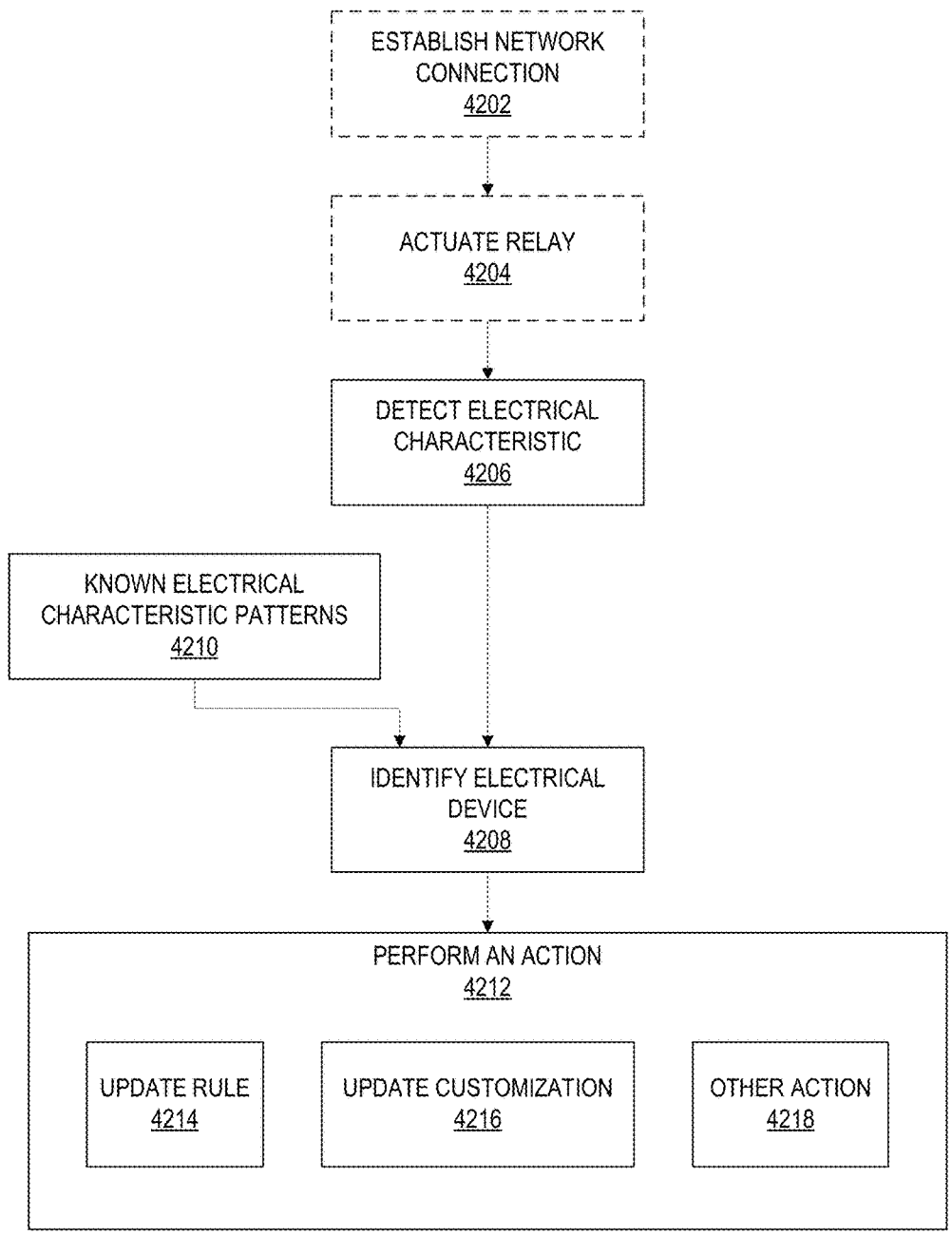
FIG. 42 is a flow chart depicting a method of performing actions based on identified electrical devices according to one embodiment.

FIG. 42 is a flow chart depicting a method 4200 of performing actions based on identified electrical devices according to one embodiment. At optional block 4202, a network device can establish a connection to a network, as described above. At optional block 4204, the network device can actuate a relay, as described above. At block 4206, the network device can detect one or more electrical characteristics of the electrical device to which power is provided through the network device.

At block 4208, the network device can identify the electrical device to which power is provided through the network device. The network device can compare the detected electrical characteristics from block 4206 with a database of known electrical characteristic patterns 4210. The known electrical characteristic patterns 420 can be loaded in a memory of the network device, or otherwise accessible to the network device (e.g., through an access device and/or through the cloud). The network device, upon comparing the detected electrical characteristics from block 4206 with the database of known electrical characteristic patterns 4210, can identify the electrical device at block 4208. The network device can compare averages, patterns, and other elements of electrical characteristics of the electrical device that are measurable by the network device. In an example, the network device can measure patterns of current fluctuations used by the electrical device, for example during a switch between on/off states initiated by a user. If the pattern detected at block 4206 matches one of the known electrical characteristic patterns 4210 within a predetermined tolerance, the electrical device to which the network device is supplying power can be identified as the corresponding electrical device in the database of known electrical characteristic patterns 4210. A network device can identify an electrical device in any suitable way. Examples of suitable identification regimes include identifying by type of electrical device (e.g., light bulb, television, fan), by sub-type of electrical device (e.g., an incandescent light bulb or a compact fluorescent light bulb), by brand of electrical device (e.g., a Samsung™ television or a Sony™ television), or by model of electrical device (e.g., Samsung™ model UN46F6400 television).

Upon identifying the electrical device at block 4208, the network device can perform an action at block 4212 based on the identified electrical device. Actions performed at block 4212 can include updating a rule at block 4214, updating a customization at block 4216, or performing another action at block 4218. Examples of other actions include suitable actions described above. Updating a rule at block 4214 can include creating, modifying, or deleting a rule. For example, a rule (e.g., turn on electrical device at sunset) can be automatically added whenever a particular electrical device (e.g., a light bulb) is provided power through the network device. In this example, if the light bulb were provided power through a second network device instead of the first network device (e.g., unplugged from one network device and plugged into a second network device), the light bulb would still turn on at sunset, without additional reprogramming by the user. In some embodiments, updating a rule at block 424 can include querying other network devices, access devices, and/or remote servers (e.g., the cloud) to determine what one or more rules should be used with the identified electrical device. In an example, a user can create a rule while the electrical device is plugged into a first network device, the user can then unplug the electrical device from the first network device and plug the electrical device into a second network device, then the second network device can identify the electrical device at block 4208 and update a rule at block 4214 by receiving the rule information that the user had programmed into the first network device (e.g., in response to a query sent by the second network device).

In some embodiments, identifying an electrical device at block 4208 further includes obtaining information from a user. Such information can include confirmation that the identified electrical device is accurately identified. Additionally, a user can provide information pertaining to the possible electrical devices the user may couple to a network device. Other information can be provided by a user. The user can provide information through an access device.

Figure 43:
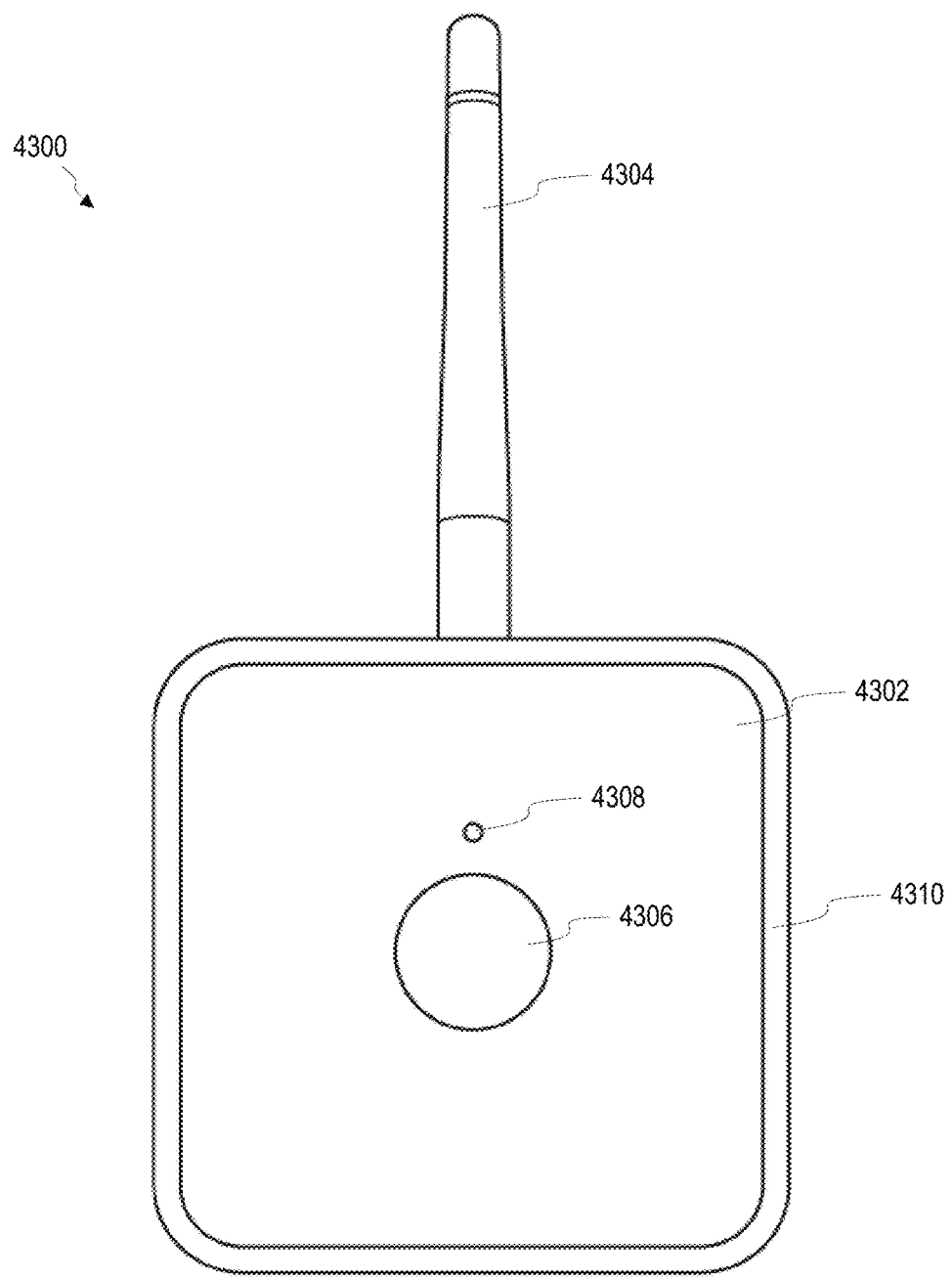
FIG. 43 is an illustration of an example of a front view of an input and output platform network device according to certain aspects of the present disclosure.

FIG. 43 is an illustration of an example of a front view of an input and output platform 4300 according to certain aspects of the present disclosure. The input and output platform 4300 includes an enclosure 4310. The enclosure can have a front face 4302. The front face 4302 can be a clean face that provides access to only certain features of the input and output platform 4300 that are commonly used. For example, terminals and reset buttons may not be commonly used, so may not be accessible from the front face 4302. However, a power light 4308 and a front primary button 4306 may be commonly used and may be accessible on the front face 4302. In alternate embodiments, other faces may be the clean face.

In some embodiments, the front primary button 4306 operates a relay within the input and output platform 4300. In some embodiments, the front primary button 4306 can be programmed to perform other actions, such as operate one or more relays of the input and output platform 4300, send alerts or messages to an access device, send commands to other network devices (e.g., to turn on or off a switch on a network device), or send other signals over the network. The front primary button 4306 can be programmed to be a momentary button or a toggle button. The duration of the momentary button can be configurable or preset.

An external antenna 4304 can be included. The external antenna 4304 can be bendable, such as being articulatable about a joint, as well as being rotatable with respect to the enclosure 4310. In some embodiments, no external antenna 4304 is used. In some embodiments, the external antenna 4304 is detachable from the enclosure 4310 and can be positioned a distance apart from the enclosure 4310 (e.g., to mount the antenna in a more desirable location).

Figure 44:
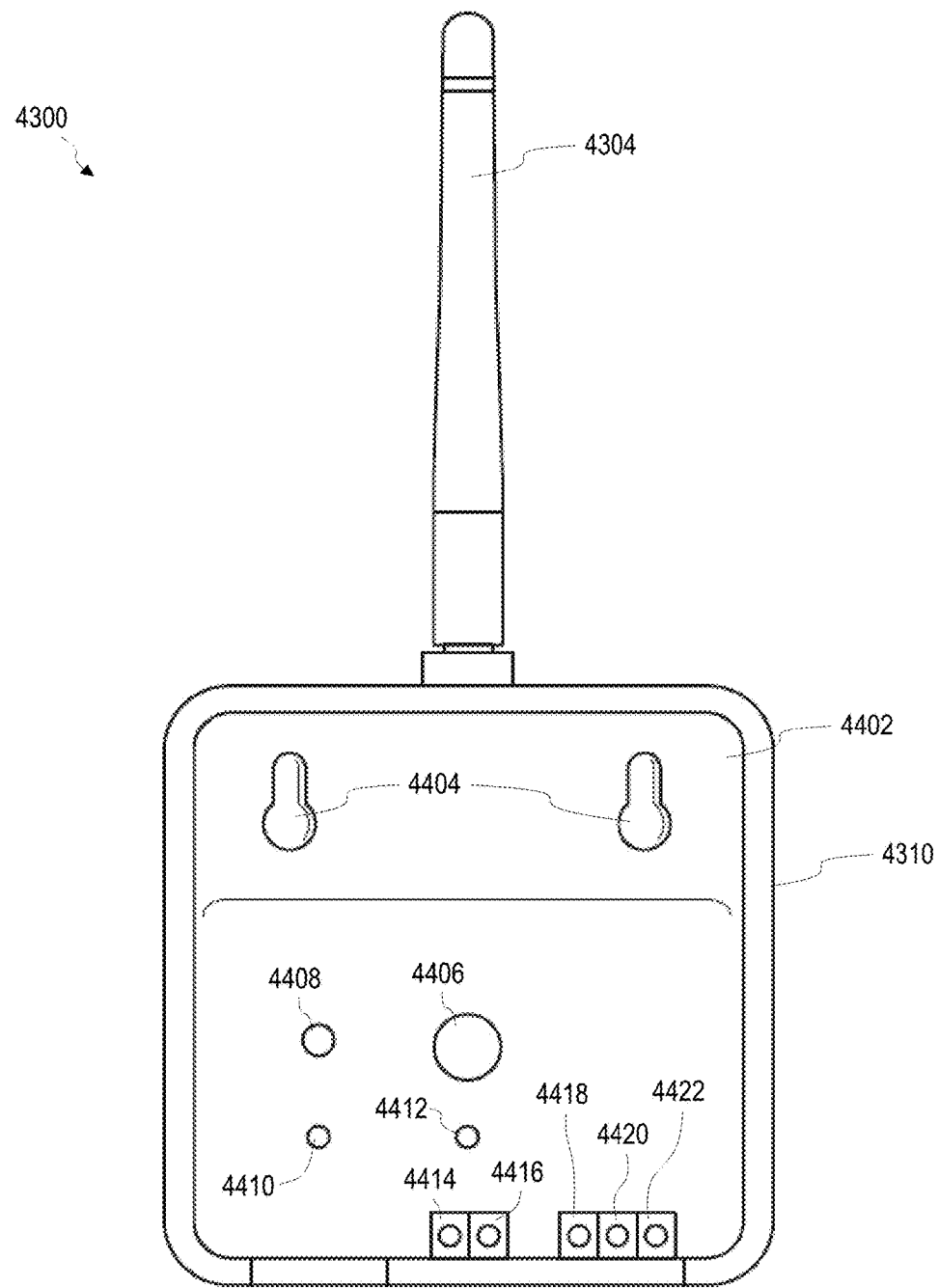
FIG. 44 is an illustration of a rear view of the input and output platform of FIG. 43 according to certain aspects of the present disclosure.

FIG. 44 is an illustration of a rear view of the input and output platform 4300 of FIG. 43 according to certain aspects of the present disclosure. The enclosure 4310 can include a rear face 4402. The rear face 4402 can include attachment points 4404, which can be any feature of the enclosure 4310 that is suitable for attaching the enclosure 4310 to a surface or other object, such as holes for screw mounting. Attachment points 4404 can be located in other places on the enclosure 4310.

The rear face 4402 can be a functional face, providing access to most or all of the features of the input and output platform 4300. Specifically, the functional face can provide access to a power light 4412, a WiFi light 4410, a rear primary button 4406, a restore button 4408, a relay first terminal 4414, a relay second terminal 4416, a power output terminal 4418, a sensor input terminal 4420, and a ground terminal 4422. Other numbers and types of inputs and outputs can be provided through the functional face. For example, any number of relay terminals or sensor input terminals can be used for any number of relays or sensor inputs.

The front face and remainder of the enclosure can be shaped to allow the enclosure to rest on a flat surface, such as a desk, while the rear face 4402 faces away from the flat surface (e.g., upwards).

The power light 4412 can provide an indication of the status of the relay within the input and output platform 4300. The power light 4412 can be an LED that illuminates when the relay is closed and deluminates when the relay is open.

The WiFi light 4410 can provide a status of the input and output platform's 4300 connection to a network. The WiFi light 4410 can illuminate in a certain pattern or with certain colors to indicate the status of the network connection, such as a good connection, a slow connection, searching for a connection, or no connection. The WiFi light 4410 can provide other indications. In some embodiments, if the input and output platform connects to the network using something other than a WiFi connection, the WiFi light 4410 can be replaced by a network status light that provides similar information (e.g., connectivity information) regardless of the method of connection to the network (e.g., wired or wireless).

The rear primary button 4406 can operate a relay within the input and output platform 4300, just like the front primary button 4306. The rear primary button 4406 can be wired similarly with the front primary button 4306 such that depression of either the rear primary button 4406 or the front primary button 4306 is sensed the same by the input and output platform 4300. In other embodiments, the input and output platform 4300 can distinguish between the rear primary button 4406 and front primary button 4306, but can be programmed to respond differently or the same when each is pressed. In some embodiments, the rear primary button 4406 can be programmed to perform other actions, such as operate one or more relays of the input and output platform 4300, send alerts or messages to an access device, send commands to other network devices (e.g., to turn on or off a switch on a network device), or send other signals over the network. The rear primary button 4406 can be programmed to be a momentary button or a toggle button. The duration of the momentary button can be configurable or preset.

The restore button 4408 can be used to restore the input and output platform 4300 to factory defaults. The restore button 4408 can restore only information related to establishing a network connection, only information related to rules and functionality stored within the input and output platform 4300, or any combination thereof.

The relay first terminal 4414 and relay second terminal 4416 can be used to connect an external device to a relay within the input and output platform 4300. When the relay is closed, a circuit is established between the relay first terminal 4414 and relay second terminal 4416. The relay can be normally-closed or normally-open, which can be a preset default or can be a configurable default.

The power output terminal 4418 can be used to provide power to an external device. The power output terminal 4418 can provide 5 volt power or any other suitable voltage. The power output terminal 4418 can be controllable by the input and output platform 4300 (e.g., can be turned on or off by an access device). The power output terminal 4418 can be configurable by the input and output platform 4300 (e.g., the voltage that is output can be set when programming the input and output platform 4300). The power output terminal 4418 can be non-configurable and non-controllable by the input and output platform 4300 (e.g., the power output terminal can be coupled to the power input without being coupled in any way through a processor of the input and output platform 4300). The input and output platform 4300 can have any number of power output terminals.

The sensor input terminal 4420 can be used to sense a sensor signal from an external sensor. The sensor signal can be sensed directly from the sensor input terminal 4420, or between the sensor input terminal 4420 and another terminal. The sensor signal can be sensed between the sensor input terminal 4420 and the ground terminal 4422. The sensor signal can be sensed between the sensor input terminal 1320 and the power output terminal 4418. In some embodiments, a sensor that requires power to operate can be coupled to the input and output platform 4300 to obtain power from the power output terminal 4418 and to provide a signal through the sensor input terminal 4420. Any number of sensor input terminals can be used.

The ground terminal 4422 can provide access to a ground reference. For example, the ground terminal 4422 can be used with the power output terminal 4418 to provide a voltage difference. Any number of ground terminals can be used.

Any of the terminals described herein can be provided as any suitable structure for making an electrical connection, such as a plug, a socket, a screw terminal, a clamp terminal, or other type of electrical connection point.

The functional face can provide access to the restore button 4408. The functional face can provide access to terminals, such as the relay first terminal 4414, relay second terminal 4416, and sensor input terminal 4420. The functional face can provide access to the terminals and a primary button, such as the rear primary button 4406, without needing to move or reorient (e.g., flip over) the enclosure 4310.

In some embodiments, the portion of the rear face 4402 having inputs or outputs (e.g., buttons, LEDs, and terminals) can be slightly recessed from the portion of the rear face 4402 having the attachment points 4404, allowing the enclosure 4310 to be secured closely to a structure, such as a wall.

The external antenna 4304 can be positioned anywhere on the enclosure, or as otherwise described herein.

Figure 45:
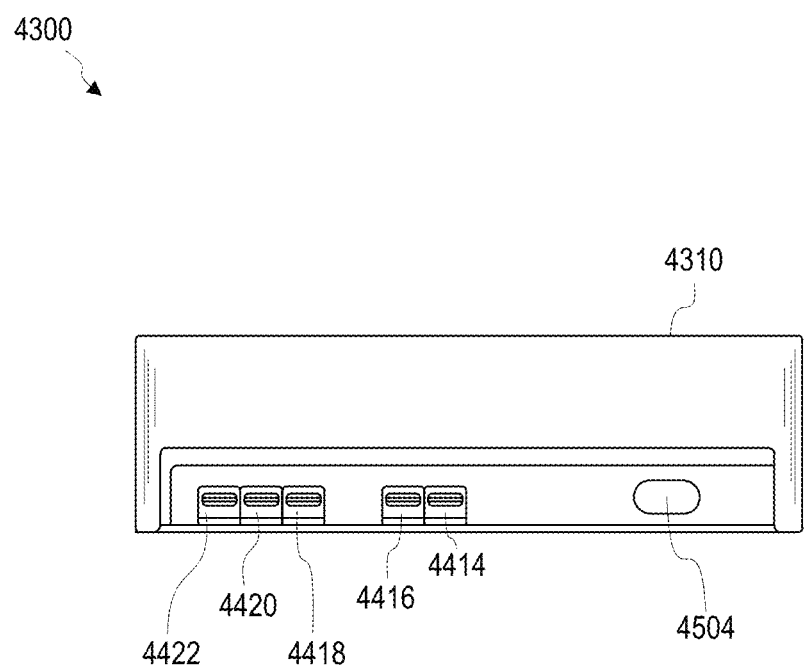
FIG. 45 is an illustration of a bottom view of the input and output platform of FIG. 43 according to certain aspects of the present disclosure.

FIG. 45 is an illustration of a bottom side view of the input and output platform 4300 of FIG. 43 according to certain aspects of the present disclosure. The bottom of the enclosure 4310 can provide access to the various inputs and outputs. As seen in FIG. 45, the bottom of the enclosure 4310 provides access to a relay first terminal 4414, a relay second terminal 4416, a power output terminal 4418, a sensor input terminal 4420, and a ground terminal 4422. The bottom of the enclosure 4310 can further provide access to the power input 4504.

The power input 4504 can be a terminal or set of terminals suitable for providing power to the input and output platform 4300. In an embodiment, the power input 4504 is a universal serial bus (USB) socket, which is capable of receiving power (e.g., 5 volts) from a USB cable. In some embodiments, no power input 4504 is used because the input and output platform 4300 contains a power source, such as a battery, a photovoltaic cell, or other power source. In some embodiments, the power input 4504 can be a connector designed to connect to a portable power source, such as an external battery or a remotely-positionable photovoltaic cell. Other power sources, internal or external, can be used to provide power to the input and output platform 4300. In embodiments discussed in further detail herein, the input and output platform 4300 can obtain power from another input and output platform 4300, such as from the power output terminal 4418 of another input and output platform 4300.

Figure 46:
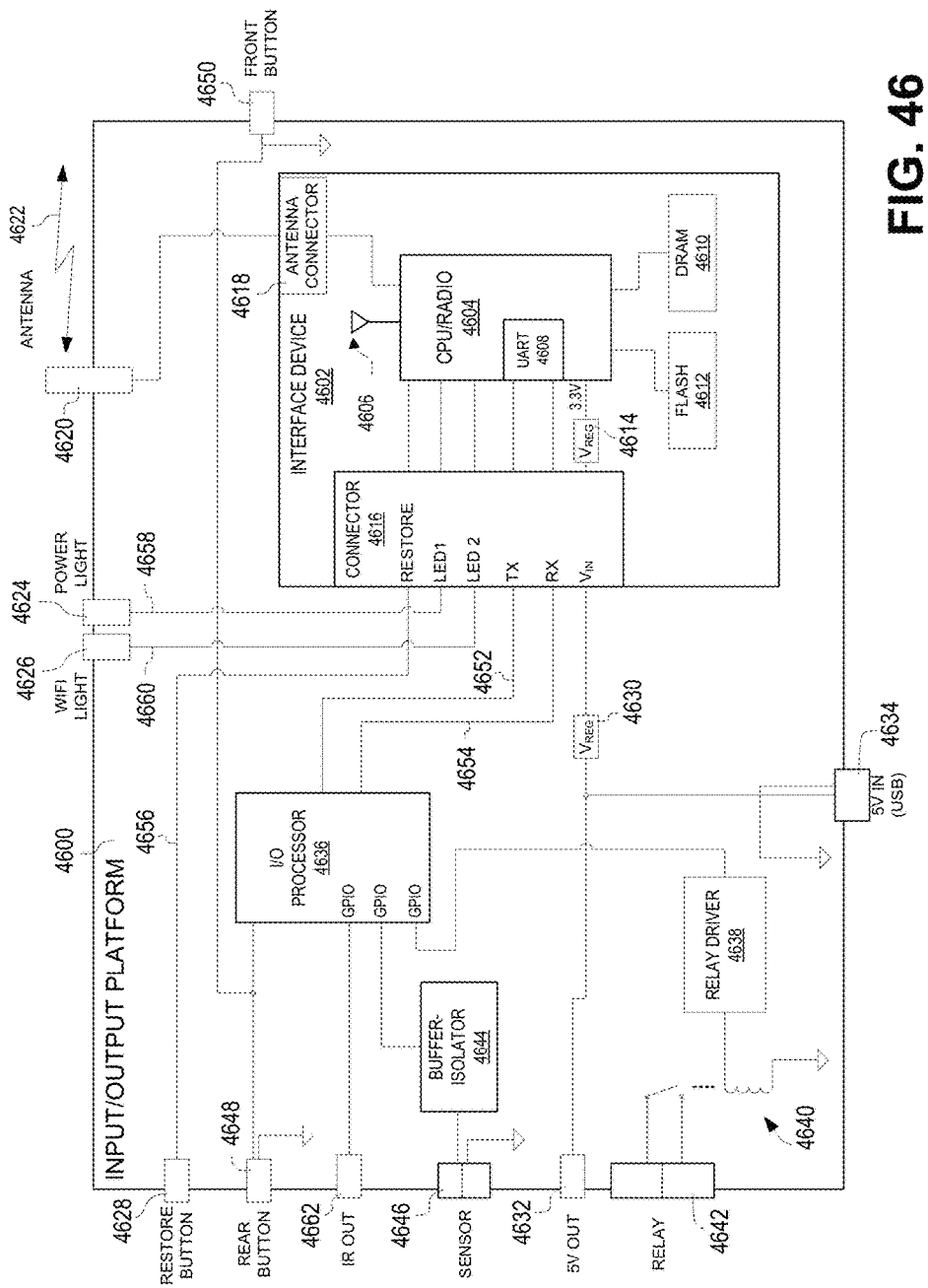
FIG. 46 is a block diagram illustrating an example of an input and output platform according to certain aspects of the present disclosure.

FIG. 46 is a block diagram illustrating an example of an input and output platform 4600 according to certain aspects of the present disclosure.

In some embodiments, the input and output platform 4600 can include an interface device 4602 coupled to an input and output (I/O) processor 4636. The interface device 4602 can be a device-agnostic device that communicates with the I/O processor 4636. The I/O processor 4636 can provide the interface device 4602 with information related to the functions available to the input and output platform 4600 (e.g., number and types of relays, number of buttons, and number and types of sensors or sensor inputs). The interface device 4602 can provide the input and output platform 4600 with network connectivity and control. The interface device 4602 can manage the sending and receiving of all network communications over a network interface for the input and output platform 4600. The interface device 4602 can receive network signals and convert appropriate signals to commands which are passed to the I/O processor 4636, which in turn can perform actions, such as closing a relay 4640. Additionally, inputs received by the I/O processor 4636, such as inputs from a sensor input terminal 4646, a front button 4650, or a rear button 4648, can be received by the I/O processor 4636 and then received by the interface device 4602. The interface device 4602 can perform actions based on those inputs, such as compare the inputs to rules, send commands to the I/O processor 4636 based on the inputs, or send network communications based on the inputs.

The interface device 4602 can include flash memory 4612, dynamic random access memory (DRAM) 4610, or both. The flash memory 4612 may be used to store instructions or code relating to an operating system, one or more applications, and any firmware. The flash memory 4612 can be used to store a cache. The flash memory 4612 may include nonvolatile memory so that any firmware or other program can be can updated. In the event the interface device 4602 loses power, information stored in the flash memory 4612 may be retained. The DRAM 4610 may store various other types of information needed to run the interface device 4602, such as all runtime instructions or code. The flash memory 4612 or DRAM 4610 or a combination thereof may include all instructions necessary to communicate with the input and output platform 4600.

The interface device 4602 further includes a CPU/Radio 4604. The CPU/Radio 4604 can control the operations of the interface device 4602. For example, the CPU/Radio 4604 may execute various applications or programs stored in the flash memory 4612 and/or the dynamic random access memory (DRAM) 4610. The CPU/Radio 4604 may also receive input from the input and output platform 4600, interpret the input, and perform one or more functions in response to the input. The CPU/Radio 4604 may further perform all communications functions in order to allow the interface device 4602 to communicate with other network devices, one or more gateways, a cloud network, and/or one or more access devices. The interface device 4602 may communicate with other devices and/or networks via internal antenna 4606 or an external antenna 4620. An external antenna 4620 can be coupled to the interface device 4602 using an antenna connector 4618. In an example, an internal antenna 4606 or an external antenna 4620 may include a 2.4 GHz antenna that can transmit and receive WiFi communications signals 4622. The internal antenna 4606 or external antenna 4620 may include other types of antennas that can communicate Bluetooth® signals, Zigbee® signals, Ultra-Wideband (UWB) signals, and/or the like. In some embodiments, the interface device 4602 may include multiple antennas for communicating different types of communication signals.

The CPU/Radio 4604 can include at least one universal asynchronous receiver/transmitter (UART) 4608. The CPU/Radio 4604 can use the UART 4608 to send and receive serial communications. The CPU/Radio 4604 can send data through a transmit line 4652 and receive data through a receive line 4654. The CPU/Radio 4604 can send and receive data through the transmit line 4652 and receive line 4654 using a serial protocol, such as RS232. The CPU/Radio 4604 can also include one or more general purpose input/output (GPIO) lines, which can be coupled to any suitable element or terminal of the input and output platform 4600. The CPU/Radio 4604 can also include a restore line 4656 that can be coupled to a restore button 4628 of the input and output platform 4600. The CPU/Radio 4604 can also include an LED 1 line 4658, and an LED 2 line 4660, which can be coupled to the power light 4624 and WiFi light 4626, respectively. The CPU/Radio 4604 can have additional or fewer lines as necessary. The one or more GPIO lines can be used for any suitable function, such as powering an indicator light on the input and output platform 4600, providing control signals to an element of the input and output platform 4600 (e.g., to actuate a relay), or for accepting an input from the input and output platform 4600 (e.g., accepting a signal from the sensor input terminal 4646). However, in the embodiment shown in FIG. 46, the CPU/Radio 4604 does not include any GPIO lines, but rather the I/O processor 4636 includes GPIO lines coupled to an infrared (IR) output 4662, a sensor input terminal 4646, and a relay driver 4638. Fewer or more GPIO lines can be used.

A signal sent on the restore line 4656, such as when the restore button 4628 is actuated, can be used to restore the CPU/Radio 4604 and/or the interface device 4602 to factory defaults. The LED 1 line 4658 and LED 2 line 4660 can be used to power the power light 4624 and WiFi light 4626, respectively, to indicate various statuses, such as whether the interface device 4602 has a network connection, whether the interface device 4602 is powered on, and whether the relay 4640 is open or closed. The power light 4624 and WiFi light 4626 can be LEDs or other lights.

The interface device 4602 can further include a voltage regulator 4614. The voltage regulator 4614 may be used to convert the voltage output from the remainder of the input and output platform 4600 to a voltage usable by the CPU/Radio 4604. For example, the voltage regulator 4614 may regulate the DC voltage from 5 V to 3.3 V. The voltage regulator 4614 can be supplied with power from a power input 4634. In some embodiments, a voltage regulator 4630 can be positioned external to the interface device 4602. In some embodiments, the input and output platform 4600 may include one, both, or none of voltage regulators 4614 and 4630.

Each of the interface lines, including any GPIO lines, the restore line 4656, the LED 1 line 4658, the LED 2 line 4660, the transmit line 4652, the receive line 4654, the power line connected to the power input 4634, and any additional lines, can be routed through a connector 4616. Connector 4616 can be a proprietary or universal connector. Any input and output platform 4600 to which the interface device 4602 is attached through the connector 4616 can have the necessary hardware to make use of the interface lines.

In alternate embodiments, some or all interface lines are not routed through the connector 4616. For example, the CPU/Radio 4604 can be directly connected to a power supply and not coupled to the power supply through connector 4616.

In various embodiments, functions may be stored as one or more instructions or code in memory, such as the flash memory 4612 and/or the DRAM 4610. The interface device 4602 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed below may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform various steps described below. The memory, such as the flash memory 4612 and/or the DRAM 4610, may be a processor-readable memory and/or a computer-readable memory that stores software code (programming code, instructions, etc.) configured to cause a processor(s) within the CPU/Radio 4604 to perform the functions described. In other embodiments, one or more of the functions described may be performed in hardware.

A set of these instructions and/or code might be stored on a computer-readable storage medium, such as the flash memory 4612 and/or the DRAM 4610. In some cases, the storage medium might be incorporated within a computer system, such as the CPU/Radio 4604. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the interface device 4602 and/or might take the form of source and/or installable code, which, upon compilation and/or installation on the interface device 4602 (e.g., using any of a variety of generally available compilers, installation programs, compression/decompression utilities, etc.) then takes the form of executable code.

The interface device 4602 may have other components than those depicted in FIG. 46. Further, the embodiment shown in the figures are only one example of an interface device that may incorporate an embodiment of the invention. In some other embodiments, interface device 4602 may have more or fewer components than shown in the figure, may combine two or more components, or may have a different configuration or arrangement of components.

In alternate embodiments, instead of an interface device 4602 coupled to an I/O processor 4636, the input and output platform 4600 can simply include a CPU/Radio 4604, flash 4612, and DRAM 4610 that are suitably coupled to the remaining components of the input and output platform 4600.

The I/O processor 4636 communicates with the interface device 4602 to provide input signals from the various inputs (e.g., sensors, sensor inputs, and buttons) of the input and output platform 4600 to the interface device 4602. The I/O processor 4636 also receives commands from the interface device 4602 to provide control signals to various controllable components (e.g., lights and relays) of the input and output platform 4600.

A rear button 4648 and a front button 4650 can be coupled to the I/O processor 4636. As seen in FIG. 46, both the rear button 4648 and front button 4650 are coupled to the same line of the I/O processor 4636; however, that need not be the case. A GPIO line of the I/O processor 4636 can be couple to an IR output 4662. The IR output 4662 can be an IR LED or a terminal suitable for connecting to an IR LED. Another GPIO line of the I/O processor 4636 can be coupled to a sensor input terminal 4646, optionally through a buffer-isolator 4644. The buffer-isolator 4644 can be a signal conditioner. The buffer-isolator 4644 can provide voltage isolation, current isolation, or both between the sensor input terminal 4646 and the GPIO line of the I/O processor 4636. The buffer-isolator 4644 can be used to protect against electrostatic discharge and other unwanted power passing through the sensor input terminal 4646.

In an embodiment, the I/O processor 4636 can contain circuitry to pull-up the GPIO line for the sensor input terminal 4646 to a constant voltage (e.g., 5 volts) or to pull-down the same GPIO line to ground. The pull-up or pull-down circuitry can be preset or configurable. When configurable, the pull-up or pull-down circuitry can be configurable through hardware changes (e.g., moving a jumper) or software changes (e.g., during programming of the input and output platform 4600).

A GPIO line of the I/O processor 4636 can be coupled to a relay driver 4638 that controls a relay 4640. By sending control signals through that GPIO line to the relay driver 4638, the I/O processor 4636 is able to control actuation of the relay 4640 (e.g., opening or closing the relay 4640). When the relay 4640 is open, a set of relay terminals 4642 are not electrically connected together and no power can pass between them. When the relay 4640 is closed, the set of relay terminals 4642 are electrically connected together and power is able to pass between them. Any number of sets of relay terminals 4642 can be used. Each set of relay terminals 4642 can be electrically isolated from each other set, but may be controlled by the same relay 4640. Any number of relays and relay drivers can be used.

A power output 4632 can be coupled to the power input 4634. In alternate embodiments, the power output 4632 can be coupled to a controller to control whether power is output through the power output 4632 and control how much power is output through the power output 4632. Such a controller can be controlled by the I/O processor 4636.

In some embodiments, a sensor can be coupled to the I/O processor 4636, optionally through a buffer-isolator 4644. The sensor can be contained within the enclosure of the input and output platform 4600 (e.g., an accelerometer) or can be located on or outside of the enclosure of the input and output platform 4600 (e.g., a photodiode positioned through, on, or outside the enclosure).

In some embodiments, the input and output platform 4600 can further include a digital input. The digital input can be coupled to a digital to analog converter.

When a signal is sensed by the sensor input terminal 4646 or a button press is sensed (e.g., by rear button 4648 or front button 4650), the CPU/Radio 4604 can cause a communication to be sent through the network via communication signals 4622. Such a communication can be a status update, an alert, a command (e.g., to turn on or off another network device), or other communication transmittable over the network. When the communication is based on a sensor input, a status update can include raw sensor data or processed sensor data, such as human-readable information. For example, a thermocouple coupled to the sensor input terminal 4646 can provide sensor signals as voltages. A status update can therefore include raw data, which would be the raw voltages, or processed data, which could be a temperature in degrees Fahrenheit, Celsius, or Kelvin, or a human-readable notation, such as "Hot" or "Cold."

Figure 47:
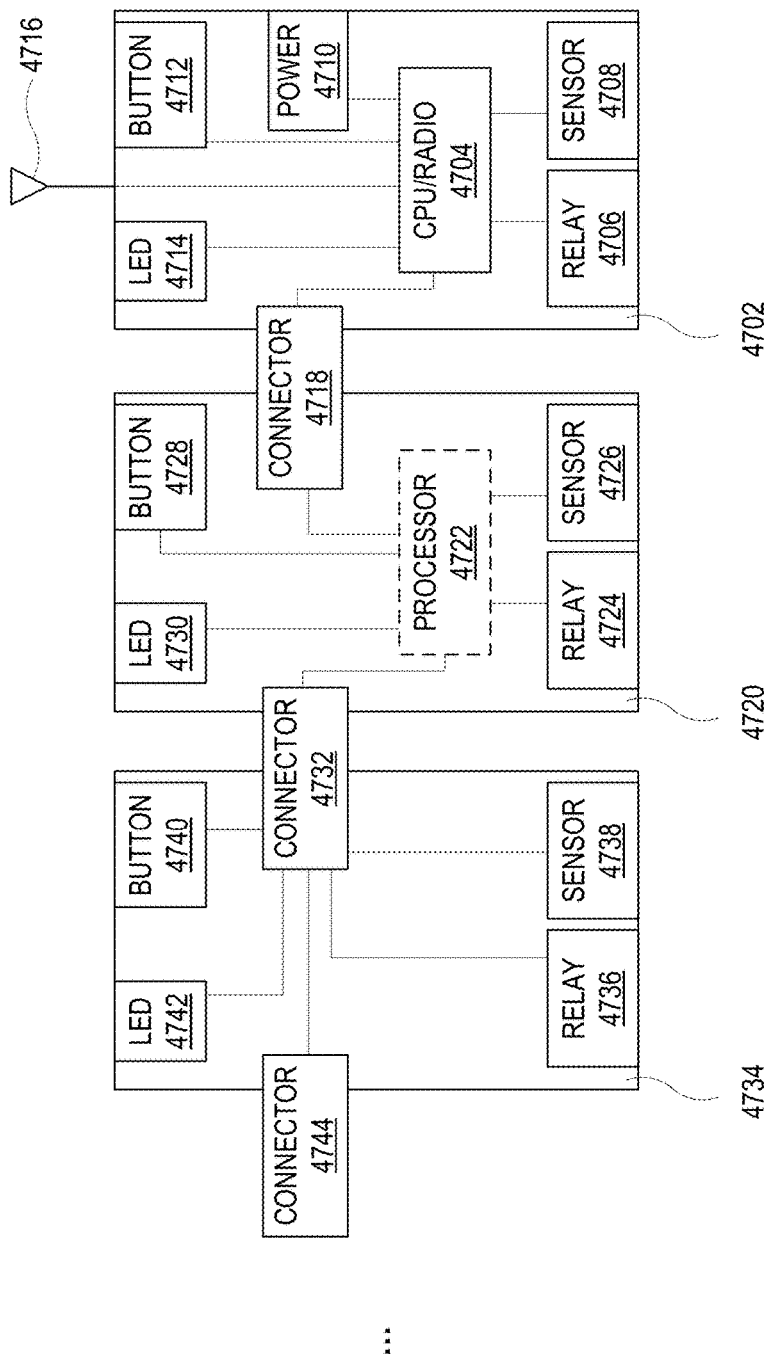
FIG. 47 is a block diagram illustrating an example of several input and output platforms coupled together according to certain aspects of the present disclosure.

FIG. 47 is a block diagram illustrating an example of several input and output platforms coupled together according to certain aspects of the present disclosure. A first input and output platform 4702 can include a CPU/Radio 4704 coupled to a relay 4706, a sensor 4708 (e.g., a sensor incorporated into the input and output platform 4702 or a sensor attached to a sensor input), a power source 4710 (e.g., a battery source or an external power source), a button 4712 (e.g., a primary button), an antenna 4716 (e.g., internal or external antenna), and an LED 4714 (e.g., a power light). The first input and output platform 4702 may include fewer or more LEDs, buttons, relays, and sensors.

The CPU/Radio 4704 of the first input and output platform 4702 may be couplable to a second input and output platform 4720 via a connector 4718. The connector 4718 can couple the CPU/Radio 4704 of the first input and output platform 4702 to a processor 4722 of the second input and output platform 4720. In some embodiments, the second input and output platform 4720 can be identical to the first input and output platform 4702, in which case the processor 4722 is a CPU/Radio. The second input and output platform 4720 can be an input and output platform (e.g., like input and output platform 4702) that is set to an expander mode. In the expander mode, the second input and output platform 4720 is designed to operate as a follower device to a leader device (e.g., input and output platform 4702). When viewed, accessed, or controlled through the network, any other network device, including access devices, will only see the first input and output platform 4702, but will see it as having the number of inputs and outputs that are available on both the first input and output platform 4702 and any connected expanders (e.g., second input and output platform 4720). Therefore, additional inputs and outputs can be controlled or accessed through the network by adding on expansion devices, without the need to have additional, separate devices connected to the network as network devices.

In some embodiments, the second input and output platform 4720 is an input and output platform that is a purpose-built expansion platform. In such embodiments, the processor 4722 can be a processor designed to communicate with the CPU/Radio 4704 of the first input and output platform

4702. The processor 4722 can be an I/O processor coupled to a relay 4724, sensor 4726, button 4728, or LED 4730 of the second input and output platform 4720, or any combination thereof.

An input and output expansion module 4734 can be coupled to another input and output platform, through a connector 4732, to the processor 4722 or CPU/Radio 4704 of the other input and output platform (e.g., a first input and output platform 4702 or a second input and output platform 4720). The input and output expansion module 4734 can include one or more components directly connected to the connector 4732. Such components can include a relay 4736, a sensor 4738, a button 4740, or an LED 4742, or any combination thereof. The input and output expansion module 4734 can include additional connectors 4744 for further expansion.

As described above, input and output platforms 4702 can be chained together to increase the number of inputs or outputs available to the network device. In some embodiments, the additional inputs and outputs can be located on a purpose-built input and output platforms (e.g., input and output platform 4720) having its own processor 4722 coupled to the various additional inputs and outputs. In some embodiments, the additional inputs and outputs can be located on an input and output expansion module 4734, where the various additional inputs and outputs are directly coupled to a connector 4732 and ultimate to a processor 4722 or CPU/Radio 4704 of another input and output platform 4720, 4702, respectively.

Figure 48:
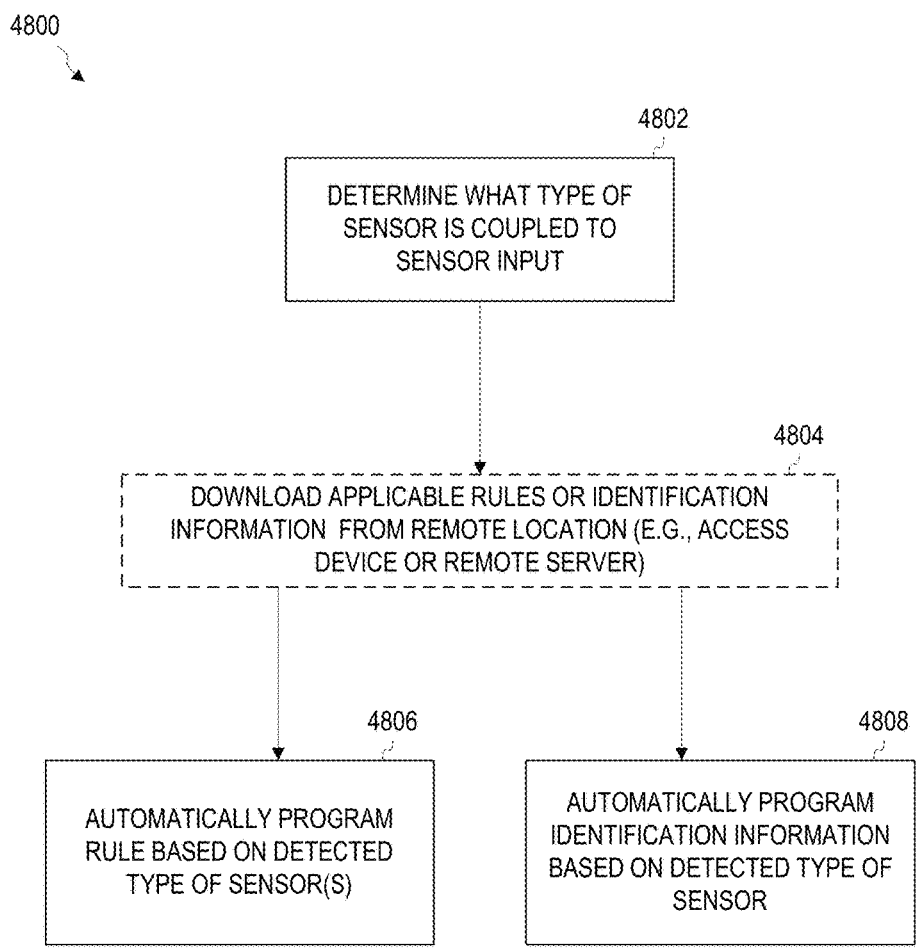
FIG. 48 is a flowchart diagram depicting a sensor identification process 1700 according to certain aspects of the present disclosure.

FIG. 48 is a flowchart diagram depicting a sensor identification process 4800 according to certain aspects of the present disclosure. The input and output platform disclosed herein can perform a sensor identification process 4800. At block 4802, the input and output platform can determine what type of sensor is coupled to each of its sensor inputs. This determination can be made automatically or manually. When made automatically, the determination can be made actively or passively. When determined actively, the sensor itself can transmit its sensor type to the input and output platform or the sensor can respond with its sensor type when it receives an initiation signal from the input and output platform. When determined passively, the input and output platform can sense signals coming in through the sensor input when a sensor is connected, and based on these sensed signals, compare the sensed signals with expected signals. The input and output platform can select the most likely sensor based on comparing the sensed signals with expected signal. The comparison can be based on electrical properties (e.g., voltages, resistances, capacitances, or others), a change in the electrical properties (e.g., change in voltage over time, or others), or any other properties of the sensor available to the input and output platform. When the determination is made manually, a user can make a selection (e.g., on an access device) to inform the input and output platform what type of sensor is being used.

At optional block 4804, the input and output platform can optionally download applicable rules or identification information from a remote location, such as an access device or a remote server. The input and output platform can use the sensor's type to determine what rules or identification information to download. In some embodiments, certain applicable rules or identification information are already stored in memory of the input and output platform.

At block 4806, the input and output platform automatically programs one or more rules based on the type of sensor that was detected. The one or more rules used can be stored in the input and output platform already, or downloaded at block 4804. For example, if the input and output platform determines at block 4802 that the type of sensor attached to the sensor input is a light sensor, at block 4806, the input and output platform can automatically program itself with a rule that causes it to perform an action, such as send an alert to the access device with the message "It is dark now" whenever the sensor stops detecting a sufficient level of light. Likewise, a rule can be automatically programmed to send an alert to the access device with the message "It is now light" whenever the sensor detects a sufficient level of light. Other rules can be used.

In some embodiments, when multiple sensors are used, the input and output platform can automatically program rules based on the combination of sensor that are detected. For example, if the input and output platform determines that two sensors are coupled to the input and output platform and that they are a water sensor and a temperature sensor, the input and output platform can automatically program itself with rules that provide alerts to an access device that include information about whether water is detected and whether the water is hot or cold. For example, two such alerts can be "Hot water is detected" and "Cold water is detected."

At block 4808, the input and output platform automatically programs itself with identification information based on the type of sensor that was detected. The identification information used can be stored in the input and output platform already, or downloaded at block 4804. For example, if the input and output platform determines at block 4802 that the type of sensor attached to the sensor input is a light sensor, at block 4808, the input and output platform can automatically program itself with identification information, such as a label indicating that the attached sensor is a "Light Sensor" and sensor value labels such as "Light" and "Dark" for certain ranges of values of the sensor's signal. Other types of identification information can be used.

Figure 49:
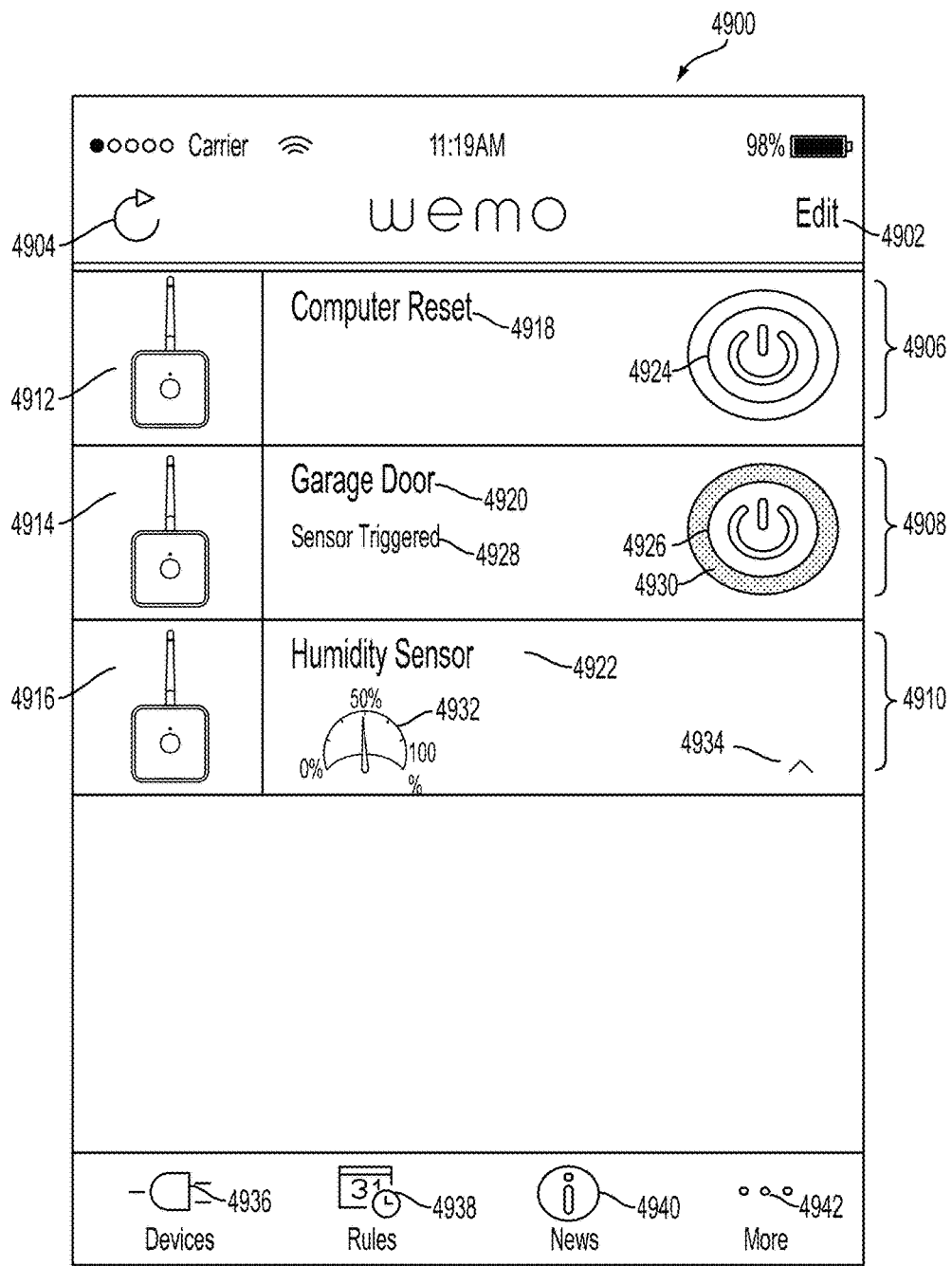
FIG. 49 depicts an example interface for providing control over various devices, in accordance with some embodiments.

FIG. 49 depicts an example display 4900 of an application executing on a mobile device. The display 4900 includes modular tiles 4906, 4908, and 4910 for interacting with network devices in a network. The interactions can include monitoring and controlling the network devices. The tiles 4906, 4908, and 4910 each include respective icons 4912, 4914, and 4916, and respective names 4918, 4920, and 4922 identifying different network devices. Additionally, each tile 4906, 4908, and 4910 can include various controls and status identifiers. Some examples of controls can include buttons, sliders, or other interactive elements. Some examples of status identifiers can include words, phrases, icons, displays, or other information-conveying elements.

The input and output platform can be configured in various ways, such as whether or not to sense data from the sensor input and how the relay should be controlled (e.g., as a momentary switch or a toggle switch), it can include one or more control elements (e.g., to control one or more relays) and one or more status identifiers (e.g., to show information related to one or more sensors). Several different example input and output platforms are represented in FIG. 49 by tiles 4906, 4908, 4910, but other example input and output platform configurations and thus different tiles can be used.

Tile 4906 corresponds to an input and output platform set up only to provide control of its relay (e.g., used only to open and close the two terminals connected to a relay in the input and output platform, not for other purposes, such as sensing). An example input and output platform depicted in tile 4906 is a "Computer Reset" device designed to remotely reset a computer upon pressing the power button 4924. Such an example input and output platform can be configured as a momentary switch and can be set up by wiring the reset button of a computer to the relay of the input and output platform. The tile 4906 can include a power button 4924 for actuating the momentary switch (e.g., momentarily closing the relay of the input and output platform). When the sensors or sensor input of the input and output platform are not being used, the tile 4906 may not display any sensor-related information.

Tile 4908 corresponds to an input and output platform set up to both provide control of its relay and input from a sensor. An example input and output platform depicted in tile 4908 is a "Garage Door" device designed to remotely control and sense information related to a garage door. For example, a button of a garage door opener can be wired into the relay of the input and output platform, such that whenever the relay is closed, the garage door opener actuates (e.g., opens or closes). Additionally, a sensor, such as a normally-open magnetic sensor can be wired to the sensor input of the input and output platform, with an accompanying magnet placed on the garage door to keep the magnetic sensor open when the garage door is closed. Therefore, whenever the garage door is open, the normally-open magnetic sensor will close and cause the input and output platform to receive a signal through the sensor. Tile 4908 can include a power button 4926, that when pressed, causes the relay of the input and output platform to close, thus causing the garage door opener to actuate. In some embodiments, a status identifier 4930 can be present around the power button 4926, providing some feedback about a status of the network device. For example, the status identifier 4930 can display a certain color or pattern to indicate whether the garage door is open or closed, as sensed by the magnetic sensor. In some embodiments, another status identifier 4928 can indicate the same or a different status of the network device. The status identifier 4928 can present a textual or graphical indication of the status of the device. For example, the status identifier 4928 can display "Sensor Triggered" to simply identify that the sensor is currently triggered. Other examples of status identifiers can include displaying "Sensor not triggered," "Sensor not triggered since 6:28 pm," and "Sensor triggered since 6:15 pm." Other status identifiers can be used.

In some embodiments, the status identifiers can provide information specifically tailored to the sensor being used or to the use case of the input and output platform (e.g., to determine when a garage door is opened). In an example, a sensor identifier can display "Sensor Triggered," "Magnetic Sensor Triggered," "Magnet moved away from sensor," or "Garage Door Open," depending on how the input and output device is configured. In some embodiments, a user can configure a tile 4906, 4908, 4910, such as configured how and where different elements appear and can be controlled in the tile. The user can configure whether or not the sensor identifier provides specifically tailored information, and if so, what that information can be. In some embodiments, as described above, the input and output platform is capable of detecting the type of sensor attached thereto. In such embodiments, the input and output platform may pre-configure itself to provide tailored sensor information. For example, if the input and output platform determines that a magnetic sensor is being used, the input and output platform can configure itself to display "Door/Window Ajar" or "Magnetic Sensor Open" instead of the generic "Sensor Triggered" status identifier 4928. Such configuration can be accomplished at block 4808 of FIG. 48 when the input and output platform is automatically programming identification information based on the detected type of sensor.

Tile 4910 corresponds to an input and output platform set up to only provide information related to input from a sensor. An example input and output platform depicted in tile 4910 is a "Humidity Sensor" device designed to remotely sense information related to humidity in an environment. For example, a humidity probe can be wired to the sensor input of the input and output platform. Tile 4910 may not include a power button because no output (e.g., a relay) is being controlled. However, tile 4910 does include a status identifier 4930 in the form of a graphical meter. The needle of the graphical meter can display a status based on the sensor input. As used in the example of a humidity sensor, the graphical meter can provide a representation of the approximate humidity percentage based on input from the humidity probe attached to the sensor input. In some embodiments, a user can calibrate the sensor input or the sensor input can be automatically calibrated. The type of status identifier 4932 (e.g., graphical or textual or a combination thereof) can be configured by a user or can be pre-configured based on the type of sensor used (e.g., as input by a user or automatically determined by the input and output platform).

In additional or alternative embodiments, tiles 4906, 4908, 4910 can convey status information about a network device, including, but not limited to, a firmware version, a last known firmware update status, connectivity to cloud status, registration status (i.e., an indication that the network device has a key or does not), a primary mode of the network device (i.e., on, off), a secondary mode of the device (i.e., standby, high, low, eco), a schedule, and settings for the device.

In an embodiment, the display 4900 is flexible and can dynamically display the most appropriate tile 4906, 4908, 4910 for whatever environment the application is run in. For instance, the display 4900 enables a mechanism wherein a user can configure a tile to display the most appropriate message for a connected sensor. For example, a user can connect any one of a plurality of types of sensors (e.g., water, humidity, temperature/heat, air pressure, light, sound, smoke, carbon monoxide, etc.) to a network.

In some embodiments, when a network device has extended capabilities, such as secondary or tertiary functionalities, an interactive element 4934 can be selected to expand and contract a menu including controllable settings for the capabilities. The menu can also include expanded status information, such as historical information from an attached sensor (e.g., historical humidity data). The menu can be, for example, a full drop down menu or drawer with interactive elements for setting the extended capabilities of the network device or expanded status information.

FIG. 49 also shows how display 4900 can include selectable icons and links outside of the tile display area. In the example of FIG. 49, refresh icon 4904 can be selected to manually refresh information presented in display 4900, such as, for example, status and state information displayed in tiles 4906, 4908, and 4910, although that information may be automatically refreshed occasionally without the need to press the refresh icon 4904. For instance, the status indicator 4928 in tile 4908 for the garage door sensor can be refreshed on an automatic, periodic basis, in addition to being manually updated when refresh icon 4904 is selected. Similarly, the humidity status indicator 4932 in tile 4910 can be updated when refresh icon 4904 is selected. The edit link 4902 can be selected to edit the list of tiles 4906, 4908, and 4910, as well as to configure the input and output platforms associated with each tile 4906, 4908, and 4910. For example, edit link 4902 can be selected to sort or re-order the sequence of tiles 4906, 4908, and 4910 displayed in display 4900. Edit link 4902 can also be selected to delete one of the tiles 4906, 4908, and 4910 in cases where a user no longer wants to view a given tile. Devices icon 4936 can be selected to list discovered network devices in a network.

Rules icon 4938 can be selected to display rules pertaining to network devices. For example, rules icon 4938 can be selected to display a rule that closes the garage door of tile 4908 when the sensor associated with the garage door indicates that the garage door has been open for longer than a certain period of time, such as 45 minutes. That is, by selecting rules icon 4938, a user can create or edit a rule that activates the relay of the input and output platform associated with tile 4908 if the status information from the magnetic sensor coupled to that input and output platform remains closed (e.g., the garage door is open) for at least forty five minutes. In another example, a rule can be created to automatically open or close the garage door when the humidity sensor detects a humidity above 60%. In this way, rules can relate functionalities of multiple network devices to each other. News icon 4940 can be selected to review news items, such as news associated with network devices and/or the application. For instance, news icon 4940 can be selected to view announcements and news items relevant to network devices controlled via tiles 4906, 4908, and 4910 and/or information relevant to the application, such as notifications of available tile updates. The more icon 4942 can be selected to access additional features of the application.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

In the foregoing description, for the purposes of illustration, method operations were described in a particular order. It should be appreciated that in alternate embodiments, the operations may be performed in a different order than that described. It should also be appreciated that the methods described above may be performed by hardware components or may be embodied in sequences of machine-executable instructions, which may be used to cause a machine, such as a special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

While illustrative embodiments of the application have been described in detail herein, it is to be understood that the inventive concepts may be otherwise variously embodied and employed, and that the appended claims are intended to be construed to include such variations, except as limited by the prior art.

What is claimed is:

1. A system, comprising:
   one or more processors; and
   a non-transitory computer-readable storage medium containing instructions which when executed on the one or more processors, cause the one or more processors to perform operations including:
   receiving an initial system profile, wherein the initial system profile includes independent operational rules for a plurality of network devices for maintaining operational conditions, and wherein the plurality of network devices includes at least a first control device, a sensor device, and a second control device;
   operating the plurality of network devices independently from one another according to the initial system profile;
   receiving sensor data from at least the sensor device;
   comparing the sensor data with one or more reference values;
   generating an updated system profile for operation of the plurality of network devices, wherein generating the updated system profile includes:
      determining that a network device is malfunctioning based on the comparison of the sensor data with the one or more reference values, and
      establishing updated operational rules for the first control device and the second control device to compensate for the malfunctioning of the network device to maintain operational conditions in accordance with the initial system profile, wherein the updated operational rules for the first control device and the second control device correspond to the updated system profile; and
   transmitting the updated system profile, wherein receiving the updated system profile at the plurality of network devices facilitates independent operation of the plurality of network devices according to the updated system profile.

2. The system of claim 1, the operations further comprising:
   operating the plurality of network devices independently from one another according to the updated system profile.

3. The system of claim 1, wherein the plurality of network devices are configured to communicate with one another via one or more wired or wireless network links.

4. The system of claim 1, wherein operating the first control device according to the updated system profile generates a change in the sensor data and wherein the updated operational rules for the second control device are adjusted to compensate for the change.

5. The system of claim 1, the operations further comprising:
   receiving additional sensor data from at least the sensor device;

comparing the additional sensor data with the one or more reference values; and generating a further updated system profile for operation of the plurality of network devices to maintain operational conditions in accordance with the initial system profile, wherein generating the further updated system profile includes using the comparison of the additional sensor data with the one or more reference values, and wherein the further updated system profile includes a change to a setting for the first control device, the second control device, or both the first control device and the second control device.

6. The system of claim 1, the operations further comprising:

detecting input corresponding to a selection or a modification of the updated system profile corresponding to a change in operational conditions.

7. The system of claim 1, further comprising:

the sensor device, wherein the sensor device is in data communication with the one or more processors for providing the sensor data to the one or more processors.

8. The system of claim 1, wherein the sensor data includes a measurement of a physical quantity and wherein the physical quantity is controlled or influenced by operation of the first control device or the second control device.

9. The system of claim 1, the operations further comprising:

detecting input corresponding to a modification of the one or more reference values.

10. A computer-program product tangibly embodied in a non-transitory machine-readable storage medium, including instructions that, when executed by one or more processors of a computing device, cause the one or more processors to perform operations including:

receiving an initial system profile, wherein the initial system profile includes independent operational rules for a plurality of network devices for maintaining operational conditions, and wherein the plurality of network devices includes at least a first control device, a sensor device, and a second control device;

operating the plurality of network devices independently from one another according to the initial system profile;

receiving sensor data from at least the sensor device;

comparing the sensor data with one or more reference values;

generating an updated system profile for operation of the plurality of network devices, wherein generating the updated system profile includes:

determining that a network device is malfunctioning based on the comparison of the sensor data with the one or more reference values, and establishing updated operational rules for the first control device and the second control device to compensate for the malfunctioning of the network device to maintain operational conditions in accordance with the initial system profile, wherein the updated operational rules for the first control device and the second control device correspond to the updated system profile; and transmitting the updated system profile, wherein receiving the updated system profile at the plurality of network devices facilitates independent operation of the plurality of network devices according to the updated system profile.

11. The computer-program product of claim 10, wherein the operations further include:

operating the plurality of network devices independently from one another according to the updated system profile.

12. The computer-program product of claim 10, wherein the plurality of network devices are configured to communicate with one another via one or more wired or wireless network links.

13. The computer-program product of claim 10, wherein operating the first control device according to the updated system profile generates a change in the sensor data and wherein the updated operational rules for the second control device are adjusted to compensate for the change.

14. The computer-program product of claim 10, wherein the operations further include:

receiving additional sensor data from at least the sensor device;

comparing the additional sensor data with the one or more reference values; and generating a further updated system profile for operation of the plurality of network devices to maintain operational conditions in accordance with the initial system profile, wherein generating the further updated system profile includes using the comparison of the additional sensor data with the one or more reference values, and wherein the further updated system profile includes a change to a setting for the first control device, the second control device, or both the first control device and the second control device.

15. The computer-program product of claim 10, wherein the operations further include:

detecting input corresponding to a selection or a modification of the updated system profile corresponding to a change in operational conditions.

16. The computer-program product of claim 10, wherein the computing device includes the sensor device for generating the sensor data, wherein the sensor device is in data communication with the one or more processors.

17. The computer-program product of claim 10, wherein the sensor data includes a measurement of a physical quantity and wherein the physical quantity is controlled or influenced by operation of the first control device or the second control device.

18. The computer-program product of claim 10, wherein the operations further include:

detecting input corresponding to a modification of the one or more reference values.

19. A computer implemented method, comprising:

receiving, at a computing device, an initial system profile, wherein the initial system profile includes independent operational rules for a plurality of network devices for maintaining operational conditions, and wherein the plurality of network devices includes at least a first control device, a sensor device, and a second control device;

operating the plurality of network devices independently from one another according to the initial system profile;

receiving sensor data from at least the sensor device;

comparing the sensor data with one or more reference values;

generating an updated system profile for operation of the plurality of network devices, wherein generating the updated system profile includes:

determining that a network device is malfunctioning based on the comparison of the sensor data with the one or more reference values, and establishing updated operational rules for the first control device and the second control device to compensate for the malfunctioning of the network device to maintain operational conditions in accordance with the initial system profile, wherein the updated operational rules for the first control device and the second control device correspond to the updated system profile; and transmitting the updated system profile, wherein receiving the updated system profile at the plurality of network devices facilitates independent operation of the plurality of network devices according to the updated system profile.

20. The method of claim 19, further comprising:

operating the plurality of network devices according to the updated system profile.

* * * * *